United States Patent
Steele et al.

(10) Patent No.: US 12,448,631 B2
(45) Date of Patent: Oct. 21, 2025

(54) BACTERIAL-DERIVED NITROGEN SOURCE FOR ETHANOL FERMENTATION

(71) Applicant: Lallemand Hungary Liquidity Management LLC, Budapest (HU)

(72) Inventors: James L. Steele, Lebanon, NH (US); Brooks Henningsen, Salisbury, NH (US); Jeffery R. Broadbent, Amalga, UT (US); Ekkarat Phrommao, Lebanon, NH (US); Fernanda Cristina Firmino, Atlanta, GA (US)

(73) Assignee: DANSTAR FERMENT AG, Zug (CH)

( * ) Notice: Subject to any disclaimer, the term of this patent is extended or adjusted under 35 U.S.C. 154(b) by 0 days.

(21) Appl. No.: 17/372,291

(22) Filed: Jul. 9, 2021

(65) Prior Publication Data
US 2022/0010340 A1    Jan. 13, 2022

Related U.S. Application Data

(60) Provisional application No. 63/106,785, filed on Oct. 28, 2020, provisional application No. 63/050,588, filed on Jul. 10, 2020.

(51) Int. Cl.
*C12P 7/06*    (2006.01)
*C12N 1/20*    (2006.01)
(Continued)

(52) U.S. Cl.
CPC .............. *C12P 7/065* (2013.01); *C12N 1/205* (2021.05); *C12N 9/52* (2013.01); *C12N 9/93* (2013.01);
(Continued)

(58) Field of Classification Search
CPC ...... C12P 7/08; C12P 7/10; C12P 7/14; C12P 7/065; C12P 7/06; C12N 1/205;
(Continued)

(56) References Cited

U.S. PATENT DOCUMENTS

| | | | |
|---|---|---|---|
| 8,956,851 B2 | 2/2015 | Argyros et al. | |
| 2014/0045235 A1* | 2/2014 | Steele | C12N 9/0006 435/252.3 |

(Continued)

FOREIGN PATENT DOCUMENTS

| | | |
|---|---|---|
| WO | 2011/153516 A2 | 12/2011 |
| WO | 2012/138942 A1 | 10/2012 |

(Continued)

OTHER PUBLICATIONS

Gold et al. "Cloning and Expression of the Zymomonas mobilis "Production of Ethanol" Genes in Lactobacillus casei", 1996, Current Microbiology, vol. 33, p. 256-260. (Year: 1996).*

(Continued)

*Primary Examiner* — Gary B Nickol
*Assistant Examiner* — Amelia Nicole Dickens
(74) *Attorney, Agent, or Firm* — Seed Intellectual Property Law Group LLP

(57) ABSTRACT

The present disclosure concerns a recombinant bacterial host cell capable of providing a nitrogen source to a yeast during fermentation to make ethanol. The recombinant bacterial host cell is capable of converting a biomass into ethanol. The recombinant bacterial host cell has at least one first genetic modification. The at least one genetic modifications confers to the recombinant bacterial host cell the ability to increase, when compared to a corresponding control bacterial cell lacking the at least one first genetic modification, the proteolytic activity associated with the recombinant bacterial host cell. The at least one genetic modification also confers the recombinant bacterial host cell the ability to provide a nitrogen source to a yeast capable of converting the biomass into ethanol, wherein the nitrogen source comprises a peptide, an amino acid and/or ammonia.

8 Claims, 5 Drawing Sheets

Specification includes a Sequence Listing.

(51) Int. Cl.
  *C12N 9/00* (2006.01)
  *C12N 9/52* (2006.01)
  *C12R 1/225* (2006.01)

(52) U.S. Cl.
  CPC . *C12R 2001/225* (2021.05); *C12Y 304/21096* (2013.01); *C12Y 304/24028* (2013.01); *C12Y 603/01002* (2013.01)

(58) Field of Classification Search
  CPC ...... C12N 9/52; C12N 1/20; C12R 2001/225; C12Y 401/01001; C12Y 101/01001
  See application file for complete search history.

(56) References Cited

U.S. PATENT DOCUMENTS

2018/0087073 A1* 3/2018 Steele ............ C12Y 401/01001
2019/0367952 A1* 12/2019 Jensen .................... C12N 9/52

FOREIGN PATENT DOCUMENTS

WO   2015/023989 A1   2/2015
WO   2017/037614 A1   3/2017
WO   2018/167670 A1   9/2018

OTHER PUBLICATIONS

Mikami et al., "Ammonia production from amino acid-based biomass-like sources by engineered *Escherichia coli*," AMB Expr 7:83, 2017. (Year: 2017).*

Waller et al. "Toward a genetic tool development pipeline for host-associated bacteria", Jun. 15, 2017, Current Opinion in Microbiology, vol. 38, p. 156--164. (Year: 2017).*

Zuniga et al. "Evolutionary history of the OmpR/IIIA family of signal transduction two component systems in Lactobacilliae and Leuconostocaceae" 2011, BMC Evolutionary Biology, vol. 11, Article 34 p. 1-15. (Year: 2011).*

Zheng et al. "A taxonomic note on the genus Lactobacillus: Description of 23 novel genera, emended description of the genus *Lactobacillus* Beijerinck 1901, and union of Lactobacillus and Leuconostocaceae", Apr. 15, 2020, International Journal of Systematic and Evolutionary Biology, 70:2782-2858. (Year: 2020).*

Alcantara et al., "Peptide and amino acid metabolism is controlled by an OmpR-family response regulator in Lactobacillus casei," Molecular Microbiology 100(1):25-41, 2016. (Year: 2016).*

Johnston et al. "Protease increases fermentation rate and ethanol yield in dry-grind ethanol production", available online Nov. 27, 2013, Bioresource Technology, Feb. 2014 issue, vol. 154, p. 18-25. (Year: 2013).*

Alcántara et al., "Peptide and amino acid metabolism is controlled by an OmpR-family response regulator in *Lactobacillus casei*," *Molecular Microbiology* 100(1):25-41, 2016.

Crépin et al., "Sequential Use of Nitrogen Compounds by *Saccharomyces cerevisiae* during Wine Fermentation: a Model Based on Kinetic and Regulation Characteristics of Nitrogen Permeases," *Applied and Environmental Microbiology* 78(22):8102-8111, 2012.

Graves et al., "Interaction effects of lactic acid and acetic acid at different temperatures on ethanol production by *Saccharomyces cerevisiae* in corn mash," *Appl Microbiol Biotechnol* 73:1190-1196, 2007.

Jones et al., "Fuel alcohol production: Assessment of selected commercial proteases for very high gravity wheat mash fermentation," *Enzyme Microb. Technol.* 16:683-687, 1994.

Broadbent et al., "Lactocepin: the Cell Envelope-associated Endopeptidase of lactococci," in Barrett et al. (eds.), *Handbook of Proteolytic Enzymes, 3rd* Ed., Elsevier Ltd., Amsterdam, Netherlands, 2013, 8 pages.

Lucena et al., "Diversity of lactic acid bacteria of the bioethanol process," *BMC Microbiology* 10:298, 2010. (8 pages).

Mikami et al., "Ammonia production from amino acid-based biomass-like sources by engineered *Escherichia coli*," *AMB Expr* 7:83, 2017. (7 pages).

Narendranath et al., "Effects of Lactobacilli on Yeast-Catalyzed Ethanol Fermentations," *Applied and Environmental Microbiology* 63(11):4158-4163, 1997.

Paulus Compart et al., "Presence and biological activity of antibiotics used in fuel ethanol and corn co-product production," *Journal of Animal Science* 91:2395-2404, 2013.

Skinner et al., "Bacterial contaminants of fuel ethanol production," *J Ind Microbiol Biotechnol* 31:401-408, 2004.

Skinner-Nemec et al., "Biofilm formation by bacterial contaminants of fuel ethanol production," *Biotechnol Lett* 29:379-383, 2007.

ter Schure et al., "The role of ammonia metabolism in nitrogen catabolite repression in *Saccharomyces cerevisiae*," *FEMS Microbiology Reviews* 24:67-83, 2000.

Thomas et al., "Fuel Alcohol Production: Effects of Free Amino Nitrogen on Fermentation of Very High-Gravity Wheat Mashes," *Applied and Environmental Microbiology* 56(7):2046-2050, 1990.

Vinay-Lara et al., "*Lactobacillus casei* as a biocatalyst for biofuel production," *J Ind Microbiol Biotechnol* 43:1205-1213, 2016.

Zhang et al., "Regulation of Sensing, Transportation, and Catabolism of Nitrogen Sources in *Saccharomyces cerevisiae*," *Microbiology and Molecular Biology Reviews* 82(1):e0040-17, 2018. (29 pages).

Zhao et al., "Nitrogen regulation involved in the accumulation of urea in *Saccharomyces cerevisiae*," *Yeast* 30:437-447, 2013.

Zheng et al., "A taxonomic note on the genus *Lactobacillus*: Description of 23 novel genera, emended description of the genus *Lactobacillus* Beijerink 1901, and union of *Lactobacilluseae* and *Leuconostocaceae*," *Int. J. Syst. Evol. Microbiol.*, DOI 10.1099/ijsem.0.004107, 2020. (77 pages).

* cited by examiner

SEQUENCE LISTING

<160> NUMBER OF SEQ ID NOS: 57

<210> SEQ ID NO 1
<211> LENGTH: 567
<212> TYPE: PRT
<213> ORGANISM: Zymomonas mobilis

<400> SEQUENCE: 1

```
Met Ser Tyr Thr Val Gly Thr Tyr Leu Ala Glu Arg Leu Val Gln Ile
1               5                   10                  15

Gly Leu Lys His His Phe Ala Val Ala Gly Asp Tyr Asn Leu Val Leu
            20                  25                  30

Leu Asp Asn Leu Leu Leu Asn Lys Asn Met Glu Gln Val Tyr Cys Cys
        35                  40                  45

Asn Glu Leu Asn Cys Gly Phe Ser Ala Glu Gly Tyr Ala Arg Ala Lys
    50                  55                  60

Gly Ala Ala Ala Val Val Thr Tyr Ser Val Gly Ala Leu Ser Ala
65                  70                  75                  80

Phe Asp Ala Ile Gly Gly Ala Tyr Ala Glu Asn Leu Pro Val Ile Leu
                85                  90                  95

Ile Ser Gly Ala Pro Asn Asn Asn Asp His Ala Ala Gly His Val Leu
            100                 105                 110

His His Ala Leu Gly Lys Thr Asp Tyr His Tyr Gln Leu Glu Met Ala
        115                 120                 125

Lys Asn Ile Thr Ala Ala Ala Glu Ala Ile Tyr Thr Pro Glu Glu Ala
    130                 135                 140

Pro Ala Lys Ile Asp His Val Ile Lys Thr Ala Leu Arg Glu Lys Lys
145                 150                 155                 160

Pro Val Tyr Leu Glu Ile Ala Cys Asn Ile Ala Ser Met Pro Cys Ala
                165                 170                 175

Ala Pro Gly Pro Ala Ser Ala Leu Phe Asn Asp Glu Ala Ser Asp Glu
            180                 185                 190

Ala Ser Leu Asn Ala Ala Val Glu Glu Thr Leu Lys Phe Ile Ala Asn
        195                 200                 205

Arg Asp Lys Val Ala Val Leu Val Gly Ser Lys Leu Arg Ala Ala Gly
    210                 215                 220

Ala Glu Glu Ala Ala Val Lys Phe Ala Asp Ala Leu Gly Gly Ala Val
225                 230                 235                 240

Ala Thr Met Ala Ala Lys Ser Phe Phe Pro Glu Glu Asn Pro His
                245                 250                 255

Tyr Ile Gly Thr Ser Trp Gly Glu Val Ser Tyr Pro Gly Val Glu Lys
            260                 265                 270

Thr Met Lys Glu Ala Asp Ala Val Ile Ala Leu Ala Pro Val Phe Asn
        275                 280                 285

Asp Tyr Ser Thr Thr Gly Trp Thr Asp Ile Pro Asp Pro Lys Lys Leu
    290                 295                 300

Val Leu Ala Glu Pro Arg Ser Val Val Asn Gly Val Arg Phe Pro
305                 310                 315                 320

Ser Val His Leu Lys Asp Tyr Leu Thr Arg Leu Ala Gln Lys Val Ser
                325                 330                 335

Lys Lys Thr Gly Ala Leu Asp Phe Phe Lys Ser Leu Asn Ala Gly Glu
            340                 345                 350

Leu Lys Lys Ala Ala Pro Ala Asp Pro Ser Ala Pro Leu Val Asn Ala
        355                 360                 365
```

```
Glu Ile Ala Arg Gln Val Glu Ala Leu Leu Thr Pro Asn Thr Thr Val
    370                 375                 380
Ile Ala Glu Thr Gly Asp Ser Trp Phe Asn Ala Gln Arg Met Lys Leu
385                 390                 395                 400
Pro Asn Gly Ala Arg Val Glu Tyr Glu Met Gln Trp Gly His Ile Gly
                405                 410                 415
Trp Ser Val Pro Ala Ala Phe Gly Tyr Ala Val Gly Ala Pro Glu Arg
                420                 425                 430
Arg Asn Ile Leu Met Val Gly Asp Gly Ser Phe Gln Leu Thr Ala Gln
                435                 440                 445
Glu Val Ala Gln Met Val Arg Leu Lys Leu Pro Val Ile Ile Phe Leu
    450                 455                 460
Ile Asn Asn Tyr Gly Tyr Thr Ile Glu Val Met Ile His Asp Gly Pro
465                 470                 475                 480
Tyr Asn Asn Ile Lys Asn Trp Asp Tyr Ala Gly Leu Met Glu Val Phe
                485                 490                 495
Asn Gly Asn Gly Gly Tyr Asp Ser Gly Ala Gly Lys Gly Leu Lys Ala
                500                 505                 510
Lys Thr Gly Gly Glu Leu Ala Glu Ala Ile Lys Val Ala Leu Ala Asn
                515                 520                 525
Thr Asp Gly Pro Thr Leu Ile Glu Cys Phe Ile Gly Arg Glu Asp Cys
                530                 535                 540
Thr Glu Glu Leu Val Lys Trp Gly Lys Arg Val Ala Ala Ala Asn Ser
545                 550                 555                 560
Arg Lys Pro Val Asn Lys Leu
                565

<210> SEQ ID NO 2
<211> LENGTH: 1707
<212> TYPE: DNA
<213> ORGANISM: Zymomonas mobilis

<400> SEQUENCE: 2
atgagttata ctgtcggtac ctatttagcg gagcggcttg tccagattgg tctcaagcat    60
cacttcgcag tcgcgggcga ctacaacctc gtccttcttg acaacctgct tttgaacaaa   120
aacatggagc aggtttattg ctgtaacgaa ctgaactgcg gtttcagtgc agaaggttat   180
gctcgtgcca aggcgcagc agcagccgtc gttacctaca gcgtcggtgc gctttccgca   240
tttgatgcta tcggtggcgc ctatgcagaa aaccttccgg ttatcctgat ctccggtgct   300
ccgaacaaca tgatcacgc tgctggtcac gtgttgcatc acgctcttgg caaaaccgac   360
tatcactatc agttggaaat ggccaagaac atcacggccg cagctgaagc gatttacacc   420
ccagaagaag ctccggctaa aatcgatcac gtgattaaaa ctgctcttcg tgagaagaag   480
ccggtttatc tcgaaatcgc ttgcaacatt gcttccatgc cctgcgccgc tcctggaccg   540
gcaagcgcat tgttcaatga cgaagccagc gacgaagctt ctttgaatgc agcggttgaa   600
gaaaccctga aattcatcgc caaccgcgac aaagttgccg tcctcgtcgg cagcaagctg   660
cgcgcagctg gtgctgaaga agctgctgtc aaatttgctg atgctctcgg tggcgcagtt   720
gctaccatgg ctgctgcaaa aagcttcttc ccagaagaaa acccgcatta tcggtacc    780 tcatggggtg aagtcagcta ccgggcgtt gaaaagacga tgaaagaagc cgatgcggtt   840
atcgctctgg ctcctgtctt caacgactac tccaccactg gttggacgga tattcctgat   900
cctaagaaac tggttctcgc tgaaccgcgt tctgtcgtcg ttaacggcgt tcgcttcccc   960
```

-continued

| | |
|---|---|
| agcgttcatc tgaaagacta tctgacccgt ttggctcaga aagtttccaa gaaaaccggt | 1020 |
| gctttggact tcttcaaatc cctcaatgca ggtgaactga agaaagccgc tccggctgat | 1080 |
| ccgagtgctc cgttggtcaa cgcagaaatc gcccgtcagg tcgaagctct tctgaccccg | 1140 |
| aacacgacgg ttattgctga aaccggtgac tcttggttca atgctcagcg catgaagctc | 1200 |
| ccgaacggtg ctcgcgttga atatgaaatg cagtggggtc acatcggttg gtccgttcct | 1260 |
| gccgccttcg gttatgccgt cggtgctccg gaacgtcgca acatcctcat ggttggtgat | 1320 |
| ggttccttcc agctgacggc tcaggaagtc gctcagatgg ttcgcctgaa actgccggtt | 1380 |
| atcatcttct tgatcaataa ctatggttac accatcgaag ttatgatcca tgatggtccg | 1440 |
| tacaacaaca tcaagaactg ggattatgcc ggtctgatgg aagtgttcaa cggtaacggt | 1500 |
| ggttatgaca gcggtgctgg taaaggcctg aaggctaaaa ccggtggcga actggcagaa | 1560 |
| gctatcaagg ttgctctggc aaacaccgac ggcccaaccc tgatcgaatg cttcatcggt | 1620 |
| cgtgaagact gcactgaaga attggtcaaa tggggtaagc gcgttgctgc cgccaacagc | 1680 |
| cgtaagcctg ttaacaagct cctctag | 1707 |

<210> SEQ ID NO 3
<211> LENGTH: 1707
<212> TYPE: DNA
<213> ORGANISM: Artificial Sequence
<220> FEATURE:
<223> OTHER INFORMATION: Encoding SEQ ID NO: 1, codon-optimized for
    Lactobacillus paracasei

<400> SEQUENCE: 3

| | |
|---|---|
| atgtcatata ccgttggcac ctatttggct gaacgtttgg ttcaaatcgg cttgaagcac | 60 |
| cacttcgctg ttgctggcga ttataacttg gttttgttgg ataacttgtt gttgaacaag | 120 |
| aacatggaac aagtttattg ctgcaacgaa ttgaactgcg gcttctcagc tgaaggctat | 180 |
| gctcgtgcta agggcgctgc tgctgctgtt gttacctatt cagttggcgc tttgtcagct | 240 |
| ttcgatgcta tcggcggcgc ttatgctgaa aacttgccag ttatcttgat ctcaggcgct | 300 |
| ccaaacaaca acgatcacgc tgctggccac gttttgcacc acgctttggg caagaccgat | 360 |
| tatcactatc aattggaaat ggctaagaac atcaccgctg ctgctgaagc tatctatacc | 420 |
| ccagaagaag ctccagctaa gatcgatcac gttatcaaga ccgctttgcg tgaaaagaag | 480 |
| ccagtttatt tggaaatcgc ttgcaacatc gcttcaatgc catgcgctgc tccaggccca | 540 |
| gcttcagctt tgttcaacga tgaagcttca gatgaagctt cattgaacgc tgctgttgaa | 600 |
| gaaaccttga gttcatcgc taaccgtgat aaggttgctg ttttggttgg ctcaaagttg | 660 |
| cgtgctgctg gcgctgaaga agctgctgtt aagttcgctg atgctttggg cggcgctgtt | 720 |
| gctaccatgg ctgctgctaa gtcattcttc ccagaagaaa acccacacta tatcggcacc | 780 |
| tcatggggcg aagtttcata tccaggcgtt gaaaagacca tgaaggaagc tgatgctgtt | 840 |
| atcgctttgg ctccagtttt caacgattat caaccaccg ctggaccga tatcccagat | 900 |
| ccaaagaagt tggttttggc tgaaccacgt tcagttgttg ttaacggcgt tcgtttccca | 960 |
| tcagttcact tgaaggatta tttgacccgt ttggctcaaa aggtttcaaa gaagaccggc | 1020 |
| gctttggatt tcttcaagtc attgaacgct ggcgaattga gaaaggctgc tccagctgat | 1080 |
| ccatcagctc cattggttaa cgctgaaatc gctcgtcaag ttgaagcttt gttgaccca | 1140 |
| aacaccaccg ttatcgctga aaccggcgat tcatggttca acgctcaacg tatgaagttg | 1200 |
| ccaaacggcg ctcgtgttga atatgaaatg caatggggcc acatcggctg gtcagttcca | 1260 |

-continued

```
gctgctttcg gctatgctgt tggcgctcca gaacgtcgta acatcttgat ggttggcgat    1320
ggctcattcc aattgaccgc tcaagaagtt gctcaaatgg ttcgtttgaa gttgccagtt    1380
atcatcttct tgatcaacaa ctatggctat accatcgaag ttatgatcca cgatggccca    1440
tataacaaca tcaagaactg ggattatgct ggcttgatgg aagttttcaa cggcaacggc    1500
ggctatgatt caggcgctgg caagggcttg aaggctaaga ccggcggcga attggctgaa    1560
gctatcaagg ttgctttggc taacaccgat ggcccaacct tgatcgaatg cttcatcggc    1620
cgtgaagatt gcaccgaaga attggttaag tggggcaagc gtgttgctgc tgctaactca    1680
cgtaagccag ttaacaagtt gttgtag                                         1707
```

```
<210> SEQ ID NO 4
<211> LENGTH: 383
<212> TYPE: PRT
<213> ORGANISM: Zymomonas mobilis

<400> SEQUENCE: 4

Met Ala Ser Ser Thr Phe Tyr Ile Pro Phe Val Asn Glu Met Gly Glu
1               5                   10                  15

Gly Ser Leu Glu Lys Ala Ile Lys Asp Leu Asn Gly Ser Gly Phe Lys
            20                  25                  30

Asn Ala Leu Ile Val Ser Asp Ala Phe Met Asn Lys Ser Gly Val Val
        35                  40                  45

Lys Gln Val Ala Asp Leu Leu Lys Ala Gln Gly Ile Asn Ser Ala Val
    50                  55                  60

Tyr Asp Gly Val Met Pro Asn Pro Thr Val Thr Ala Val Leu Glu Gly
65                  70                  75                  80

Leu Lys Ile Leu Lys Asp Asn Asn Ser Asp Phe Val Ile Ser Leu Gly
                85                  90                  95

Gly Gly Ser Pro His Asp Cys Ala Lys Ala Ile Ala Leu Val Ala Thr
            100                 105                 110

Asn Gly Gly Glu Val Lys Asp Tyr Glu Gly Ile Asp Lys Ser Lys Lys
        115                 120                 125

Pro Ala Leu Pro Leu Met Ser Ile Asn Thr Thr Ala Gly Thr Ala Ser
    130                 135                 140

Glu Met Thr Arg Phe Cys Ile Ile Thr Asp Glu Val Arg His Val Lys
145                 150                 155                 160

Met Ala Ile Val Asp Arg His Val Thr Pro Met Val Ser Val Asn Asp
                165                 170                 175

Pro Leu Leu Met Val Gly Met Pro Lys Gly Leu Thr Ala Ala Thr Gly
            180                 185                 190

Met Asp Ala Leu Thr His Ala Phe Glu Ala Tyr Ser Ser Thr Ala Ala
        195                 200                 205

Thr Pro Ile Thr Asp Ala Cys Ala Leu Lys Ala Ala Ser Met Ile Ala
    210                 215                 220

Lys Asn Leu Lys Thr Ala Cys Asp Asn Gly Lys Asp Met Pro Ala Arg
225                 230                 235                 240

Glu Ala Met Ala Tyr Ala Gln Phe Leu Ala Gly Met Ala Phe Asn Asn
                245                 250                 255

Ala Ser Leu Gly Tyr Val His Ala Met Ala His Gln Leu Gly Gly Tyr
            260                 265                 270

Tyr Asn Leu Pro His Gly Val Cys Asn Ala Val Leu Leu Pro His Val
        275                 280                 285

Leu Ala Tyr Asn Ala Ser Val Val Ala Gly Arg Leu Lys Asp Val Gly
```

```
                    290                 295                 300
Val Ala Met Gly Leu Asp Ile Ala Asn Leu Gly Asp Lys Glu Gly Ala
305                 310                 315                 320

Glu Ala Thr Ile Gln Ala Val Arg Asp Leu Ala Ala Ser Ile Gly Ile
                325                 330                 335

Pro Ala Asn Leu Thr Glu Leu Gly Ala Lys Lys Glu Asp Val Pro Leu
                340                 345                 350

Leu Ala Asp His Ala Leu Lys Asp Ala Cys Ala Leu Thr Asn Pro Arg
            355                 360                 365

Gln Gly Asp Gln Lys Glu Val Glu Glu Leu Phe Leu Ser Ala Phe
            370                 375                 380

<210> SEQ ID NO 5
<211> LENGTH: 1152
<212> TYPE: DNA
<213> ORGANISM: Zymomonas mobilis

<400> SEQUENCE: 5
atggcttctt caacttttta tattcctttc gtcaacgaaa tgggcgaagg ttcgcttgaa     60
aaagcaatca aggatcttaa cggcagcggc tttaaaaatg cgctgatcgt ttctgatgct    120
ttcatgaaca atccggtgt tgtgaagcag gttgctgacc tgttgaaagc acagggtatt    180
aattctgctg tttatgatgg cgttatgccg aacccgactg ttaccgcagt tctggaaggc    240
cttaagatcc tgaaggataa caattcagac ttcgtcatct ccctcggtgg tggttctccc    300
catgactgcg ccaaagccat cgctctggtc gcaaccaatg gtggtgaagt caaagactac    360
gaaggtatcg acaaatctaa gaaacctgcc ctgcctttga tgtcaatcaa cacgacggct    420
ggtacggctt ctgaaatgac gcgtttctgc atcatcactg atgaagtccg tcacgttaag    480
atggccattg ttgaccgtca cgttaccccg atggtttccg tcaacgatcc tctgttgatg    540
gttggtatgc caaaaggcct gaccgccgcc accggtatgg atgctctgac ccacgcattt    600
gaagcttatt cttcaacggc agctactccg atcaccgatg cttgcgcctt gaaggctgcg    660
tccatgatcg ctaagaatct gaagaccgct tgcgacaacg gtaaggatat gccagctcgt    720
gaagctatgg cttatgccca attcctcgct ggtatggcct tcaacaacgc ttcgcttggt    780
tatgtccatg ctatggctca ccagttgggc ggctactaca acctgccgca tggtgtctgc    840
aacgctgttc tgcttccgca tgttctggct ataacgcct ctgtcgttgc tggtcgtctg    900
aaagacgttg tgttgctat gggtctcgat atcgccaatc tcggtgataa agaaggcgca    960
gaagccacca tcaggctgt tcgcgatctg gctgcttcca ttggtattcc agcaaatctg   1020
accgagctgg gtgctaagaa agaagatgtg ccgcttcttg ctgaccacgc tctgaaagat   1080
gcttgtgctc tgaccaaccc gcgtcagggt gatcagaaag aagttgaaga actcttcctg   1140
agcgctttct aa                                                      1152

<210> SEQ ID NO 6
<211> LENGTH: 1152
<212> TYPE: DNA
<213> ORGANISM: Artificial Sequence
<220> FEATURE:
<223> OTHER INFORMATION: Encoding SEQ ID NO: 4, codon-optimized for
      Lactobacillus paracasei

<400> SEQUENCE: 6
atggcttcat caaccttcta tatcccattc gttaacgaaa tgggcgaagg ctcattggaa     60
aaggctatca aggatttgaa cggctcaggc ttcaagaacg ctttgatcgt ttcagatgct    120
```

```
ttcatgaaca agtcaggcgt tgttaagcaa gttgctgatt tgttgaaggc tcaaggcatc      180
aactcagctg tttatgatgg cgttatgcca aacccaaccg ttaccgctgt tttggaaggc      240
ttgaagatct tgaaggataa caactcagat ttcgttatct cattgggcgg cggctcacca      300
cacgattgcg ctaaggctat cgctttggtt gctaccaacg gcggcgaagt taaggattat      360
gaaggcatcg ataagtcaaa gaagccagct ttgccattga tgtcaatcaa caccaccgct      420
ggcaccgctt cagaaatgac ccgttttctg catcataccg atgaagttcg tcacgttaag      480
atggctatcg ttgatcgtca cgttacccca atggtttcag ttaacgatcc attgttgatg      540
gttggcatgc caaagggctt gaccgctgct accggcatgg atgctttgac ccacgctttc      600
gaagcttatt catcaaccgc tgctacccca atcaccgatg cttgcgcttt gaaggctgct      660
tcaatgatcg ctaagaactt gaagaccgct tgcgataacg gcaaggatat gccagctcgt      720
gaagctatgg cttatgctca attcttggct ggcatggctt caacaacgc ttcattgggc       780 tatgttcacg ctatggctca ccaattgggc ggctattata acttgccaca cggcgtttgc      840
aacgctgttt tgttgccaca cgttttggct tataacgctt cagttgttgc tggccgtttg      900
aaggatgttg cgttgctat gggcttggat atcgctaact gggcgataa ggaaggcgct        960 gaagctacca tccaagctgt tcgtgatttg gctgcttcaa tcggcatccc agctaacttg     1020
accgaattgg gcgctaagaa ggaagatgtt ccattgttgg ctgatcacgc tttgaaggat     1080
gcttgcgctt tgaccaaccc acgtcaaggc gatcaaaagg aagttgaaga attgttcttg     1140
tcagctttct aa                                                         1152
```

<210> SEQ ID NO 7
<211> LENGTH: 57
<212> TYPE: PRT
<213> ORGANISM: Lactococcus lactis

<400> SEQUENCE: 7

Met Ser Thr Lys Asp Phe Asn Leu Asp Leu Val Ser Val Ser Lys Lys
1               5                   10                  15

Asp Ser Gly Ala Ser Pro Arg Ile Thr Ser Ile Ser Leu Cys Thr Pro
                20                  25                  30

Gly Cys Lys Thr Gly Ala Leu Met Gly Cys Asn Met Lys Thr Ala Thr
            35                  40                  45

Cys Asn Cys Ser Ile His Val Ser Lys
        50                  55

<210> SEQ ID NO 8
<211> LENGTH: 34
<212> TYPE: PRT
<213> ORGANISM: Lactococcus lactis

<400> SEQUENCE: 8

Ile Thr Ser Ile Ser Leu Cys Thr Pro Gly Cys Lys Thr Gly Ala Leu
1               5                   10                  15

Met Gly Cys Asn Met Lys Thr Ala Thr Cys Asn Cys Ser Ile His Val
                20                  25                  30

Ser Lys

<210> SEQ ID NO 9
<211> LENGTH: 57
<212> TYPE: PRT
<213> ORGANISM: Lactococcus lactis

```
<400> SEQUENCE: 9

Met Ser Thr Lys Asp Phe Asn Leu Asp Leu Val Ser Val Ser Lys Lys
1               5                   10                  15

Asp Ser Gly Ala Ser Pro Arg Ile Thr Ser Ile Ser Leu Cys Thr Pro
                20                  25                  30

Gly Cys Lys Thr Gly Ala Leu Met Gly Cys Asn Met Lys Thr Ala Thr
            35                  40                  45

Cys His Cys Ser Ile His Val Ser Lys
        50                  55

<210> SEQ ID NO 10
<211> LENGTH: 34
<212> TYPE: PRT
<213> ORGANISM: Lactococcus lactis

<400> SEQUENCE: 10

Ile Thr Ser Ile Ser Leu Cys Thr Pro Gly Cys Lys Thr Gly Ala Leu
1               5                   10                  15

Met Gly Cys Asn Met Lys Thr Ala Thr Cys His Cys Ser Ile His Val
                20                  25                  30

Ser Lys

<210> SEQ ID NO 11
<211> LENGTH: 245
<212> TYPE: PRT
<213> ORGANISM: Lactococcus lactis

<400> SEQUENCE: 11

Met Arg Arg Tyr Leu Ile Leu Ile Val Ala Leu Ile Gly Ile Thr Gly
1               5                   10                  15

Leu Ser Gly Cys Tyr Gln Thr Ser His Lys Lys Val Arg Phe Asp Glu
                20                  25                  30

Gly Ser Tyr Thr Asn Phe Ile Tyr Asp Asn Lys Ser Tyr Phe Val Thr
            35                  40                  45

Asp Lys Glu Ile Pro Gln Glu Asn Val Asn Asn Ser Lys Ala Lys Phe
        50                  55                  60

Tyr Lys Leu Leu Ile Val Asp Met Lys Ser Glu Lys Leu Leu Ser Ser
65                  70                  75                  80

Ser Asn Lys Asn Ser Val Thr Leu Val Leu Asn Asn Ile Tyr Glu Ala
                85                  90                  95

Ser Asp Lys Ser Leu Cys Met Gly Ile Asn Asp Arg Tyr Tyr Lys Ile
            100                 105                 110

Leu Pro Glu Ser Asp Lys Gly Ala Val Lys Ala Leu Arg Leu Gln Asn
        115                 120                 125

Phe Asp Val Thr Ser Asp Ile Ser Asp Asn Phe Val Ile Asp Lys
        130                 135                 140

Asn Asp Ser Arg Lys Ile Asp Tyr Met Gly Asn Ile Tyr Ser Ile Ser
145                 150                 155                 160

Asp Ser Thr Val Ser Asp Glu Leu Gly Glu Tyr Gln Asp Val Leu
                165                 170                 175

Ala Glu Val Arg Val Phe Asp Ser Val Ser Gly Lys Ser Ile Pro Arg
            180                 185                 190

Ser Glu Trp Gly Arg Ile Asp Lys Asp Gly Ser Asn Ser Lys Gln Ser
        195                 200                 205

Arg Thr Glu Trp Asp Tyr Gly Glu Ile His Ser Ile Arg Gly Lys Ser
        210                 215                 220
```

-continued

Leu Thr Glu Ala Phe Ala Val Glu Ile Asn Asp Asp Phe Lys Leu Ala
225                 230                 235                 240

Thr Lys Val Gly Asn
            245

<210> SEQ ID NO 12
<211> LENGTH: 225
<212> TYPE: PRT
<213> ORGANISM: Lactococcus lactis

<400> SEQUENCE: 12

Met Gln Val Lys Ile Gln Asn Leu Ser Lys Thr Tyr Lys Glu Lys Gln
1               5                   10                  15

Val Leu Gln Asp Ile Ser Phe Asp Ile Lys Ser Gly Thr Val Cys Gly
            20                  25                  30

Leu Leu Gly Val Asn Gly Ala Gly Lys Ser Thr Leu Met Lys Ile Leu
        35                  40                  45

Phe Gly Leu Ile Ser Ala Asp Thr Gly Lys Ile Phe Phe Asp Gly Gln
    50                  55                  60

Glu Lys Thr Asn Asn Gln Leu Gly Ala Leu Ile Glu Ala Pro Ala Ile
65                  70                  75                  80

Tyr Met Asn Leu Ser Ala Phe Asp Asn Leu Lys Thr Lys Ala Leu Leu
                85                  90                  95

Phe Gly Ile Ser Asp Lys Arg Ile His Glu Thr Leu Glu Val Ile Gly
            100                 105                 110

Leu Ala Glu Thr Gly Lys Lys Arg Ala Gly Lys Phe Ser Leu Gly Met
        115                 120                 125

Lys Gln Arg Leu Gly Ile Gly Met Ala Ile Leu Thr Glu Pro Gln Phe
    130                 135                 140

Leu Ile Leu Asp Glu Pro Thr Asn Gly Leu Asp Pro Asp Gly Ile Ala
145                 150                 155                 160

Glu Leu Leu Asn Leu Ile Leu Lys Leu Lys Ala Lys Gly Val Thr Ile
                165                 170                 175

Leu Ile Ser Ser His Gln Leu His Glu Ile Ser Lys Val Ala Ser Gln
            180                 185                 190

Ile Ile Ile Leu Asn Lys Gly Lys Ile Arg Tyr Asn His Ala Asn Asn
        195                 200                 205

Lys Glu Asp Asp Ile Glu Gln Leu Phe Phe Lys Ile Val His Gly Gly
    210                 215                 220

Met
225

<210> SEQ ID NO 13
<211> LENGTH: 242
<212> TYPE: PRT
<213> ORGANISM: Lactococcus lactis

<400> SEQUENCE: 13

Met Lys Arg Ile Ile Ala Ser Glu Ala Ile Lys Leu Lys Lys Ser Gly
1               5                   10                  15

Thr Leu Arg Leu Val Leu Ile Ile Pro Phe Val Thr Leu Phe Ile Ala
            20                  25                  30

Phe Leu Met Gly Gly Ile Gln Ile Phe Ser Val Phe Ser Ile Tyr Trp
        35                  40                  45

Trp Glu Thr Gly Phe Leu Phe Leu Leu Met Ser Leu Leu Phe Leu Tyr
    50                  55                  60

```
Asp Ile Lys Ser Glu Glu Gln Ala Gly Asn Phe Gln Asn Val Lys Trp
 65                  70                  75                  80

Lys Lys Leu Ser Trp Lys Ile His Leu Ala Lys Met Leu Leu Ile Trp
                 85                  90                  95

Leu Arg Gly Ile Leu Ala Ser Ile Val Leu Ile Ile Leu Leu Tyr Leu
            100                 105                 110

Val Ala Phe Val Phe Gln Gly Ile Val Val Asp Phe Met Lys Val
        115                 120                 125

Ser Val Ala Leu Ile Ala Ile Leu Leu Ala Ala Ser Trp Asn Leu Pro
130                 135                 140

Phe Ile Tyr Leu Ile Phe Lys Trp Ile Asn Thr Tyr Val Leu Leu Ala
145                 150                 155                 160

Ala Asn Thr Leu Ile Cys Leu Ile Val Ala Pro Phe Val Ala Gln Thr
                165                 170                 175

Pro Val Trp Phe Leu Leu Pro Tyr Thr Tyr His Tyr Lys Val Thr Glu
            180                 185                 190

Ser Leu Leu Asn Ile Lys Pro Ser Gly Asp Leu Leu Thr Gly Lys Ile
        195                 200                 205

Asn Phe Ser Ile Trp Glu Val Leu Leu Pro Phe Gly Leu Ser Ile Val
210                 215                 220

Val Thr Ile Gly Val Ser Tyr Leu Leu Lys Gly Val Ile Glu His Asp
225                 230                 235                 240

Lys Lys

<210> SEQ ID NO 14
<211> LENGTH: 214
<212> TYPE: PRT
<213> ORGANISM: Lactococcus lactis

<400> SEQUENCE: 14

Met Ile Arg Ser Glu Cys Leu Lys Leu Lys Asn Ser Leu Gly Phe Tyr
 1               5                  10                  15

Leu Val Phe Leu Phe Thr Leu Leu Glu Leu Leu Thr Val Pro Ile Tyr
            20                  25                  30

Leu Ala Phe Gly Arg Ser His Val Ser Met Thr Asp Ser Ser Leu Met
        35                  40                  45

Ile Phe Leu Phe Phe Pro Leu Leu Val Thr Ile Leu Ser Ile Leu Ile
    50                  55                  60

Phe Glu Gln Glu Ser Leu Ala Asn His Phe Gln Glu Ile Asn Val Asn
 65                  70                  75                  80

Lys Lys Ser Ser Arg Ile Trp Leu Ser Lys Leu Ile Val Val Asp Phe
                 85                  90                  95

Leu Leu Phe Phe Pro Ser Ala Met Ile Trp Ile Ile Thr Gly Val Ser
            100                 105                 110

Gln Ala Val Gly Gln Gln Gly Met Met Ile Ala Thr Ala Ser Trp Leu
        115                 120                 125

Met Ala Ile Phe Leu Asn His Phe His Leu Leu Leu Thr Phe Ile Ile
130                 135                 140

Asn Arg Gly Gly Ser Met Ile Ile Ala Ile Ile Glu Ile Leu Leu Ile
145                 150                 155                 160

Ile Phe Ala Ser Asn Lys Val Leu Leu Ala Ala Tyr Trp Cys Pro Ile
                165                 170                 175

Ala Leu Pro Val Asn Phe Met Ile Thr Gly Arg Cys Ala Tyr Leu Ile
            180                 185                 190
```

```
Ala Ala Val Gly Trp Ile Val Leu Ser Thr Ile Ile Leu Val Ala Leu
        195                 200                 205

Ser Lys Lys Lys Ile Arg
    210
```

<210> SEQ ID NO 15
<211> LENGTH: 91
<212> TYPE: PRT
<213> ORGANISM: Lactobacillus gasseri

<400> SEQUENCE: 15

```
Met Val Thr Lys Tyr Gly Arg Asn Leu Gly Leu Asn Lys Val Glu Leu
1               5                   10                  15

Phe Ala Ile Trp Ala Val Leu Val Val Ala Leu Leu Leu Thr Thr Ala
            20                  25                  30

Asn Ile Tyr Trp Ile Ala Asp Gln Phe Gly Ile His Leu Ala Thr Gly
        35                  40                  45

Thr Ala Arg Lys Leu Leu Asp Ala Met Ala Ser Gly Ala Ser Leu Gly
    50                  55                  60

Thr Ala Phe Ala Ala Ile Leu Gly Val Thr Leu Pro Ala Trp Ala Leu
65                  70                  75                  80

Ala Ala Ala Gly Ala Leu Gly Ala Thr Ala Ala
                85                  90
```

<210> SEQ ID NO 16
<211> LENGTH: 58
<212> TYPE: PRT
<213> ORGANISM: Lactobacillus gasseri

<400> SEQUENCE: 16

```
Ile Tyr Trp Ile Ala Asp Gln Phe Gly Ile His Leu Ala Thr Gly Thr
1               5                   10                  15

Ala Arg Lys Leu Leu Asp Ala Met Ala Ser Gly Ala Ser Leu Gly Thr
            20                  25                  30

Ala Phe Ala Ala Ile Leu Gly Val Thr Leu Pro Ala Trp Ala Leu Ala
        35                  40                  45

Ala Ala Gly Ala Leu Gly Ala Thr Ala Ala
    50                  55
```

<210> SEQ ID NO 17
<211> LENGTH: 53
<212> TYPE: PRT
<213> ORGANISM: Lactobacillus gasseri

<400> SEQUENCE: 17

```
Met Gln Lys Leu Leu Arg Ile Ile Ala Leu Ile Ser Leu Ile Ala Ala
1               5                   10                  15

Ile Ile Ser Phe Phe Ile Phe Lys Ile Asn Tyr Ile Thr Tyr Ile Leu
            20                  25                  30

Ile Gly Ile Phe Ile Gly Ser Gly Phe Ile Tyr Gln Ile Arg Ala Gln
        35                  40                  45

Gly Arg Asn Arg Lys
    50
```

<210> SEQ ID NO 18
<211> LENGTH: 226
<212> TYPE: PRT
<213> ORGANISM: Lactobacillus gasseri

<400> SEQUENCE: 18

Met Thr Arg Asn Met Phe Val Asp Ile Lys Asn Val Ser Lys Asn Leu
1               5                   10                  15

Thr Asp Phe Ser Leu Glu Asn Leu Asn Ile Ser Phe Glu Lys Gly Glu
            20                  25                  30

Ile Ile Gly Leu Val Gly Glu Asn Gly Ala Gly Lys Thr Thr Leu Leu
        35                  40                  45

Asn Leu Ile Ser Gly Ile Leu Lys Pro Asp Lys Gly Gln Ile Leu Leu
    50                  55                  60

Ser Ser Asn Asn Ile Gly Tyr Cys Phe Asp Ala Leu Pro Glu Pro Glu
65                  70                  75                  80

Asn Leu Thr Ile Glu Gln Leu Asn Thr Ile Phe Thr Gly Leu Leu Ala
                85                  90                  95

Val Trp Asp Ser Asp Thr Tyr Phe Ser Phe Val Asp Glu Phe Lys Leu
            100                 105                 110

Pro Lys Gly Lys Pro Ile Gly Val Phe Ser Lys Gly Met Lys Met Gln
        115                 120                 125

Leu Asn Val Ser Ile Thr Leu Ser His Asn Pro Thr Leu Leu Leu Leu
    130                 135                 140

Asp Glu Val Thr Ala Gly Leu Asp Pro Ile Val Arg Arg Thr Val Leu
145                 150                 155                 160

Asn Thr Ile Lys Glu Tyr Ala Ile Ser Ser Glu Cys Ile Val Ile Met
                165                 170                 175

Thr Thr His Asn Leu Glu Asp Ile Ser Asp Ile Cys Asn Arg Leu Ile
            180                 185                 190

Leu Leu Asn Asn Gly Ser Ile Leu Leu Asp Asp Asn Phe Glu Asp Lys
        195                 200                 205

Ser Ser Lys Glu Ile Glu Leu Ile Phe Arg Lys Thr Leu Gly Tyr Gly
    210                 215                 220

Asp Met
225

<210> SEQ ID NO 19
<211> LENGTH: 212
<212> TYPE: PRT
<213> ORGANISM: Lactobacillus gasseri

<400> SEQUENCE: 19

Met Lys Gly Leu Val Gln Lys Asp Ile Tyr Gln Leu Thr Ser Ser Trp
1               5                   10                  15

Phe Arg Pro Val Arg Ile Phe Phe Val Ile Ala Val Leu Ala Ala Gly
            20                  25                  30

Met Ile Phe Leu Lys Gln Asp Ser Ser Ile Ile Leu Val Leu Leu Leu
        35                  40                  45

Leu Leu Met Val Asn Asn Ile Gln Ser Leu Phe Ile Lys Asp Ser Thr
    50                  55                  60

Asn Arg Trp Leu Ser Leu Leu Lys Ser Leu Lys Ile Ser Thr Phe Ala
65                  70                  75                  80

Val Ile Gly Ser Arg Tyr Ile Thr Leu Val Val Ile Cys Val Cys Gly
                85                  90                  95

Ala Ile Leu Asn Phe Val Tyr Met Leu Phe Gly Met Leu Leu Phe Asn
            100                 105                 110

Thr Ser Thr Gly Ile Asp Val Leu Val Ile Ser Ser Ile Cys Leu Trp
        115                 120                 125

```
Val Ser Leu Ile Tyr Gly Leu Val Ile Ile Pro Phe Leu Tyr Ala Phe
            130                 135                 140

Lys Gln Asn Gly Leu Thr Leu Ala Ile Ile Met Phe Ser Cys Val
145                 150                 155                 160

Ala Leu Leu Ile Lys Phe Ser Ser Ala Ile Thr Lys Leu Ala Tyr Ile
                165                 170                 175

Ile His Ser Tyr Ser Tyr Val Gln Leu Ile Leu Ile Ala Ile Val Ala
            180                 185                 190

Leu Ile Gly Ile Gly Ile Ile Ser Met Val Val Ser Tyr Leu Ile Val
                195                 200                 205

Glu Lys Glu Lys
    210
```

<210> SEQ ID NO 20
<211> LENGTH: 62
<212> TYPE: PRT
<213> ORGANISM: Pediococcus sp.

<400> SEQUENCE: 20

```
Met Lys Lys Ile Glu Lys Leu Thr Glu Lys Glu Met Ala Asn Ile Ile
1               5                   10                  15

Gly Gly Lys Tyr Tyr Gly Asn Gly Val Thr Cys Gly Lys His Ser Cys
                20                  25                  30

Ser Val Asp Trp Gly Lys Ala Thr Thr Cys Ile Ile Asn Asn Gly Ala
            35                  40                  45

Met Ala Trp Ala Thr Gly Gly His Gln Gly Asn His Lys Cys
        50                  55                  60
```

<210> SEQ ID NO 21
<211> LENGTH: 44
<212> TYPE: PRT
<213> ORGANISM: Pediococcus sp.

<400> SEQUENCE: 21

```
Lys Tyr Tyr Gly Asn Gly Val Thr Cys Gly Lys His Ser Cys Ser Val
1               5                   10                  15

Asp Trp Gly Lys Ala Thr Thr Cys Ile Ile Asn Asn Gly Ala Met Ala
                20                  25                  30

Trp Ala Thr Gly Gly His Gln Gly Asn His Lys Cys
            35                  40
```

<210> SEQ ID NO 22
<211> LENGTH: 112
<212> TYPE: PRT
<213> ORGANISM: Pediococcus sp.

<400> SEQUENCE: 22

```
Met Asn Lys Thr Lys Ser Glu His Ile Lys Gln Gln Ala Leu Asp Leu
1               5                   10                  15

Phe Thr Arg Leu Gln Phe Leu Leu Gln Lys His Asp Thr Ile Glu Pro
                20                  25                  30

Tyr Gln Tyr Val Leu Asp Ile Leu Glu Thr Gly Ile Ser Lys Thr Lys
            35                  40                  45

His Asn Gln Gln Thr Pro Glu Arg Gln Ala Arg Val Val Tyr Asn Lys
        50                  55                  60

Ile Ala Ser Gln Ala Leu Val Asp Lys Leu His Phe Thr Ala Glu Glu
65                  70                  75                  80

Asn Lys Val Leu Ala Ala Ile Asn Glu Leu Ala His Ser Gln Lys Gly
```

```
                85                  90                  95

Trp Gly Glu Phe Asn Met Leu Asp Thr Thr Asn Thr Trp Pro Ser Gln
            100                 105                 110
```

<210> SEQ ID NO 23
<211> LENGTH: 77
<212> TYPE: PRT
<213> ORGANISM: Brochothrix campestris

<400> SEQUENCE: 23

```
Met Lys Lys Ile Glu Lys Leu Thr Glu Lys Glu Met Ala Asn Ile Ile
1               5                   10                  15

Gly Gly Tyr Ser Ser Lys Asp Cys Leu Lys Asp Ile Gly Lys Gly Ile
            20                  25                  30

Gly Ala Gly Thr Val Ala Gly Ala Ala Gly Gly Leu Ala Ala Gly
            35                  40                  45

Leu Gly Ala Ile Pro Gly Ala Phe Val Gly Ala His Phe Gly Val Ile
        50                  55                  60

Gly Gly Ser Ala Ala Cys Ile Gly Gly Leu Leu Gly Asn
65                  70                  75
```

<210> SEQ ID NO 24
<211> LENGTH: 59
<212> TYPE: PRT
<213> ORGANISM: Brochothrix campestris

<400> SEQUENCE: 24

```
Tyr Ser Ser Lys Asp Cys Leu Lys Asp Ile Gly Lys Gly Ile Gly Ala
1               5                   10                  15

Gly Thr Val Ala Gly Ala Ala Gly Gly Leu Ala Ala Gly Leu Gly
            20                  25                  30

Ala Ile Pro Gly Ala Phe Val Gly Ala His Phe Gly Val Ile Gly Gly
            35                  40                  45

Ser Ala Ala Cys Ile Gly Gly Leu Leu Gly Asn
        50                  55
```

<210> SEQ ID NO 25
<211> LENGTH: 61
<212> TYPE: PRT
<213> ORGANISM: Brochothrix campestris

<400> SEQUENCE: 25

```
Met Lys Lys Ile Glu Lys Leu Thr Glu Lys Glu Met Ala Asn Ile Ile
1               5                   10                  15

Gly Gly Lys Ile Asn Trp Gly Asn Val Gly Gly Ser Cys Val Gly Gly
            20                  25                  30

Ala Val Ile Gly Gly Ala Leu Gly Gly Leu Gly Gly Ala Gly Gly Gly
            35                  40                  45

Cys Ile Thr Gly Ala Ile Gly Ser Ile Trp Asp Gln Trp
        50                  55                  60
```

<210> SEQ ID NO 26
<211> LENGTH: 43
<212> TYPE: PRT
<213> ORGANISM: Brochothrix campestris

<400> SEQUENCE: 26

```
Lys Ile Asn Trp Gly Asn Val Gly Gly Ser Cys Val Gly Gly Ala Val
1               5                   10                  15
```

```
Ile Gly Gly Ala Leu Gly Gly Leu Gly Gly Ala Gly Gly Gly Cys Ile
            20                  25                  30

Thr Gly Ala Ile Gly Ser Ile Trp Asp Gln Trp
            35                  40
```

<210> SEQ ID NO 27
<211> LENGTH: 53
<212> TYPE: PRT
<213> ORGANISM: Brochothrix campestris

<400> SEQUENCE: 27

```
Met Val Lys Thr Ile Leu Phe Ser Val Ile Ser Phe Val Ala Leu
1               5                   10                  15

Cys Asn Phe Leu Ile Lys Lys Asp Val Ser Ser Lys Lys Leu Phe
            20                  25                  30

Leu Thr Gly Ser Ile Ala Val Phe Leu Ile Ile Tyr Asp Phe Leu Trp
            35                  40                  45

Ile Ile Phe Ser Asn
        50
```

<210> SEQ ID NO 28
<211> LENGTH: 515
<212> TYPE: PRT
<213> ORGANISM: Saccharomycopsis fibuligera

<400> SEQUENCE: 28

```
Met Ile Arg Leu Thr Val Phe Leu Thr Ala Val Phe Ala Ala Val Ala
1               5                   10                  15

Ser Cys Val Pro Val Glu Leu Asp Lys Arg Asn Thr Gly His Phe Gln
            20                  25                  30

Ala Tyr Ser Gly Tyr Thr Val Ala Arg Ser Asn Phe Thr Gln Trp Ile
            35                  40                  45

His Glu Gln Pro Ala Val Ser Trp Tyr Tyr Leu Leu Gln Asn Ile Asp
        50                  55                  60

Tyr Pro Glu Gly Gln Phe Lys Ser Ala Lys Pro Gly Val Val Val Ala
65                  70                  75                  80

Ser Pro Ser Thr Ser Glu Pro Asp Tyr Phe Tyr Gln Trp Thr Arg Asp
                85                  90                  95

Thr Ala Ile Thr Phe Leu Ser Leu Ile Ala Glu Val Glu Asp His Ser
            100                 105                 110

Phe Ser Asn Thr Thr Leu Ala Lys Val Val Glu Tyr Tyr Ile Ser Asn
        115                 120                 125

Thr Tyr Thr Leu Gln Arg Val Ser Asn Pro Ser Gly Asn Phe Asp Ser
    130                 135                 140

Pro Asn His Asp Gly Leu Gly Glu Pro Lys Phe Asn Val Asp Asp Thr
145                 150                 155                 160

Ala Tyr Thr Ala Ser Trp Gly Arg Pro Gln Asn Asp Gly Pro Ala Leu
                165                 170                 175

Arg Ala Tyr Ala Ile Ser Arg Tyr Leu Asn Ala Val Ala Lys His Asn
            180                 185                 190

Asn Gly Lys Leu Leu Leu Ala Gly Gln Asn Gly Ile Pro Tyr Ser Ser
        195                 200                 205

Ala Ser Asp Ile Tyr Trp Lys Ile Ile Lys Pro Asp Leu Gln His Val
    210                 215                 220

Ser Thr His Trp Ser Thr Ser Gly Phe Asp Leu Trp Glu Glu Asn Gln
225                 230                 235                 240
```

Gly Thr His Phe Phe Thr Ala Leu Val Gln Leu Lys Ala Leu Ser Tyr
                245                 250                 255

Gly Ile Pro Leu Ser Lys Thr Tyr Asn Asp Pro Gly Phe Thr Ser Trp
            260                 265                 270

Leu Glu Lys Gln Lys Asp Ala Leu Asn Ser Tyr Ile Asn Ser Ser Gly
        275                 280                 285

Phe Val Asn Ser Gly Lys Lys His Ile Val Glu Ser Pro Gln Leu Ser
    290                 295                 300

Ser Arg Gly Gly Leu Asp Ser Ala Thr Tyr Ile Ala Ala Leu Ile Thr
305                 310                 315                 320

His Asp Ile Gly Asp Asp Thr Tyr Thr Pro Phe Asn Val Asp Asn
            325                 330                 335

Ser Tyr Val Leu Asn Ser Leu Tyr Tyr Leu Val Asp Asn Lys Asn
            340                 345                 350

Arg Tyr Lys Ile Asn Gly Asn Tyr Lys Ala Gly Ala Ala Val Gly Arg
        355                 360                 365

Tyr Pro Glu Asp Val Tyr Asn Gly Val Gly Thr Ser Glu Gly Asn Pro
    370                 375                 380

Trp Gln Leu Ala Thr Ala Tyr Ala Gly Gln Thr Phe Tyr Thr Leu Ala
385                 390                 395                 400

Tyr Asn Ser Leu Lys Asn Lys Asn Leu Val Ile Glu Lys Leu Asn
            405                 410                 415

Tyr Asp Leu Tyr Asn Ser Phe Ile Ala Asp Leu Ser Lys Ile Asp Ser
            420                 425                 430

Ser Tyr Ala Ser Lys Asp Ser Leu Thr Leu Thr Tyr Gly Ser Asp Asn
        435                 440                 445

Tyr Lys Asn Val Ile Lys Ser Leu Leu Gln Phe Gly Asp Ser Phe Leu
    450                 455                 460

Lys Val Leu Leu Asp His Ile Asp Asp Asn Gly Gln Leu Thr Glu Glu
465                 470                 475                 480

Ile Asn Arg Tyr Thr Gly Phe Gln Ala Gly Ala Val Ser Leu Thr Trp
            485                 490                 495

Ser Ser Gly Ser Leu Leu Ser Ala Asn Arg Ala Arg Asn Lys Leu Ile
            500                 505                 510

Glu Leu Leu
        515

<210> SEQ ID NO 29
<211> LENGTH: 1548
<212> TYPE: DNA
<213> ORGANISM: Saccharomycopsis fibuligera

<400> SEQUENCE: 29
atgatcagat tgacagtctt tttgacagca gttttgctg cagttgctag ttgcgtcccg      60
gtggaattgg acaaaagaaa cactggacat ttccaagctt attctggata cacagttgcc     120
agatcaaatt tcactcaatg gattcatgag caaccagctg tttcttggta ttatcttttg     180
caaaacattg attatccaga aggacaattt aaatctgcaa agccaggcgt ggtagttgct     240
tctccatcca cctcagaacc tgactatttt tatcaatgga ccagagacac tgccattaca     300
tttctttcgt tgattgccga ggttgaagac catagcttta gcaataccac ccttgccaag     360
gtcgtggaat actacatcag caacacctac actttgcaaa gagtttcaaa cccaagtgga     420
aatttcgaca gtcctaacca cgacggtttg ggagaaccaa agttcaatgt tgacgacacc     480
gcctacacag cttcttgggg cagacctcaa aatgatggcc cagctttaag agcttatgcc     540

```
atttccagat atttgaatgc tgtggccaaa cataacaatg gcaaattgtt gctcgccggc    600
caaaacggaa tcccttattc tagtgcttct gacatttatt ggaaaattat taaaccagac    660
ttgcaacatg tcagcaccca ttggagcacc tctggctttg atctttggga agaaaatcaa    720
ggaactcatt tcttcactgc tttggttcaa ctcaaagctc ttagctacgg tattcctttg    780
agtaagactt acaacgaccc tggctttact tcctggcttg aaaaacaaaa agatgccttg    840
aactcataca tcaactcctc tggattcgtc aactcgggta aaaaacatat tgttgaaagc    900
ccacaacttt cttctagagg cggtttggac agtgccacct acattgctgc cttgatcacc    960
catgacattg tgatgatga cacttacact ccttttcaacg tggataattc ctatgtgctc   1020
aattccctat actacttgtt ggttgacaac aaaaacagat acaagatcaa tggcaactac   1080
aaagcaggtg ctgcggttgg aagatatcca agacgtct acaatggcgt tggaactagc    1140
gaaggtaacc catggcaatt ggctactgcc tacgctggtc aaactttcta cactttggct   1200
tacaactctt tgaaaaataa aaagaacttg gttatagaaa aactcaatta cgaccttttac   1260 aactccttta ttgctgactt gtccaagatt gactcttctt atgcttccaa agatagtttg   1320
actttgactt atggcagcga caactataaa aatgttatca aaagtttgct acaatttggt   1380
gactctttct tgaaagttct ccttgaccat attgatgaca atggccaact caccgaggaa   1440
atcaacagat acactggttt ccaagccggc gctgtctcct tgacttggag tagtggcagt   1500
ttgcttagtg caaacagagc tagaaacaaa ttgattgaac ttctttga                1548

<210> SEQ ID NO 30
<211> LENGTH: 1548
<212> TYPE: DNA
<213> ORGANISM: Artificial Sequence
<220> FEATURE:
<223> OTHER INFORMATION: Encoding SEQ ID NO: 28, codon-optimized for
      Saccharomyces cerevisiae

<400> SEQUENCE: 30
atgatcagat tgaccgtttt cttgaccgct gttttttgctg ctgttgcttc ttgtgttcca     60
gttgaattgg ataagagaaa caccggtcat ttccaagctt attctggtta taccgttgct    120
agatctaact tcacccaatg gattcatgaa caaccagctg tttcttggta ctacttgttg    180
caaaacatcg attacccaga aggtcaattc aaatctgcta aaccaggtgt tgttgttgct    240
tctccatcta catctgaacc agattacttc taccaatgga ctagagatac cgctattacc    300
ttcttgtcct tgattgctga agttgaagat cattcttttct ccaacactac cttggctaag    360
gttgtcgaat attcatttc caacacctac accttgcaaa gagtttctaa tccatccggt    420
aacttcgatt ctccaaatca tgatggttg ggtgaaccta agttcaacgt tgatgatact    480
gcttatacag cttcttgggg tagaccacaa aatgatggtc cagctttgag agcttacgct    540
atttctagat acttgaacgc tgttgctaag cacaacaacg gtaaattatt attggccggt    600
caaaacggta ttccttattc ttctgcttcc gatatctact ggaagattat taagccagac    660
ttgcaacatg tttctactca ttggtctacc tctggttttg atttgtggga agaaaatcaa    720
ggtactcatt tcttccaccgc tttggttcaa ttgaaggctt gtcttacgg tattccattg    780 tctaagacct acaatgatcc aggtttcact tcttggttgg aaaaacaaaa ggatgccttg    840
aactcctaca ttaactcttc cggtttcgtt aactctggta aaagcacat cgttgaatct    900 ccacaattgt catctagagg tggtttggat tctgctactt atattgctgc cttgatcacc    960
catgatatcg gtgatgatga tacttacacc ccattcaatg ttgataactc ctacgttttg   1020
```

```
aactccttgt attacctatt ggtcgacaac aagaacagat acaagatcaa cggtaactac    1080
aaagctggtg ctgctgttgg tagatatcct gaagatgttt acaacggtgt tggtacttct    1140
gaaggtaatc catggcaatt ggctactgct tatgctggtc aaacttttta caccttggcc    1200
tacaattcct tgaagaacaa gaagaacttg gtcatcgaaa agttgaacta cgacttgtac    1260
aactccttca ttgctgattt gtccaagatt gattcttcct acgcttctaa ggattctttg    1320
actttgacct acggttccga taactacaag aacgttatca gtccttgtt gcaattcggt    1380 gactcattct tgaaggtttt gttggatcac atcgatgaca acggtcaatt gactgaagaa    1440
atcaacagat acaccggttt tcaagctggt gcagtttctt tgacttggtc atctggttct    1500 tgttgtctg ctaatagagc cagaaacaag ttgatcgaat tattgtga               1548

<210> SEQ ID NO 31
<211> LENGTH: 391
<212> TYPE: PRT
<213> ORGANISM: Candida albicans

<400> SEQUENCE: 31

Met Phe Leu Lys Asn Ile Phe Ile Ala Leu Ala Ile Ala Leu Leu Val
1               5                   10                  15

Asp Ala Ser Pro Ala Lys Arg Ser Pro Gly Phe Val Thr Leu Asp Phe
            20                  25                  30

Asp Val Ile Lys Thr Pro Val Asn Ala Thr Gly Gln Glu Gly Lys Val
        35                  40                  45

Lys Arg Gln Ala Leu Pro Val Thr Leu Asn Asn Glu His Val Ser Tyr
    50                  55                  60

Ala Ala Asp Ile Thr Ile Gly Ser Asn Lys Gln Lys Phe Asn Val Ile
65                  70                  75                  80

Val Asp Thr Gly Ser Ser Asp Leu Trp Val Pro Asp Ala Ser Val Thr
                85                  90                  95

Cys Asp Lys Pro Arg Pro Gly Gln Ser Ala Asp Phe Cys Lys Gly Lys
            100                 105                 110

Gly Ile Tyr Thr Pro Lys Ser Ser Thr Thr Ser Gln Asn Leu Gly Thr
        115                 120                 125

Pro Phe Tyr Ile Gly Tyr Gly Asp Gly Ser Ser Ser Gln Gly Thr Leu
    130                 135                 140

Tyr Lys Asp Thr Val Gly Phe Gly Gly Ala Ser Ile Thr Lys Gln Val
145                 150                 155                 160

Phe Ala Asp Ile Thr Lys Thr Ser Ile Pro Gln Gly Ile Leu Gly Ile
                165                 170                 175

Gly Tyr Lys Thr Asn Glu Ala Ala Gly Asp Tyr Asp Asn Val Pro Val
            180                 185                 190

Thr Leu Lys Asn Gln Gly Val Ile Ala Lys Asn Ala Tyr Ser Leu Tyr
        195                 200                 205

Leu Asn Ser Pro Asn Ala Ala Thr Gly Gln Ile Ile Phe Gly Gly Val
    210                 215                 220

Asp Lys Ala Lys Tyr Ser Gly Ser Leu Ile Ala Val Pro Val Thr Ser
225                 230                 235                 240

Asp Arg Glu Leu Arg Ile Thr Leu Asn Ser Leu Lys Ala Val Gly Lys
                245                 250                 255

Asn Ile Asn Gly Asn Ile Asp Val Leu Leu Asp Ser Gly Thr Thr Ile
            260                 265                 270

Thr Tyr Leu Gln Gln Asp Val Ala Gln Asp Ile Ile Asp Ala Phe Gln
```

```
                    275                 280                 285
Ala Glu Leu Lys Ser Asp Gly Gln Gly His Thr Phe Tyr Val Thr Asp
    290                 295                 300

Cys Gln Thr Ser Gly Thr Val Asp Phe Asn Phe Asp Asn Asn Val Lys
305                 310                 315                 320

Ile Ser Val Pro Ala Ser Glu Phe Thr Ala Pro Leu Ser Tyr Ala Asn
                325                 330                 335

Gly Gln Pro Tyr Pro Lys Cys Gln Leu Leu Leu Gly Ile Ser Asp Ala
                340                 345                 350

Asn Ile Leu Gly Asp Asn Phe Leu Arg Ser Ala Tyr Leu Val Tyr Asp
                355                 360                 365

Leu Asp Asp Asp Lys Ile Ser Leu Ala Gln Val Lys Tyr Thr Ser Ala
    370                 375                 380

Ser Asn Ile Ala Ala Leu Thr
385                 390

<210> SEQ ID NO 32
<211> LENGTH: 391
<212> TYPE: PRT
<213> ORGANISM: Candida dubliensis

<400> SEQUENCE: 32

Met Phe Leu Lys Asn Ile Phe Ile Ala Leu Ala Phe Ala Leu Leu Val
1               5                   10                  15

Asp Ala Thr Pro Ala Lys Arg Ser Ala Gly Phe Val Thr Leu Asp Phe
            20                  25                  30

Glu Val Ile Lys Thr Pro Val Asn Ala Thr Gly Gln Asp Gly Lys Val
        35                  40                  45

Lys Arg Gln Ala Ile Pro Val Thr Leu Asn Asn Glu Val Val Ser Tyr
    50                  55                  60

Ala Ala Asp Ile Thr Val Gly Ser Asn Arg Gln Lys Phe Asn Val Val
65                  70                  75                  80

Val Asp Thr Gly Ser Ser Asp Leu Trp Ile Pro Asp Ala Ser Val Thr
                85                  90                  95

Cys Glu Asn Pro Pro Gly Gln Ser Ala Asp Phe Cys Lys Gly Lys
            100                 105                 110

Gly Leu Tyr Thr Pro Lys Ser Ser Thr Thr Ser Gln Arg Leu Gly Asn
        115                 120                 125

Pro Phe Tyr Ile Gly Tyr Gly Asp Gly Ser Ser His Gly Thr Leu
    130                 135                 140

Tyr Lys Asp Thr Val Gly Phe Gly Gly Ala Ser Ile Thr Lys Gln Val
145                 150                 155                 160

Phe Ala Asp Val Thr Lys Thr Ser Val Asn Gln Gly Ile Leu Gly Ile
                165                 170                 175

Gly Tyr Lys Thr Asn Glu Ala Ala Gly Asp Tyr Asp Asn Val Pro Val
            180                 185                 190

Thr Leu Lys Lys Gln Gly Val Ile Ala Lys Asn Ala Tyr Ser Leu Tyr
        195                 200                 205

Leu Asn Ser Pro Asn Ala Ala Thr Gly Gln Ile Ile Phe Gly Gly Val
    210                 215                 220

Asp Lys Ala Lys Tyr Ser Gly Ser Leu Ile Ala Val Pro Val Thr Ser
225                 230                 235                 240

Asp Arg Glu Leu Arg Ile Thr Leu Asn Ser Ile Lys Ala Ala Gly Lys
                245                 250                 255
```

Asn Ile Asn Gly Asn Ile Asp Val Leu Leu Asp Ser Gly Thr Thr Ile
            260                 265                 270

Thr Tyr Phe Gln Gln Asp Val Ala Gln Gly Ile Ile Asp Ala Phe His
        275                 280                 285

Ala Glu Leu Lys Gln Asp Gly Asn Gly Asn Ser Leu Tyr Val Ala Asp
    290                 295                 300

Cys Gln Thr Ser Gly Thr Val Asp Phe Asn Phe Ala Asn Asn Ala Lys
305                 310                 315                 320

Ile Ser Val Pro Ala Ser Glu Phe Thr Ala Ser Leu Phe Tyr Thr Asn
                325                 330                 335

Gly Gln Pro Tyr Pro Gln Cys Gln Leu Leu Leu Gly Ile Asn Asp Ala
            340                 345                 350

Asn Ile Leu Gly Asp Asn Phe Leu Arg Ser Ala Tyr Ile Val Tyr Asp
        355                 360                 365

Leu Asp Asp Asn Glu Ile Ser Leu Ala Gln Val Lys Tyr Thr Ser Ala
    370                 375                 380

Ser Asn Ile Ala Ala Leu Thr
385                 390

<210> SEQ ID NO 33
<211> LENGTH: 394
<212> TYPE: PRT
<213> ORGANISM: Candida tropicalis

<400> SEQUENCE: 33

Met Phe Leu Ser Gln Leu Val Val Phe Leu Val Phe Gly Leu Leu Val
1               5                   10                  15

Thr Ala Ser Pro Thr Thr Ser Pro Pro Gly Phe Ile Ser Leu Asp Phe
            20                  25                  30

Val Ile Ile Lys Thr Gln Lys Asn Ile Val Pro Asn Glu Asn Ile Ile
        35                  40                  45

Val Ser Lys Arg Gln Pro Val Pro Val Thr Leu Ile Lys Glu Gln Ile
    50                  55                  60

Ala Tyr Ala Ala Glu Ile Thr Ile Gly Ser Asn Asn Gln Lys Gln Thr
65                  70                  75                  80

Val Ile Ile Asp Thr Gly Ser Ser Asp Leu Trp Val Val Asp Lys Asn
            85                  90                  95

Ala Thr Cys Val Arg Arg Phe Glu Gln Gln Val Gln Asp Phe Cys Lys
        100                 105                 110

Ala Asn Gly Thr Tyr Asp Pro Ile Thr Ser Ser Ser Ala Lys Lys Leu
    115                 120                 125

Gly Thr Val Phe Asp Ile Ser Tyr Gly Asp Lys Thr Asn Ser Ser Gly
130                 135                 140

Asn Trp Tyr Lys Asp Thr Ile Lys Ile Gly Gly Ile Thr Ile Thr Asn
145                 150                 155                 160

Gln Gln Phe Ala Asn Val Lys Ser Thr Val Ala Gln Gly Val Met
            165                 170                 175

Gly Ile Gly Phe Lys Thr Asn Glu Ala Ser Asn Val Thr Tyr Asp Asn
        180                 185                 190

Val Pro Ile Thr Leu Lys Lys Gln Gly Ile Ile Ser Lys Ser Ala Tyr
    195                 200                 205

Ser Leu Tyr Leu Asn Ser Ser Asp Ser Thr Thr Gly Glu Ile Ile Phe
210                 215                 220

Gly Gly Val Asp Asn Ala Lys Tyr Thr Gly Lys Leu Ile Asp Leu Pro
225                 230                 235                 240

```
Val Thr Ser Asn Arg Glu Leu Arg Ile Tyr Leu Asn Ser Leu Thr Ile
                245                 250                 255

Gly Val Thr Asn Ile Ser Ala Ser Met Asp Val Leu Leu Asp Ser Gly
                260                 265                 270

Thr Thr Phe Ser Tyr Leu Gln Gln Asp Val Leu Gln His Val Val Asp
            275                 280                 285

Lys Phe Asn Gly Gln Leu Ile His Asp Ala Leu Gly Asn Pro Leu His
        290                 295                 300

Leu Val Asp Cys Asp Leu Pro Gly Asn Ile Asp Phe Glu Phe Ser Asn
305                 310                 315                 320

Ser Ser Lys Ile Ser Val Pro Ser Glu Phe Ala Val Lys Leu Tyr
                325                 330                 335

Thr Ile Asn Gly Glu Leu Tyr Pro Lys Cys Gln Leu Ser Ile Leu Thr
                340                 345                 350

Ser Ser Ala Asn Ile Leu Gly Asn Asn Phe Leu Arg Ser Ala Tyr Ile
            355                 360                 365

Val Tyr Asp Leu Glu Asp Lys Lys Ile Ser Leu Ala Gln Val Lys Tyr
370                 375                 380

Thr Ser Lys Ser Asn Ile Leu Pro Leu Thr
385                 390

<210> SEQ ID NO 34
<211> LENGTH: 580
<212> TYPE: PRT
<213> ORGANISM: Clavispora lusitaniae

<400> SEQUENCE: 34

Met Lys Phe Leu Ser Leu Val Thr Leu Ala Ala Ala Val Ser Gly Ala
1               5                   10                  15

Thr Val Glu Asn Leu Arg Arg Glu Glu Asn Lys Gln Glu Thr Ile Val
                20                  25                  30

Pro Leu Arg Leu Asp Phe Ser Val Leu Arg Gly Ser Ser Pro Gln Asp
            35                  40                  45

Met Ala Pro Gly Arg Gly Ala Ala Leu Ala Lys Arg Asp Gly Gln Ala
        50                  55                  60

Glu Leu Thr Ile Gln Asn Glu Gln Thr Tyr Tyr Ser Ala Asp Leu Lys
65                  70                  75                  80

Leu Gly Ser Asp His Gln Glu Val Ser Val Leu Val Asp Thr Gly Ser
                85                  90                  95

Ser Asp Leu Trp Ile Met Ala Ser Asp Val Glu Cys Tyr Ser Ser Gln
                100                 105                 110

Ser Gln Ser Ser Ser Thr Lys Arg Ser Val Gly Asp His Phe Gly Arg
            115                 120                 125

Arg Arg Ala Leu Ser Glu Asp Asp Leu Ala His Ala Leu Phe Gln Glu
        130                 135                 140

Gln Ser Asp Asn Thr Pro Asp Ala Ser Gln Pro Leu Gln Asp Lys Arg
145                 150                 155                 160

Asp Thr Glu Ser Met Ala Phe Pro Asp Ile Ala Ser Ile Leu Glu Ser
                165                 170                 175

Phe Thr Ile Ile Glu Thr Asn Ile Pro Gln Pro Ser Gly Ser Ser Ser
                180                 185                 190

Pro Asp Val Ser Gly Ser Gly Gly Ser Gly Gly Tyr Gly Gly Ser
            195                 200                 205

Asn Thr Cys Thr Ser Glu Gly Ser Phe Asn Thr Asp Ser Ser Asp Thr
```

```
                    210                 215                 220
        Phe His Met Asn Ser Ser Ala Pro Asp Phe Ala Ile Gln Tyr Ala Asp
        225                 230                 235                 240

Gly Thr Ser Ala Arg Gly Phe Trp Gly Thr Asp Tyr Val Ser Ile Asp
                            245                 250                 255

Thr Ala Asn Val Ser Asp Val Ser Phe Ala Val Val Asn Glu Thr Asp
                                260                 265                 270

Ser Gly Phe Gly Val Leu Gly Ile Gly Leu Pro Gly Leu Glu Thr Thr
                        275                 280                 285

Tyr Ser Gly Thr Ser Gly Ser Tyr Met Tyr Glu Asn Phe Pro Met Arg
                        290                 295                 300

Leu Lys Ser Ser Gly Val Ile His Lys Asn Val Tyr Ser Leu Tyr Leu
        305                 310                 315                 320

Asn Lys Ala Asp Ala Gln Ser Gly Ser Val Leu Phe Gly Gly Val Asp
                            325                 330                 335

His Ala Lys Tyr Thr Gly Gln Leu Thr Thr Val Pro Leu Val Asn Ile
                        340                 345                 350

Tyr Ser Lys Tyr Tyr Lys Asn Pro Ile Arg Leu Asp Val Ala Leu Asp
                        355                 360                 365

Ser Ile Ser Phe Glu Ser Thr Ser Ser Asn Ile Thr Ala Tyr Lys Gly
        370                 375                 380

Asn Leu Ala Ala Leu Leu Asp Ser Gly Thr Thr Tyr Ser Tyr Leu Pro
        385                 390                 395                 400

Thr Ser Val Phe Glu Arg Phe Ile Asn Val Val Asn Ala Gln Ser Ser
                            405                 410                 415

Ser Ile Gly Leu Tyr Gln Leu Ser Cys Ser Tyr Asn Thr Asp Ser Ala
                        420                 425                 430

Ser Val Val Phe Asn Phe Ser Gly Ala Gln Ile Lys Val Pro Leu Ser
                        435                 440                 445

Asp Leu Val Met Thr Tyr Arg Asn Arg Cys Tyr Leu Thr Val Leu Glu
                        450                 455                 460

Gln Ser Ser Ser Ser Ser Ser Ser Ser Ser Thr Pro Glu Tyr
        465                 470                 475                 480

Ala Val Leu Gly Asp Asn Phe Leu Arg Asn Ala Tyr Val Val Tyr Asn
                            485                 490                 495

Leu Asp Asp Tyr Glu Ile Ser Leu Ala Gln Ala Lys Tyr Thr Asp Glu
                        500                 505                 510

Glu Asp Ile Glu Ile Val Ser Ser Val Pro Ser Ala Val Lys Ala
                        515                 520                 525

Gly Gly Tyr Ser Ser Thr Ser Leu Ser Glu Ser Ser Asp Thr Ser Glu
                        530                 535                 540

Val Thr Thr Leu Ser Ser Ser Ser Leu Lys Lys Ser Gly Ala Pro Arg
        545                 550                 555                 560

Leu Ala Pro Trp Lys Glu Met Gly Ala Ala Leu Met Val Leu Leu Ala
                            565                 570                 575

Phe Ala Leu Met
                    580

<210> SEQ ID NO 35
<211> LENGTH: 406
<212> TYPE: PRT
<213> ORGANISM: Clavispora lusitaniae

<400> SEQUENCE: 35
```

```
Met Gln Leu Ser Ala Leu Val Ala Ile Ala Thr Ala Leu Ile Ala Gly
1               5                   10                  15

Ala Asp Ala Lys Lys Phe Ser Thr Lys Leu Asn Lys Val Pro Ile Glu
            20                  25                  30

Glu Thr Leu Asp Ala Arg Ser Phe Ser Gly Tyr Thr Lys Ser Leu Ala
        35                  40                  45

Asn Lys Tyr Ile Gly Ala Phe Gly Ala Gly Val Gly Ala Gly Ser
50                      55                  60

Gly Val Gln Gln Val Ala Glu Val Pro Phe Val Ala Asn Ser Glu His
65                  70                  75                  80

Glu Ala Pro Leu Thr Asn Tyr Leu Asn Ala Gln Tyr Phe Thr Glu Ile
                85                  90                  95

Gln Leu Gly Thr Pro Gly Gln Thr Phe Lys Val Ile Leu Asp Thr Gly
            100                 105                 110

Ser Ser Asn Leu Trp Val Pro Ser Arg Asp Cys Ser Ser Leu Ala Cys
        115                 120                 125

Phe Leu His Thr Lys Tyr Asp His Asp Glu Ser Ser Thr Tyr Lys Ala
        130                 135                 140

Asn Gly Ser Glu Phe Ser Ile Gln Tyr Gly Ser Gly Ala Met Glu Gly
145                 150                 155                 160

Tyr Ile Ser Gln Asp Val Leu Ala Ile Gly Asp Leu Val Ile Pro Lys
            165                 170                 175

Gln Asp Phe Ala Glu Ala Thr Ser Glu Pro Gly Leu Ala Phe Ala Phe
        180                 185                 190

Gly Lys Phe Asp Gly Ile Leu Gly Leu Ala Tyr Asp Thr Ile Ser Val
        195                 200                 205

Asn Lys Ile Val Pro Pro Val Tyr Asn Ala Ile Ala Gln Gly Leu Leu
210                 215                 220

Asp Ala Pro Gln Phe Gly Phe Tyr Leu Gly Asp Thr Asn Lys Asn Glu
225                 230                 235                 240

Glu Asn Gly Gly Val Ala Thr Phe Gly Gly Tyr Asp Glu Ala Leu Phe
            245                 250                 255

Lys Gly Asp Leu Thr Trp Leu Pro Val Arg Arg Lys Ala Tyr Trp Glu
        260                 265                 270

Val Ser Phe Asp Gly Ile Gly Leu Gly Asp Glu Tyr Ala Glu Leu Thr
        275                 280                 285

Ala Thr Gly Ala Ala Ile Asp Thr Gly Thr Ser Leu Ile Thr Leu Pro
        290                 295                 300

Ser Ser Leu Ala Glu Ile Ile Asn Ala Lys Ile Gly Ala Thr Lys Ser
305                 310                 315                 320

Trp Ser Gly Gln Tyr Gln Val Asp Cys Ala Thr Arg Asp Asn Leu Pro
            325                 330                 335

Asp Leu Thr Leu Thr Phe Ala Gly Tyr Asn Phe Thr Leu Ser Pro Tyr
        340                 345                 350

Asp Tyr Thr Leu Glu Val Ser Gly Ser Cys Ile Ser Ala Phe Thr Pro
        355                 360                 365

Met Asp Phe Pro Glu Pro Ile Gly Asp Leu Ala Ile Val Gly Asp Ala
        370                 375                 380

Phe Leu Arg Arg Tyr Tyr Ser Val Tyr Asp Leu Lys Lys Asp Ala Val
385                 390                 395                 400

Gly Leu Ala Pro Ala Lys
            405
```

-continued

```
<210> SEQ ID NO 36
<211> LENGTH: 405
<212> TYPE: PRT
<213> ORGANISM: Saccharomyces cerevisiae

<400> SEQUENCE: 36

Met Phe Ser Leu Lys Ala Leu Leu Pro Leu Ala Leu Leu Leu Val Ser
1               5                   10                  15

Ala Asn Gln Val Ala Ala Lys Val His Lys Ala Lys Ile Tyr Lys His
                20                  25                  30

Glu Leu Ser Asp Glu Met Lys Glu Val Thr Phe Glu Gln His Leu Ala
            35                  40                  45

His Leu Gly Gln Lys Tyr Leu Thr Gln Phe Glu Lys Ala Asn Pro Glu
        50                  55                  60

Val Val Phe Ser Arg Glu His Pro Phe Phe Thr Glu Gly Gly His Asp
65                  70                  75                  80

Val Pro Leu Thr Asn Tyr Leu Asn Ala Gln Tyr Tyr Thr Asp Ile Thr
                85                  90                  95

Leu Gly Thr Pro Pro Gln Asn Phe Lys Val Ile Leu Asp Thr Gly Ser
            100                 105                 110

Ser Asn Leu Trp Val Pro Ser Asn Glu Cys Gly Ser Leu Ala Cys Phe
        115                 120                 125

Leu His Ser Lys Tyr Asp His Glu Ala Ser Ser Tyr Lys Ala Asn
130                 135                 140

Gly Thr Glu Phe Ala Ile Gln Tyr Gly Thr Gly Ser Leu Glu Gly Tyr
145                 150                 155                 160

Ile Ser Gln Asp Thr Leu Ser Ile Gly Asp Leu Thr Ile Pro Lys Gln
                165                 170                 175

Asp Phe Ala Glu Ala Thr Ser Glu Pro Gly Leu Thr Phe Ala Phe Gly
            180                 185                 190

Lys Phe Asp Gly Ile Leu Gly Leu Gly Tyr Asp Thr Ile Ser Val Asp
        195                 200                 205

Lys Val Val Pro Pro Phe Tyr Asn Ala Ile Gln Gln Asp Leu Leu Asp
210                 215                 220

Glu Lys Arg Phe Ala Phe Tyr Leu Gly Asp Thr Ser Lys Asp Thr Glu
225                 230                 235                 240

Asn Gly Gly Glu Ala Thr Phe Gly Gly Ile Asp Glu Ser Lys Phe Lys
                245                 250                 255

Gly Asp Ile Thr Trp Leu Pro Val Arg Arg Lys Ala Tyr Trp Glu Val
            260                 265                 270

Lys Phe Glu Gly Ile Gly Leu Gly Asp Glu Tyr Ala Glu Leu Glu Ser
        275                 280                 285

His Gly Ala Ala Ile Asp Thr Gly Thr Ser Leu Ile Thr Leu Pro Ser
    290                 295                 300

Gly Leu Ala Glu Met Ile Asn Ala Glu Ile Gly Ala Lys Lys Gly Trp
305                 310                 315                 320

Thr Gly Gln Tyr Thr Leu Asp Cys Asn Thr Arg Asp Asn Leu Pro Asp
                325                 330                 335

Leu Ile Phe Asn Phe Asn Gly Tyr Asn Phe Thr Ile Gly Pro Tyr Asp
            340                 345                 350

Tyr Thr Leu Glu Val Ser Gly Ser Cys Ile Ser Ala Ile Thr Pro Met
        355                 360                 365

Asp Phe Pro Glu Pro Val Gly Pro Leu Ala Ile Val Gly Asp Ala Phe
    370                 375                 380
```

Leu Arg Lys Tyr Tyr Ser Ile Tyr Asp Leu Gly Asn Asn Ala Val Gly
385                 390                 395                 400

Leu Ala Lys Ala Ile
            405

<210> SEQ ID NO 37
<211> LENGTH: 396
<212> TYPE: PRT
<213> ORGANISM: Yarrowia lipolytica

<400> SEQUENCE: 37

Met Lys Phe Thr Ala Ala Val Ser Val Leu Ala Ala Gly Ser Val
1               5                   10                  15

Ser Ala Ala Val Ser Lys Val Ser Ile Asn Lys Met Ser Thr Ala Glu
                20                  25                  30

Leu Leu Gly Lys Glu Asn Gly Phe Glu Asp His Leu Arg Met Met Gly
            35                  40                  45

Gln Lys Tyr Met Gly Lys Phe Gln Lys Leu Gly Glu Phe Asn Glu Leu
        50                  55                  60

Ala Ser Ile Gln Asp Val Ser Asn Ser Pro Leu Thr Asn Tyr Leu Asn
65                  70                  75                  80

Ala Gln Tyr Tyr Thr Glu Ile Glu Ile Gly Thr Pro Pro Gln Lys Phe
                85                  90                  95

Asn Val Ile Leu Asp Thr Gly Ser Ser Asn Leu Trp Val Pro Ser Val
            100                 105                 110

Gln Cys Asn Ser Ile Ala Cys Tyr Leu His Gln Lys Tyr Asp Ser Ala
        115                 120                 125

Ala Ser Ser Ser Tyr Lys Ala Asn Gly Thr Ala Phe Glu Ile Gln Tyr
130                 135                 140

Gly Ser Gly Ser Met Glu Gly Phe Val Ser Gln Asp Thr Leu Lys Leu
145                 150                 155                 160

Gly Ser Leu Val Leu Pro Glu Gln Asp Phe Ala Glu Ala Thr Ser Glu
                165                 170                 175

Pro Gly Leu Ala Phe Ala Phe Gly Lys Phe Asp Gly Ile Leu Gly Leu
            180                 185                 190

Ala Tyr Asp Thr Ile Ser Val Asn Lys Ile Val Pro Pro Val Tyr Asn
        195                 200                 205

Ala Val Asn Arg Gly Leu Leu Asp Lys Asn Gln Phe Ser Phe Leu
210                 215                 220

Gly Asp Thr Asn Lys Gly Thr Asp Gly Val Ala Thr Phe Gly Gly
225                 230                 235                 240

Val Asp Glu Asp Tyr Phe Glu Gly Lys Ile Thr Trp Leu Pro Val Arg
                245                 250                 255

Arg Lys Ala Tyr Trp Glu Val Glu Phe Asn Ser Ile Thr Leu Gly Asp
            260                 265                 270

Gln Thr Ala Glu Leu Val Asn Thr Gly Ala Ala Ile Asp Thr Gly Thr
        275                 280                 285

Ser Leu Leu Ala Leu Pro Ser Gly Leu Ala Glu Val Leu Asn Ser Glu
290                 295                 300

Ile Gly Ala Thr Lys Gly Trp Ser Gly Gln Tyr Thr Val Glu Cys Asp
305                 310                 315                 320

Lys Val Asp Ser Leu Pro Asp Leu Thr Phe Asn Phe Ala Gly Tyr Asn
                325                 330                 335

Phe Thr Ile Gly Pro Arg Asp Tyr Thr Leu Glu Leu Ser Gly Ser Cys
            340                 345                 350

Val Ser Ala Phe Thr Gly Phe Asp Ile Pro Ala Pro Val Gly Pro Ile
    355                 360                 365

Ala Ile Ile Gly Asp Ala Phe Leu Arg Arg Tyr Tyr Ser Val Tyr Asp
    370                 375                 380

Leu Asp His Asp Ala Val Gly Leu Ala Lys Ala Lys
385                 390                 395

<210> SEQ ID NO 38
<211> LENGTH: 408
<212> TYPE: PRT
<213> ORGANISM: Meyerozyma guilliermondii

<400> SEQUENCE: 38

Met Lys Leu Ser Ile Ser Val Leu Gly Ala Val Ala Phe Ala Leu Phe
1               5                   10                  15

Gly Cys Ala Asp Ala Ala Val His Ser Ala Lys Leu Asn Lys Ile Pro
                20                  25                  30

Val Glu Glu Thr Leu Ala Ala His Arg Phe Lys Glu Tyr Thr Ser Gly
            35                  40                  45

Leu Ala Ala Lys Tyr Leu Thr Ala Phe Ser Thr Ser Glu Gly Ile Thr
        50                  55                  60

Asp Gln Thr Gln Gln Gln Ile Leu Gln Gln Val Pro Phe Val Asp Gly
65                  70                  75                  80

Lys Tyr Asp Ser Asp Leu Ser Asn Tyr Val Asn Ala Gln Tyr Phe Thr
                85                  90                  95

Glu Ile Gln Leu Gly Thr Pro Gly Gln Thr Phe Lys Val Ile Leu Asp
            100                 105                 110

Thr Gly Ser Ser Asn Leu Trp Val Pro Ser Ala Asp Cys Ser Ser Leu
        115                 120                 125

Ala Cys Phe Leu His Thr Lys Tyr Asp His Asp Ser Ser Ser Thr Tyr
130                 135                 140

Lys Ala Asn Gly Ser Glu Phe Ser Ile Gln Tyr Gly Ser Gly Ala Met
145                 150                 155                 160

Glu Gly Tyr Val Ser Arg Asp Thr Leu Ala Leu Gly Asp Leu Ile Ile
                165                 170                 175

Pro Arg Gln Asp Phe Ala Glu Ala Thr Ser Glu Pro Gly Leu Ala Phe
            180                 185                 190

Ala Phe Gly Lys Phe Asp Gly Ile Leu Gly Leu Ala Tyr Asn Thr Ile
        195                 200                 205

Ser Val Asn Lys Ile Val Pro Pro Ile Tyr Asn Ala Ile Asp Gln Gly
210                 215                 220

Leu Leu Asp Glu Pro Val Phe Ala Phe Arg Leu Gly Asp Thr Ser Lys
225                 230                 235                 240

Asp Glu Asn Asp Gly Gly Val Ala Thr Phe Gly Gly Tyr Asp Lys Ser
                245                 250                 255

Gln Phe Thr Gly Lys Ile Thr Trp Leu Pro Val Arg Arg Lys Ala Tyr
            260                 265                 270

Trp Glu Val Ser Phe Glu Gly Ile Gly Leu Gly Asp Glu Tyr Ala Glu
        275                 280                 285

Leu Thr Ser Thr Gly Ala Ala Ile Asp Thr Gly Thr Ser Leu Ile Thr
        290                 295                 300

Leu Pro Ser Ser Leu Ala Glu Ile Met Asn Thr Lys Ile Gly Ala Thr
305                 310                 315                 320

Lys Ser Trp Ser Gly Gln Tyr Gln Ile Asp Cys Glu Lys Arg Asp Ser

```
                        325                 330                 335
Leu Pro Asp Leu Thr Leu Asn Phe Ser Gly Tyr Asn Phe Thr Leu Ser
            340                 345                 350

Pro Tyr Asp Tyr Thr Leu Glu Val Gly Gly Ser Cys Ile Ser Val Phe
            355                 360                 365

Thr Pro Met Asp Phe Pro Glu Pro Ile Gly Asp Leu Ala Ile Val Gly
            370                 375                 380

Asp Ala Phe Leu Arg Arg Tyr Tyr Ser Ile Tyr Asp Leu Lys Lys Asp
385                 390                 395                 400

Ala Val Gly Leu Ala Lys Ser Val
                405

<210> SEQ ID NO 39
<211> LENGTH: 395
<212> TYPE: PRT
<213> ORGANISM: Aspergillus fumigatus

<400> SEQUENCE: 39

Met Val Val Phe Ser Lys Val Thr Ala Val Val Gly Leu Ser Thr
1               5                   10                  15

Ile Val Ser Ala Val Pro Val Val Gln Pro Arg Lys Gly Phe Thr Ile
            20                  25                  30

Asn Gln Val Ala Arg Pro Val Thr Asn Lys Lys Thr Val Asn Leu Pro
        35                  40                  45

Ala Val Tyr Ala Asn Ala Leu Thr Lys Tyr Gly Gly Thr Val Pro Asp
    50                  55                  60

Ser Val Lys Ala Ala Ser Ser Gly Ser Ala Val Thr Thr Pro Glu
65                  70                  75                  80

Gln Tyr Asp Ser Glu Tyr Leu Thr Pro Val Lys Val Gly Gly Thr Thr
                85                  90                  95

Leu Asn Leu Asp Phe Asp Thr Gly Ser Ala Asp Leu Trp Val Phe Ser
            100                 105                 110

Ser Glu Leu Ser Ala Ser Gln Ser Ser Gly His Ala Ile Tyr Lys Pro
        115                 120                 125

Ser Ala Asn Ala Gln Lys Leu Asn Gly Tyr Thr Trp Lys Ile Gln Tyr
    130                 135                 140

Gly Asp Gly Ser Ser Ala Ser Gly Asp Val Tyr Lys Asp Thr Val Thr
145                 150                 155                 160

Val Gly Gly Val Thr Ala Gln Ser Gln Ala Val Glu Ala Ala Ser His
                165                 170                 175

Ile Ser Ser Gln Phe Val Gln Asp Lys Asp Asn Asp Gly Leu Leu Gly
            180                 185                 190

Leu Ala Phe Ser Ser Ile Asn Thr Val Ser Pro Arg Pro Gln Thr Thr
        195                 200                 205

Phe Phe Asp Thr Val Lys Ser Gln Leu Asp Ser Pro Leu Phe Ala Val
    210                 215                 220

Thr Leu Lys Tyr His Ala Pro Gly Thr Tyr Asp Phe Gly Tyr Ile Asp
225                 230                 235                 240

Asn Ser Lys Phe Gln Gly Glu Leu Thr Tyr Thr Asp Val Asp Ser Ser
                245                 250                 255

Gln Gly Phe Trp Met Phe Thr Ala Asp Gly Tyr Gly Val Gly Asn Gly
            260                 265                 270

Ala Pro Asn Ser Asn Ser Ile Gly Ile Ala Asp Thr Gly Thr Thr
        275                 280                 285
```

```
Leu Leu Leu Asp Asp Ser Val Val Ala Asp Tyr Tyr Arg Gln Val
            290             295                 300

Ser Gly Ala Lys Asn Ser Asn Gln Tyr Gly Gly Tyr Val Phe Pro Cys
305                 310                 315                 320

Ser Thr Lys Leu Pro Ser Phe Thr Thr Val Ile Gly Gly Tyr Asn Ala
                325                 330                 335

Val Val Pro Gly Glu Tyr Ile Asn Tyr Ala Pro Val Thr Asp Gly Ser
            340                 345                 350

Ser Thr Cys Tyr Gly Gly Ile Gln Ser Asn Ser Gly Leu Gly Phe Ser
            355                 360                 365

Ile Phe Gly Asp Ile Phe Leu Lys Ser Gln Tyr Val Val Phe Asp Ser
370                 375                 380

Gln Gly Pro Arg Leu Gly Phe Ala Pro Gln Ala
385                 390                 395

<210> SEQ ID NO 40
<211> LENGTH: 390
<212> TYPE: PRT
<213> ORGANISM: Saccharomycopsis fibuligera

<400> SEQUENCE: 40

Met Leu Phe Ser Lys Ser Leu Leu Leu Ser Val Leu Ala Ser Leu Ser
1               5                   10                  15

Phe Ala Ala Pro Val Glu Lys Arg Glu Lys Thr Leu Thr Leu Asp Phe
                20                  25                  30

Asp Val Lys Arg Ile Ser Ser Lys Ala Lys Asn Val Thr Val Ala Ser
            35                  40                  45

Ser Pro Gly Phe Arg Arg Asn Leu Arg Ala Ala Ser Asp Ala Gly Val
50                  55                  60

Thr Ile Ser Leu Glu Asn Glu Tyr Ser Phe Tyr Leu Thr Ile Glu
65                  70                  75                  80

Ile Gly Thr Pro Gly Gln Lys Leu Gln Val Asp Val Asp Thr Gly Ser
                85                  90                  95

Ser Asp Leu Trp Val Pro Gly Gln Gly Thr Ser Ser Leu Tyr Gly Thr
            100                 105                 110

Tyr Asp His Thr Lys Ser Thr Ser Tyr Lys Lys Asp Arg Ser Gly Phe
            115                 120                 125

Ser Ile Ser Tyr Gly Asp Gly Ser Ser Ala Arg Gly Asp Trp Ala Gln
130                 135                 140

Glu Thr Val Ser Ile Gly Gly Ala Ser Ile Thr Gly Leu Glu Phe Gly
145                 150                 155                 160

Asp Ala Thr Ser Gln Asp Val Gly Gln Gly Leu Leu Gly Ile Gly Leu
                165                 170                 175

Lys Gly Asn Glu Ala Ser Ala Gln Ser Ser Asn Ser Phe Thr Tyr Asp
            180                 185                 190

Asn Leu Pro Leu Lys Leu Lys Asp Gln Gly Leu Ile Asp Lys Ala Ala
            195                 200                 205

Tyr Ser Leu Tyr Leu Asn Ser Glu Asp Ala Thr Ser Gly Ser Ile Leu
210                 215                 220

Phe Gly Gly Ser Asp Ser Ser Lys Tyr Ser Gly Ser Leu Ala Thr Leu
225                 230                 235                 240

Asp Leu Val Asn Ile Asp Asp Glu Gly Asp Ser Thr Ser Gly Ala Val
                245                 250                 255

Ala Phe Phe Val Glu Leu Glu Gly Ile Glu Ala Gly Ser Ser Ser Ile
            260                 265                 270
```

```
Thr Lys Thr Thr Tyr Pro Ala Leu Leu Asp Ser Gly Thr Thr Leu Ile
        275                 280                 285

Tyr Ala Pro Ser Ser Ile Ala Ser Ser Ile Gly Arg Glu Tyr Gly Thr
290                 295                 300

Tyr Ser Tyr Ser Tyr Gly Gly Tyr Val Thr Ser Cys Asp Ala Thr Gly
305                 310                 315                 320

Pro Asp Phe Lys Phe Ser Phe Asn Gly Lys Thr Ile Thr Val Pro Phe
                325                 330                 335

Ser Asn Leu Leu Phe Gln Asn Ser Glu Gly Asp Ser Glu Cys Leu Val
                340                 345                 350

Gly Val Leu Ser Ser Gly Ser Asn Tyr Tyr Ile Leu Gly Asp Ala Phe
                355                 360                 365

Leu Arg Ser Ala Tyr Val Tyr Tyr Asp Ile Asp Asn Ser Gln Val Gly
        370                 375                 380

Ile Ala Gln Ala Lys Tyr
385                 390

<210> SEQ ID NO 41
<211> LENGTH: 521
<212> TYPE: PRT
<213> ORGANISM: Bacillus subtilis

<400> SEQUENCE: 41

Met Gly Leu Gly Lys Lys Leu Ser Val Ala Val Ala Ala Ser Phe Met
1               5                   10                  15

Ser Leu Thr Ile Ser Leu Pro Gly Val Gln Ala Ala Glu Asn Pro Gln
            20                  25                  30

Leu Lys Glu Asn Leu Thr Asn Phe Val Pro Lys His Ser Leu Val Gln
        35                  40                  45

Ser Glu Leu Pro Ser Val Ser Asp Lys Ala Ile Lys Gln Tyr Leu Lys
    50                  55                  60

Gln Asn Gly Lys Val Phe Lys Gly Asn Pro Ser Glu Arg Leu Lys Leu
65                  70                  75                  80

Ile Asp Gln Thr Thr Asp Asp Leu Gly Tyr Lys His Phe Arg Tyr Val
                85                  90                  95

Pro Val Val Asn Gly Val Pro Val Lys Asp Ser Gln Val Ile Ile His
            100                 105                 110

Val Asp Lys Ser Asn Asn Val Tyr Ala Ile Asn Gly Glu Leu Asn Asn
        115                 120                 125

Asp Val Ser Ala Lys Thr Ala Asn Ser Lys Leu Ser Ala Asn Gln
    130                 135                 140

Ala Leu Asp His Ala Tyr Lys Ala Ile Gly Lys Ser Pro Glu Ala Val
145                 150                 155                 160

Ser Asn Gly Thr Val Ala Asn Lys Asn Lys Ala Glu Leu Lys Ala Ala
                165                 170                 175

Ala Thr Lys Asp Gly Lys Tyr Arg Leu Ala Tyr Asp Thr Ile Arg
            180                 185                 190

Tyr Ile Glu Pro Glu Pro Ala Asn Trp Glu Val Thr Val Asp Ala Glu
        195                 200                 205

Thr Gly Lys Ile Leu Lys Lys Gln Asn Lys Val Glu His Ala Ala Thr
    210                 215                 220

Thr Gly Thr Gly Thr Thr Leu Lys Gly Lys Thr Val Ser Leu Asn Ile
225                 230                 235                 240

Ser Ser Glu Ser Gly Lys Tyr Val Leu Arg Asp Leu Ser Lys Pro Thr
```

```
                    245                 250                 255
Gly Thr Gln Ile Ile Thr Tyr Asp Leu Gln Asn Arg Glu Tyr Asn Leu
                260                 265                 270

Pro Gly Thr Leu Val Ser Ser Thr Asn Gln Phe Thr Thr Ser Ser
            275                 280                 285

Gln Arg Ala Ala Val Asp Ala His Tyr Asn Leu Gly Lys Val Tyr Asp
        290                 295                 300

Tyr Phe Tyr Gln Lys Phe Asn Arg Asn Ser Tyr Asp Asn Lys Gly Gly
305                 310                 315                 320

Lys Ile Val Ser Val His Tyr Gly Ser Arg Tyr Asn Asn Ala Ala
            325                 330                 335

Trp Ile Gly Asp Gln Met Ile Tyr Gly Asp Gly Asp Gly Ser Phe Phe
                340                 345                 350

Ser Pro Leu Ser Gly Ser Met Asp Val Thr Ala His Glu Met Thr His
            355                 360                 365

Gly Val Thr Gln Glu Thr Ala Asn Leu Asn Tyr Glu Asn Gln Pro Gly
        370                 375                 380

Ala Leu Asn Glu Ser Phe Ser Asp Val Phe Gly Tyr Phe Asn Asp Thr
385                 390                 395                 400

Glu Asp Trp Asp Ile Gly Glu Asp Ile Thr Val Ser Gln Pro Ala Leu
                405                 410                 415

Arg Ser Leu Ser Asn Pro Thr Lys Tyr Gly Gln Pro Asn Phe Lys
            420                 425                 430

Asn Tyr Lys Asn Leu Pro Asn Thr Asp Ala Gly Asp Tyr Gly Gly Val
        435                 440                 445

His Thr Asn Ser Gly Ile Pro Asn Lys Ala Ala Tyr Asn Thr Ile Thr
        450                 455                 460

Lys Ile Gly Val Asn Lys Ala Glu Gln Ile Tyr Tyr Arg Ala Leu Thr
465                 470                 475                 480

Val Tyr Leu Thr Pro Ser Ser Thr Phe Lys Asp Ala Lys Ala Ala Leu
                485                 490                 495

Ile Gln Ser Ala Arg Asp Leu Tyr Gly Ser Gln Asp Ala Ala Ser Val
            500                 505                 510

Glu Ala Ala Trp Asn Ala Val Gly Leu
            515                 520

<210> SEQ ID NO 42
<211> LENGTH: 351
<212> TYPE: PRT
<213> ORGANISM: Ananas comosus

<400> SEQUENCE: 42

Met Ala Ser Lys Val Gln Leu Val Phe Leu Phe Leu Phe Leu Cys Ala
1               5                   10                  15

Met Trp Ala Ser Pro Ser Ala Ala Ser Arg Asp Glu Pro Asn Asp Pro
            20                  25                  30

Met Met Lys Arg Phe Glu Glu Trp Met Ala Glu Tyr Gly Arg Val Tyr
        35                  40                  45

Lys Asp Asp Asp Glu Lys Met Arg Arg Phe Gln Ile Phe Lys Asn Asn
    50                  55                  60

Val Lys His Ile Glu Thr Phe Asn Ser Arg Asn Glu Asn Ser Tyr Thr
65              70                  75                  80

Leu Gly Ile Asn Gln Phe Thr Asp Met Thr Lys Ser Glu Phe Val Ala
                85                  90                  95
```

-continued

Gln Tyr Thr Gly Val Ser Leu Pro Leu Asn Ile Glu Arg Glu Pro Val
            100                 105                 110

Val Ser Phe Asp Asp Val Asn Ile Ser Ala Val Pro Gln Ser Ile Asp
        115                 120                 125

Trp Arg Asp Tyr Gly Ala Val Asn Glu Val Lys Asn Gln Asn Pro Cys
    130                 135                 140

Gly Ser Cys Trp Ser Phe Ala Ala Ile Ala Thr Val Glu Gly Ile Tyr
145                 150                 155                 160

Lys Ile Lys Thr Gly Tyr Leu Val Ser Leu Ser Glu Gln Glu Val Leu
                165                 170                 175

Asp Cys Ala Val Ser Tyr Gly Cys Lys Gly Gly Trp Val Asn Lys Ala
            180                 185                 190

Tyr Asp Phe Ile Ile Ser Asn Asn Gly Val Thr Thr Glu Glu Asn Tyr
        195                 200                 205

Pro Tyr Leu Ala Tyr Gln Gly Thr Cys Asn Ala Asn Ser Phe Pro Asn
    210                 215                 220

Ser Ala Tyr Ile Thr Gly Tyr Ser Tyr Val Arg Arg Asn Asp Glu Arg
225                 230                 235                 240

Ser Met Met Tyr Ala Val Ser Asn Gln Pro Ile Ala Ala Leu Ile Asp
                245                 250                 255

Ala Ser Glu Asn Phe Gln Tyr Tyr Asn Gly Gly Val Phe Ser Gly Pro
            260                 265                 270

Cys Gly Thr Ser Leu Asn His Ala Ile Thr Ile Ile Gly Tyr Gly Gln
        275                 280                 285

Asp Ser Ser Gly Thr Lys Tyr Trp Ile Val Arg Asn Ser Trp Gly Ser
    290                 295                 300

Ser Trp Gly Glu Gly Gly Tyr Val Arg Met Ala Arg Gly Val Ser Ser
305                 310                 315                 320

Ser Ser Gly Val Cys Gly Ile Ala Met Ala Pro Leu Phe Pro Thr Leu
                325                 330                 335

Gln Ser Gly Ala Asn Ala Glu Val Ile Lys Met Val Ser Glu Thr
            340                 345                 350

<210> SEQ ID NO 43
<211> LENGTH: 910
<212> TYPE: PRT
<213> ORGANISM: Bifidobacterium adolescentis

<400> SEQUENCE: 43

Met Ala Asp Ala Lys Lys Lys Glu Pro Thr Lys Pro Thr Pro Glu
1               5                   10                  15

Glu Lys Leu Ala Ala Ala Glu Ala Glu Val Asp Ala Leu Val Lys Lys
                20                  25                  30

Gly Leu Lys Ala Leu Asp Glu Phe Glu Lys Leu Asp Gln Lys Gln Val
            35                  40                  45

Asp His Ile Val Ala Lys Ala Ser Val Ala Ala Leu Asn Lys His Leu
        50                  55                  60

Val Leu Ala Lys Met Ala Val Glu Glu Thr His Arg Gly Leu Val Glu
65                  70                  75                  80

Asp Lys Ala Thr Lys Asn Ile Phe Ala Cys Glu His Val Thr Asn Tyr
                85                  90                  95

Leu Ala Gly Gln Lys Thr Val Gly Ile Ile Arg Glu Asp Asp Val Leu
            100                 105                 110

Gly Ile Asp Glu Ile Ala Glu Pro Val Gly Val Val Ala Gly Val Thr
        115                 120                 125

```
Pro Val Thr Asn Pro Thr Ser Thr Ala Ile Phe Lys Ser Leu Ile Ala
    130                 135                 140

Leu Lys Thr Arg Cys Pro Ile Ile Phe Gly Phe His Pro Gly Ala Gln
145                 150                 155                 160

Asn Cys Ser Val Ala Ala Ala Lys Ile Val Arg Asp Ala Ala Ile Ala
                165                 170                 175

Ala Gly Ala Pro Glu Asn Cys Ile Gln Trp Ile Glu His Pro Ser Ile
            180                 185                 190

Glu Ala Thr Gly Ala Leu Met Lys His Asp Gly Val Ala Thr Ile Leu
        195                 200                 205

Ala Thr Gly Gly Pro Gly Met Val Lys Ala Ala Tyr Ser Ser Gly Lys
    210                 215                 220

Pro Ala Leu Gly Val Gly Ala Gly Asn Ala Pro Ala Tyr Val Asp Lys
225                 230                 235                 240

Asn Val Asp Val Val Arg Ala Ala Asn Asp Leu Ile Leu Ser Lys His
                245                 250                 255

Phe Asp Tyr Gly Met Ile Cys Ala Thr Glu Gln Ala Ile Ile Ala Asp
            260                 265                 270

Lys Asp Ile Tyr Ala Pro Leu Val Lys Glu Leu Lys Arg Arg Lys Ala
275                 280                 285

Tyr Phe Val Asn Ala Asp Glu Lys Ala Lys Leu Glu Gln Tyr Met Phe
    290                 295                 300

Gly Cys Thr Ala Tyr Ser Gly Gln Thr Pro Lys Leu Asn Ser Val Val
305                 310                 315                 320

Pro Gly Lys Ser Pro Gln Tyr Ile Ala Lys Ala Ala Gly Phe Glu Ile
                325                 330                 335

Pro Glu Asp Ala Thr Ile Leu Ala Ala Glu Cys Lys Glu Val Gly Glu
            340                 345                 350

Asn Glu Pro Leu Thr Met Glu Lys Leu Ala Pro Val Gln Ala Val Leu
        355                 360                 365

Lys Ser Asp Asn Lys Glu Gln Ala Phe Glu Met Cys Glu Ala Met Leu
    370                 375                 380

Lys His Gly Ala Gly His Thr Ala Ala Ile His Thr Asn Asp Arg Asp
385                 390                 395                 400

Leu Val Arg Glu Tyr Gly Gln Arg Met His Ala Cys Arg Ile Ile Trp
                405                 410                 415

Asn Ser Pro Ser Ser Leu Gly Gly Val Gly Asp Ile Tyr Asn Ala Ile
            420                 425                 430

Ala Pro Ser Leu Thr Leu Gly Cys Gly Ser Tyr Gly Gly Asn Ser Val
        435                 440                 445

Ser Gly Asn Val Gln Ala Val Asn Leu Ile Asn Ile Lys Arg Ile Ala
    450                 455                 460

Arg Arg Asn Asn Asn Met Gln Trp Phe Lys Ile Pro Ala Lys Thr Tyr
465                 470                 475                 480

Phe Glu Pro Asn Ala Ile Lys Tyr Leu Arg Asp Met Tyr Gly Ile Glu
                485                 490                 495

Lys Ala Val Ile Val Cys Asp Lys Val Met Glu Gln Leu Gly Ile Val
            500                 505                 510

Asp Lys Ile Ile Asp Gln Leu Arg Ala Arg Ser Asn Arg Val Thr Phe
        515                 520                 525

Arg Ile Ile Asp Tyr Val Glu Pro Glu Pro Ser Val Glu Thr Val Glu
    530                 535                 540
```

-continued

Arg Gly Ala Ala Met Met Arg Glu Glu Phe Glu Pro Asp Thr Ile Ile
545                 550                 555                 560

Ala Val Gly Gly Gly Ser Pro Met Asp Ala Ser Lys Ile Met Trp Leu
            565                 570                 575

Leu Tyr Glu His Pro Glu Ile Ser Phe Ser Asp Val Arg Glu Lys Phe
            580                 585                 590

Phe Asp Ile Arg Lys Arg Ala Phe Lys Ile Pro Pro Leu Gly Lys Lys
            595                 600                 605

Ala Lys Leu Val Cys Ile Pro Thr Ser Ser Gly Thr Gly Ser Glu Val
610                 615                 620

Thr Pro Phe Ala Val Ile Thr Asp His Lys Thr Gly Tyr Lys Tyr Pro
625                 630                 635                 640

Ile Thr Asp Tyr Ala Leu Thr Pro Ser Val Ala Ile Val Asp Pro Val
            645                 650                 655

Leu Ala Arg Thr Gln Pro Arg Lys Leu Ala Ser Asp Ala Gly Phe Asp
            660                 665                 670

Ala Leu Thr His Ala Phe Glu Ala Tyr Val Ser Val Tyr Ala Asn Asp
            675                 680                 685

Phe Thr Asp Gly Met Ala Leu His Ala Ala Lys Leu Val Trp Asp Asn
690                 695                 700

Leu Ala Glu Ser Val Asn Gly Glu Pro Gly Glu Lys Thr Arg Ala
705                 710                 715                 720

Gln Glu Lys Met His Asn Ala Ala Thr Met Ala Gly Met Ala Phe Gly
            725                 730                 735

Ser Ala Phe Leu Gly Met Cys His Gly Met Ala His Thr Ile Gly Ala
            740                 745                 750

Leu Cys His Val Ala His Gly Arg Thr Asn Ser Ile Leu Leu Pro Tyr
            755                 760                 765

Val Ile Arg Tyr Asn Gly Ser Val Pro Glu Glu Pro Thr Ser Trp Pro
770                 775                 780

Lys Tyr Asn Lys Tyr Ile Ala Pro Glu Arg Tyr Gln Glu Ile Ala Lys
785                 790                 795                 800

Asn Leu Gly Val Asn Pro Gly Lys Thr Pro Glu Glu Gly Val Glu Asn
            805                 810                 815

Leu Ala Lys Ala Val Glu Asp Tyr Arg Asp Asn Lys Leu Gly Met Asn
            820                 825                 830

Lys Ser Phe Gln Glu Cys Gly Val Asp Glu Asp Tyr Tyr Trp Ser Ile
            835                 840                 845

Ile Asp Gln Ile Gly Met Arg Ala Tyr Glu Asp Gln Cys Ala Pro Ala
850                 855                 860

Asn Pro Arg Ile Pro Gln Ile Glu Asp Met Lys Asp Ile Ala Ile Ala
865                 870                 875                 880

Ala Tyr Tyr Gly Val Ser Gln Ala Glu Gly His Lys Leu Arg Val Gln
            885                 890                 895

Arg Gln Gly Glu Ala Ala Thr Glu Glu Ala Ser Glu Arg Ala
            900                 905                 910

<210> SEQ ID NO 44
<211> LENGTH: 2733
<212> TYPE: DNA
<213> ORGANISM: Bifidobacterium adolescentis

<400> SEQUENCE: 44
atggcagacg caaagaagaa ggaagagccg accaagccga ctccggaaga gaagctcgcc      60

-continued

| | |
|---|---|
| gcagccgagg ctgaggtcga cgctctggtc aagaagggcc tgaaggctct tgatgaattc | 120 |
| gagaagctcg atcagaagca ggttgaccac atcgtggcca aggcttccgt cgcagccctg | 180 |
| aacaagcact tggtgctcgc caagatggcc gtcgaggaga cccaccgtgg tctggtcgaa | 240 |
| gacaaggcca ccaagaacat cttcgcctgc gagcatgtca ccaactacct ggctggtcag | 300 |
| aagaccgtcg gcatcatccg cgaggacgac gtgctgggca tcgacgaaat cgccgagccg | 360 |
| gttggcgtcg tcgctggcgt gaccccggtc accaacccga cctccaccgc catcttcaag | 420 |
| tcgctgatcg cactgaagac ccgctgcccg atcatcttcg gcttccaccc gggcgcacag | 480 |
| aactgctccg tcgcggccgc caagatcgtt cgcgatgccg ctatcgcagc aggcgctcct | 540 |
| gagaactgta ttcagtggat cgagcatccg tccatcgagg ccactggcgc cctgatgaag | 600 |
| catgatggtg tcgccaccat cctcgccacc ggtggtccgg gcatggtcaa ggccgcatac | 660 |
| tcctccggca gccggccct gggcgtcggc gcgggcaatg ctccggcata cgttgacaag | 720 |
| aacgtcgacg tcgtgcgtgc agccaacgat ctgattcttt ccaagcactt cgattacggc | 780 |
| atgatctgcg ctaccgagca ggccatcatc gccgacaagg acatctacgc tccgctcgtt | 840 |
| aaggaactca agcgtcgcaa ggcctatttc gtgaacgctg acgagaaggc caagctcgag | 900 |
| cagtacatgt tcggctgcac cgcttactcc ggacagaccc cgaagctcaa ctccgtggtg | 960 |
| ccgggcaagt ccccgcagta catcgccaag gccgccggct tcgagattcc ggaagacgcc | 1020 |
| accatccttg ccgctgagtg caaggaagtc ggcgagaacg agccgctgac catggagaag | 1080 |
| cttgctccgg tccaggccgt gctgaagtcc gacaacaagg aacaggcctt cgagatgtgc | 1140 |
| gaagccatgc tgaagcatgg cgccggccac accgccgcca tccacaccaa cgaccgtgac | 1200 |
| ctggtccgcg agtacggcca gcgcatgcac gcctgccgta tcatctggaa ctccccgagc | 1260 |
| tccctcggcg gcgtgggcga catctacaac gccatcgctc cgtccctgac cctgggctgc | 1320 |
| ggctcctacg gcggcaactc cgtgtccggc aacgtccagg cagtcaacct catcaacatc | 1380 |
| aagcgcatcc tcggaggaa caacaacatg cagtggttca agattccggc caagacctac | 1440 |
| ttcgagccga acgccatcaa gtacctgcgc gacatgtacg gcatcgaaaa ggccgtcatc | 1500 |
| gtgtgcgata aggtcatgga gcagctcggc atcgttgaca agatcatcga tcagctgcgt | 1560 |
| gcacgttcca accgcgtgac cttccgtatc atcgattatg tcgagccgga gccgagcgtg | 1620 |
| gagaccgtcg aacgtggcgc cgccatgatg cgcgaggagt tcgagccgga taccatcatc | 1680 |
| gccgtcggcg gtggttcccc gatggatgcg tccaagatta tgtggctgct gtacgagcac | 1740 |
| ccggaaatct ccttctccga tgtgcgtgag aagttcttcg atatccgtaa gcgcgcgttc | 1800 |
| aagattccgc cgctgggcaa gaaggccaag ctggtctgca ttccgacttc ttccggcacc | 1860 |
| ggttccgaag tcacgccgtt cgctgtgatt accgaccaca agaccggcta taagtacccg | 1920 |
| atcaccgatt acgcgctgac cccgtccgtc gctatcgtcg atccggtgct ggcacgtact | 1980 |
| cagccgcgca agctggcttc cgatgctggt ttcgatgctc tgacccacgc ttttgaggct | 2040 |
| tatgtgtccg tgtatgccaa cgacttcacc gatggtatgg cattgcacgc tgccaagctg | 2100 |
| gtttgggaca acctcgctga gtccgtcaat ggcgagccgg tgaggagaa acccgtgcc | 2160 |
| caggagaaga tgcataatgc cgccaccatg gccggcatgg cttcggctc cgccttcctc | 2220 |
| ggcatgtgcc acggcatggc ccacaccatt ggtgcactgt gccacgttgc ccacggtcgt | 2280 |
| accaactcca tcctcctgcc gtacgtgatc cgttacaacg gttccgtccc ggaggagccg | 2340 |
| accagctggc cgaagtacaa caagtacatc gctccggaac gctaccagga gatcgccaag | 2400 |
| aaccttggcg tgaacccggg caagactccg gaagagggcg tcgagaacct ggccaaggct | 2460 |

```
gttgaggatt accgtgacaa caagctcggt atgaacaaga gcttccagga gtgcggtgtg    2520
gatgaggact actattggtc catcatcgac cagatcggca tgcgcgccta cgaagaccag    2580
tgcgcaccgg cgaacccgcg tatcccgcag atcgaggata tgaaggatat cgccattgcc    2640
gcctactacg gcgtcagcca ggcggaaggc cacaagctgc gcgtccagcg tcagggcgaa    2700
gccgctacgg aggaagcttc cgagcgcgcc tga                                 2733
```

<210> SEQ ID NO 45
<211> LENGTH: 2733
<212> TYPE: DNA
<213> ORGANISM: Artificial Sequence
<220> FEATURE:
<223> OTHER INFORMATION: Encoding SEQ ID NO: 43 and codon-optimized for
      Saccharomyces cerevisiae

<400> SEQUENCE: 45

```
atggccgacg ccaagaagaa agaagaacct actaagccaa ccccagaaga aaaattggct      60
gctgctgaag ctgaagttga tgctttggtt aagaaaggtt tgaaggcctt ggacgaattc     120
gaaaaattgg atcaaaagca agtcgatcac atcgttgcta aagcttcagt tgctgctttg     180
aacaaacatt tggttttggc taagatggcc gttgaagaaa ctcatagagg tttggttgaa     240
gataaggcca ccagaatat tttcgcttgt gaacatgtca ccaactattt ggctggtcaa     300
aagaccgttg gtatcattag agaagatgat gttttgggta cgacgaaat tgctgaacca     360 gttggtgttg ttgctggtgt tactccagtt actaatccaa cttctaccgc tatttttcaag     420 tccttgattg ccttgaaaac cagatgccca attatctttg gttttcatcc aggtgctcaa     480
aactgttctg ttgctgctgc taaaatcgtt agagatgctg ctattgctgc tggtgctcca     540
gaaaactgta ttcaatggat tgaacaccca tccattgaag ctactggtgc tttgatgaag     600
cacgatggtg ttgctactat tttggctact ggtggtccag gtatggttaa ggctgcttat     660
tcttctggta aaccagcttt gggtgttggt gctggtaatg ctccagctta tgttgataag     720
aacgttgatg ttgttagagc tgccaacgat ttgattttgt ctaagcactt cgactacggt     780
atgatttgtg ctactgaaca agctattatc gccgataagg atatctatgc tccattggtc     840
aaagaattga agagaagaaa ggcctacttc gttaatgctg acgaaaaagc taagttggaa     900
cagtatatgt tcggttgtac cgcttactct ggtcaaactc caaagttgaa ttctgttgtt     960
ccaggtaagt ccccacagta tattgctaaa gctgccggtt tcgaaattcc agaagatgct    1020
acaattttgg ccgctgaatg taagaagtc ggagaaaacg aaccattgac catggaaaaa     1080
ttggcaccag ttcaagctgt tttgaagtcc gataacaaag aacaagcctt cgaaatgtgc    1140
gaagccatgt tgaaacatgg tgctggtcat actgctgcta ttcatacaaa cgatagagac    1200
ttggtcagag aatacggtca agaatgcat gcctgcagaa ttatttggaa ctctccatct    1260
tctttgggtg gtgttggtga tatctacaat gctattgctc catctttgac tttgggttgt    1320
ggttcttatg gtggtaattc tgtttccggt aatgttcaag ccgtcaactt gattaacatc    1380
aagagaatcg ctagaagaaa caacaacatg caatggttca gattccagc taagacttac    1440 tttgaaccta cgccatcaa gtacctaaga gatatgtacg gtatcgaaaa ggctgttatc    1500
gtttgcgata aggtcatgga acaattgggt atcgttgata agatcatcga tcaattgaga    1560
gccagatcta acagagttac cttcagaatc atcgattacg ttgaaccaga accatctgtt    1620
gaaacagttg aaagggtgc tgctatgatg agagaagaat tgaacctga taccattatt    1680 gctgttggtg gtggttctcc aatggatgct tctaagatta tgtggttgtt gtacgaacac    1740
```

```
ccagaaattt cattctccga tgtcagagaa aagttcttcg acattagaaa gagagccttt    1800
aagattccac cattgggtaa aaaggccaag ttggtatgta ttccaacctc ttcaggtact    1860
ggttctgaag ttactccatt cgctgttatt accgatcata agactggtta caagtaccca    1920
attaccgatt atgctttgac tccatctgtt gctatcgttg atccagtttt ggctagaact    1980
caacctagaa aattggcttc tgatgctggt tttgatgctt tgacacatgc ttttgaagcc    2040
tacgtttctg tttacgctaa cgatttcact gatggtatgg ctttacatgc tgctaaattg    2100
gtttgggata acttggctga atccgttaat ggtgaaccag gtgaagaaaa aactagagcc    2160
caagaaaaga tgcataacgc tgctactatg gctggtatgg catttggttc tgctttttg     2220 ggtatgtgtc atggtatggc tcatacaatt ggtgctttgt gtcatgttgc tcatggtaga    2280
actaactcca ttttgttgcc atacgtcatc agatacaacg gttctgttcc tgaagaacct    2340
acatcttggc caaagtacaa caagtatatt gccccagaaa gataccaaga aatcgctaag    2400
aacttgggtg ttaatccagg taaaactcct gaagaaggtg ttgaaaattt ggctaaggct    2460
gtcgaagatt acagagataa caagttgggt atgaacaagt ccttccaaga atgtggtgtt    2520
gacgaagatt actactggtc cattatcgat caaattggta tgagagccta cgaagatcaa    2580
tgtgctccag ctaatccaag aattccacaa atcgaagata tgaaggatat tgctattgcc    2640
gcttactacg tgtttctca agctgaaggt cataagttga gagttcaaag acaaggtgaa    2700
gctgctacag aagaagcttc tgaaagagct taa                                2733
```

<210> SEQ ID NO 46
<211> LENGTH: 872
<212> TYPE: PRT
<213> ORGANISM: Clostridium phytofermentans

<400> SEQUENCE: 46

```
Met Thr Lys Lys Val Glu Leu Gln Thr Thr Gly Leu Val Asp Ser Leu
1               5                   10                  15

Glu Ala Leu Thr Ala Lys Phe Arg Glu Leu Lys Glu Ala Gln Glu Leu
            20                  25                  30

Phe Ala Thr Tyr Thr Gln Glu Gln Val Asp Lys Ile Phe Phe Ala Ala
        35                  40                  45

Ala Met Ala Ala Asn Gln Gln Arg Ile Pro Leu Ala Lys Met Ala Val
    50                  55                  60

Glu Glu Thr Gly Met Gly Ile Val Glu Asp Lys Val Ile Lys Asn His
65                  70                  75                  80

Tyr Ala Ala Glu Tyr Ile Tyr Asn Ala Tyr Lys Asp Thr Lys Thr Cys
                85                  90                  95

Gly Val Val Glu Glu Asp Pro Ser Phe Gly Ile Lys Lys Ile Ala Glu
            100                 105                 110

Pro Ile Gly Val Val Ala Ala Val Ile Pro Thr Thr Asn Pro Thr Ser
        115                 120                 125

Thr Ala Ile Phe Lys Thr Leu Leu Cys Leu Lys Thr Arg Asn Ala Ile
    130                 135                 140

Ile Ile Ser Pro His Pro Arg Ala Lys Asn Cys Thr Ile Ala Ala Ala
145                 150                 155                 160

Lys Val Val Leu Asp Ala Ala Val Ala Gly Ala Pro Ala Gly Ile
                165                 170                 175

Ile Gly Trp Ile Asp Val Pro Ser Leu Glu Leu Thr Asn Glu Val Met
            180                 185                 190
```

```
Lys Asn Ala Asp Ile Ile Leu Ala Thr Gly Pro Gly Met Val Lys
            195                 200                 205

Ala Ala Tyr Ser Ser Gly Lys Pro Ala Leu Gly Val Gly Ala Gly Asn
        210                 215                 220

Thr Pro Val Ile Met Asp Glu Ser Cys Asp Val Arg Leu Ala Val Ser
225                 230                 235                 240

Ser Ile Ile His Ser Lys Thr Phe Asp Asn Gly Met Ile Cys Ala Ser
                245                 250                 255

Glu Gln Ser Val Ile Ile Ser Asp Lys Ile Tyr Glu Ala Ala Lys Lys
            260                 265                 270

Glu Phe Lys Asp Arg Gly Cys His Ile Cys Ser Pro Glu Glu Thr Gln
        275                 280                 285

Lys Leu Arg Glu Thr Ile Leu Ile Asn Gly Ala Leu Asn Ala Lys Ile
    290                 295                 300

Val Gly Gln Ser Ala His Thr Ile Ala Lys Leu Ala Gly Phe Asp Val
305                 310                 315                 320

Ala Glu Ala Ala Lys Ile Leu Ile Gly Glu Val Glu Ser Val Glu Leu
                325                 330                 335

Glu Glu Gln Phe Ala His Glu Lys Leu Ser Pro Val Leu Ala Met Tyr
            340                 345                 350

Lys Ser Lys Ser Phe Asp Asp Ala Val Ser Lys Ala Ala Arg Leu Val
        355                 360                 365

Ala Asp Gly Gly Tyr Gly His Thr Ser Ser Ile Tyr Ile Asn Val Gly
    370                 375                 380

Thr Gly Gln Glu Lys Ile Ala Lys Phe Ser Asp Ala Met Lys Thr Cys
385                 390                 395                 400

Arg Ile Leu Val Asn Thr Pro Ser Ser His Gly Gly Ile Gly Asp Leu
                405                 410                 415

Tyr Asn Phe Lys Leu Ala Pro Ser Leu Thr Leu Gly Cys Gly Ser Trp
            420                 425                 430

Gly Gly Asn Ser Val Ser Glu Asn Val Gly Val Lys His Leu Ile Asn
        435                 440                 445

Ile Lys Thr Val Ala Glu Arg Arg Glu Asn Met Leu Trp Phe Arg Ala
    450                 455                 460

Pro Glu Lys Val Tyr Phe Lys Lys Gly Cys Leu Pro Val Ala Leu Ala
465                 470                 475                 480

Glu Leu Lys Asp Val Met Asn Lys Lys Val Phe Ile Val Thr Asp
                485                 490                 495

Ala Phe Leu Tyr Lys Asn Gly Tyr Thr Lys Cys Val Thr Asp Gln Leu
            500                 505                 510

Asp Ala Met Gly Ile Gln His Thr Thr Tyr Tyr Asp Val Ala Pro Asp
        515                 520                 525

Pro Ser Leu Ala Ser Ala Thr Glu Gly Ala Glu Ala Met Arg Leu Phe
    530                 535                 540

Glu Pro Asp Cys Ile Ile Ala Leu Gly Gly Gly Ser Ala Met Asp Ala
545                 550                 555                 560

Gly Lys Ile Met Trp Val Met Tyr Glu His Pro Glu Val Asn Phe Leu
                565                 570                 575

Asp Leu Ala Met Arg Phe Met Asp Ile Arg Lys Arg Val Tyr Ser Phe
            580                 585                 590

Pro Lys Met Gly Glu Lys Ala Tyr Phe Ile Ala Val Pro Thr Ser Ser
        595                 600                 605

Gly Thr Gly Ser Glu Val Thr Pro Phe Ala Val Ile Thr Asp Glu Arg
```

```
                610              615              620
Thr Gly Val Lys Tyr Pro Leu Ala Asp Tyr Glu Leu Leu Pro Lys Met
625                       630                   635              640

Ala Ile Ile Asp Ala Asp Met Met Asn Gln Pro Lys Gly Leu Thr
                    645              650                  655

Ser Ala Ser Gly Ile Asp Ala Leu Thr His Ala Leu Glu Ala Tyr Ala
            660                  665                   670

Ser Ile Met Ala Thr Asp Tyr Thr Asp Gly Leu Ala Leu Lys Ala Met
                675                 680                  685

Lys Asn Ile Phe Ala Tyr Leu Pro Ser Ala Tyr Glu Asn Gly Ala Ala
            690                 695                  700

Asp Pro Val Ala Arg Glu Lys Met Ala Asp Ala Ser Thr Leu Ala Gly
705                     710                  715                  720

Met Ala Phe Ala Asn Ala Phe Leu Gly Ile Cys His Ser Met Ala His
                    725                 730                  735

Lys Leu Gly Ala Phe His His Leu Pro His Gly Val Ala Asn Ala Leu
                740                 745                  750

Leu Ile Asn Glu Val Met Arg Phe Asn Ser Val Ser Ile Pro Thr Lys
        755                 760                  765

Met Gly Thr Phe Ser Gln Tyr Gln Tyr Pro His Ala Leu Asp Arg Tyr
770                     775                  780

Val Glu Cys Ala Asn Phe Leu Gly Ile Ala Gly Lys Asn Asp Asn Glu
785                     790                  795                  800

Lys Phe Glu Asn Leu Leu Lys Ala Ile Asp Glu Leu Lys Glu Lys Val
                    805                 810                  815

Gly Ile Lys Lys Ser Ile Lys Glu Tyr Gly Val Asp Glu Lys Tyr Phe
                820                 825                  830

Leu Asp Thr Leu Asp Ala Met Val Glu Gln Ala Phe Asp Asp Gln Cys
            835                 840                  845

Thr Gly Ala Asn Pro Arg Tyr Pro Leu Met Lys Glu Ile Lys Glu Ile
            850                 855                  860

Tyr Leu Lys Val Tyr Tyr Gly Lys
865                 870

<210> SEQ ID NO 47
<211> LENGTH: 2619
<212> TYPE: DNA
<213> ORGANISM: Clostridium phytofermentans

<400> SEQUENCE: 47
atgacgaaaa aagtggaatt acagacaact ggattagtag actctctcga agcattaaca      60
gcaaaattta gagagttaaa agaagcacaa gagctctttg ctacctacac tcaagagcaa     120
gtagataaaa tcttctttgc tgctgccatg gctgccaatc agcaacgtat tccgttagca     180
aagatggctg tagaagaaac gggtatgggt attgtagaag ataaagtaat taagaatcat     240
tatgctgcag agtatattta caatgcatac aaagatacaa aaacatgtgg agtggttgaa     300
gaagatccta gcttcggtat caaaaaaatt gcagagccaa tcggcgtagt tgcagctgta     360
atcccaacta ccaatcctac ctccactgct atctttaaaa cattactttg tttaaagact     420
cgtaacgcaa tcatcatcag cccacatcct cgtgctaaga actgtaccat cgcagctgct     480
aaggtagttt tagatgctgc agttgctgca ggtgctcctg ctggtataat tggatggatt     540
gatgttccat cacttgaatt aaccaatgaa gttatgaaaa atgcagacat catccttgca     600
actggtggac ctggtatggt aaaggctgct tattcttctg gtaaaccagc acttggtgtt     660
```

```
ggcgcaggta ataccctgt tattatggat gaaagctgcg atgttcgcct tgcagtaagc    720
tctattattc actctaagac atttgataac ggtatgattt gtgcttccga gcaatccgta    780
attattagtg ataagattta tgaagctgct aagaaagaat tcaaggatcg tggttgccac    840
atctgctccc cagaagagac tcagaagctt cgtgaaacaa tcctaattaa tggtgctctt    900
aacgctaaaa ttgttggaca aagcgctcat acgattgcaa agcttgcagg atttgatgta    960
gcagaagctg ctaagatttt aattggtgaa gtagaatccg ttgaactaga agaacaattt   1020
gcacacgaga aactttctcc agttcttgct atgtacaaat caaaatcctt tgatgatgca   1080
gtaagcaaag ctgctcgtct tgttgcagat ggcggttatg ccatacttc ttccatctat   1140
attaatgtag gtaccggaca agaaaagatt gcaaagtttt ctgatgctat gaagacttgc   1200
cgtattcttg taaatacacc atcctcccat ggtggtatcg gtgacctta taactttaaa   1260
ttagctccat ctcttactct tggttgtggc tcctggggcg gtaactctgt atcagaaaac   1320
gtaggagtaa agcacttaat caacattaag acagttgctg agaggagaga aaacatgctt   1380
tggtttagag cacctgagaa agtatacttt aagaagggtt gtttaccagt agccctcgca   1440
gaattaaaag atgtaatgaa taaaagaaa gtattcattg taaccgatgc tttcctttat   1500
aaaaatggct atacaaaatg tgttactgat cagttagatg ctatgggaat tcagcatact   1560
acttactatg atgttgctcc agatccatct ttagctagtg ctacagaagg tgcagaagcg   1620
atgagactct tcgagccaga ctgtattatc gcactcggtg gtggttctgc aatggatgcc   1680
ggaaagatta tgtgggttat gtatgaacac cctgaagtaa acttccttga ccttgcaatg   1740
cgtttcatgg atattagaaa gcgtgtttac tccttcccta agatgggcga aaaagcttac   1800
tttatcgcag ttccaacttc ctccggtact ggttctgaag ttacaccatt tgctgttatt   1860
accgatgaga gaactggcgt aaaatatcca cttgcagatt acgaattact tcctaagatg   1920
gctattattg atgccgatat gatgatgaat caacctaagg gattaacttc tgcttccggt   1980
attgatgccc ttacccatgc attagaggca tatgcttcta tcatggctac tgactatacg   2040
gatggtttag cattaaaagc tatgaagaat atcttcgctt accttccaag cgcatatgaa   2100
aatggtgccg ctgatccggt tgcaagagaa aagatggcag atgcttctac cttagctggt   2160
atggcattcg caaatgcatt cttaggaatt tgccactcca tggctcataa attaggtgca   2220
ttccaccact taccacacgg tgtagcaaac gcactcttaa tcaacgaagt aatgcgcttt   2280
aactccgtta gcattcctac aaagatgggt actttctctc aataccaata cccacatgcg   2340
ttagatcgtt atgtagaatg tgcgaacttc ttaggtattg ccggaaagaa cgacaatgag   2400
aaattcgaaa accttcttaa ggcaattgat gaattaaag aaaagttgg tatcaagaaa   2460
tccatcaaag aatatggcgt agacgagaaa tatttcttag atactttaga tgctatggtt   2520
gaacaggctt cgatgatca gtgtactggt gctaacccaa gatatccatt aatgaaggaa   2580
atcaaggaaa tctatcttaa agtgtactac ggtaaataa                          2619
```

<210> SEQ ID NO 48
<211> LENGTH: 885
<212> TYPE: PRT
<213> ORGANISM: Piromyces sp.

<400> SEQUENCE: 48

Met Ser Gly Leu Gln Met Phe Gln Asn Leu Ser Leu Tyr Gly Ser Leu
1               5                   10                  15

Ala Glu Ile Asp Thr Ser Glu Lys Leu Asn Glu Ala Met Asp Lys Leu

```
            20                  25                  30
Thr Ala Ala Gln Glu Gln Phe Arg Glu Tyr Asn Gln Glu Gln Val Asp
            35                  40                  45

Lys Ile Phe Lys Ala Val Ala Leu Ala Ala Ser Gln Asn Arg Val Ala
            50                  55                  60

Phe Ala Lys Tyr Ala His Glu Glu Thr Gln Lys Gly Val Phe Glu Asp
 65                 70                  75                  80

Lys Val Ile Lys Asn Glu Phe Ala Ala Asp Tyr Ile Tyr His Lys Tyr
                    85                  90                  95

Cys Asn Asp Lys Thr Ala Gly Ile Ile Glu Tyr Asp Glu Ala Asn Gly
                100                 105                 110

Leu Met Glu Ile Ala Glu Pro Val Gly Pro Val Gly Ile Ala Pro
            115                 120                 125

Val Thr Asn Pro Thr Ser Thr Ile Ile Tyr Lys Ser Leu Ile Ala Leu
            130                 135                 140

Lys Thr Arg Asn Cys Ile Ile Phe Ser Pro His Pro Gly Ala His Lys
145                 150                 155                 160

Ala Ser Val Phe Val Val Lys Val Leu His Gln Ala Ala Val Lys Ala
                165                 170                 175

Gly Ala Pro Glu Asn Cys Ile Gln Ile Ile Phe Pro Lys Met Asp Leu
            180                 185                 190

Thr Thr Glu Leu Leu His His Gln Lys Thr Arg Phe Ile Trp Ala Thr
            195                 200                 205

Gly Gly Pro Gly Leu Val His Ala Ser Tyr Thr Ser Gly Lys Pro Ala
            210                 215                 220

Leu Gly Gly Gly Pro Gly Asn Ala Pro Ala Leu Ile Asp Glu Thr Cys
225                 230                 235                 240

Asp Met Asn Glu Ala Val Gly Ser Ile Val Val Ser Lys Thr Phe Asp
                245                 250                 255

Cys Gly Met Ile Cys Ala Thr Glu Asn Ala Val Val Val Glu Ser
            260                 265                 270

Val Tyr Glu Asn Phe Val Ala Thr Met Lys Lys Arg Gly Ala Tyr Phe
            275                 280                 285

Met Thr Pro Glu Glu Thr Lys Lys Ala Ser Asn Leu Leu Phe Gly Glu
            290                 295                 300

Gly Met Arg Leu Asn Ala Lys Ala Val Gly Gln Thr Ala Lys Thr Leu
305                 310                 315                 320

Ala Glu Met Ala Gly Phe Glu Val Pro Glu Asn Thr Val Val Leu Cys
                325                 330                 335

Gly Glu Ala Ser Glu Val Lys Phe Glu Glu Pro Met Ala His Glu Lys
                340                 345                 350

Leu Thr Thr Ile Leu Gly Ile Tyr Lys Ala Lys Asp Phe Asp Asp Gly
            355                 360                 365

Val Arg Leu Cys Lys Glu Leu Val Thr Phe Gly Gly Lys Gly His Thr
            370                 375                 380

Ala Val Leu Tyr Thr Asn Gln Asn Asn Lys Asp Arg Ile Glu Lys Tyr
385                 390                 395                 400

Gln Asn Glu Val Pro Ala Phe His Ile Leu Val Asp Met Pro Ser Ser
                405                 410                 415

Leu Gly Cys Ile Gly Asp Met Tyr Asn Phe Arg Leu Ala Pro Ala Leu
            420                 425                 430

Thr Ile Thr Cys Gly Thr Met Gly Gly Gly Ser Ser Ser Asp Asn Ile
            435                 440                 445
```

```
Gly Pro Lys His Leu Leu Asn Ile Lys Arg Val Gly Met Arg Arg Glu
    450                 455                 460
Asn Met Leu Trp Phe Lys Ile Pro Lys Ser Val Tyr Phe Lys Arg Ala
465                 470                 475                 480
Ile Leu Ser Glu Ala Leu Ser Asp Leu Arg Asp Thr His Lys Arg Ala
                485                 490                 495
Ile Ile Ile Thr Asp Arg Thr Met Thr Met Leu Gly Gln Thr Asp Lys
            500                 505                 510
Ile Ile Lys Ala Cys Glu Gly His Gly Met Val Cys Thr Val Tyr Asp
            515                 520                 525
Lys Val Val Pro Asp Pro Thr Ile Lys Cys Ile Met Glu Gly Val Asn
    530                 535                 540
Glu Met Asn Val Phe Lys Pro Asp Leu Ala Ile Ala Leu Gly Gly Gly
545                 550                 555                 560
Ser Ala Met Asp Ala Ala Lys Met Met Arg Leu Phe Tyr Glu Tyr Pro
                565                 570                 575
Asp Gln Asp Leu Gln Asp Ile Ala Thr Arg Phe Val Asp Ile Arg Lys
                580                 585                 590
Arg Val Val Gly Cys Pro Lys Leu Gly Arg Leu Ile Lys Thr Leu Val
            595                 600                 605
Cys Ile Pro Thr Thr Ser Gly Thr Gly Ala Glu Val Thr Pro Phe Ala
            610                 615                 620
Val Val Thr Ser Glu Glu Gly Arg Lys Tyr Pro Leu Val Asp Tyr Glu
625                 630                 635                 640
Leu Thr Pro Asp Met Ala Ile Val Asp Pro Glu Phe Ala Val Gly Met
                645                 650                 655
Pro Lys Arg Leu Thr Ser Trp Thr Gly Ile Asp Ala Leu Thr His Ala
                660                 665                 670
Ile Glu Ser Tyr Val Ser Ile Met Ala Thr Asp Phe Thr Arg Pro Tyr
            675                 680                 685
Ser Leu Arg Ala Val Gly Leu Ile Phe Glu Ser Leu Ser Leu Ala Tyr
    690                 695                 700
Asn Asn Gly Lys Asp Ile Glu Ala Arg Glu Lys Met His Asn Ala Ser
705                 710                 715                 720
Ala Ile Ala Gly Met Ala Phe Ala Asn Ala Phe Leu Gly Cys Cys His
                725                 730                 735
Ser Val Ala His Gln Leu Gly Ser Val Tyr His Ile Pro His Gly Leu
                740                 745                 750
Ala Asn Ala Leu Met Leu Ser His Ile Ile Lys Tyr Asn Ala Thr Asp
            755                 760                 765
Ser Pro Val Lys Met Gly Thr Phe Pro Gln Tyr Lys Tyr Pro Gln Ala
    770                 775                 780
Met Arg His Tyr Ala Glu Ile Ala Glu Leu Leu Leu Pro Pro Thr Gln
785                 790                 795                 800
Val Val Lys Met Thr Asp Val Asp Lys Val Gln Tyr Leu Ile Asp Arg
                805                 810                 815
Val Glu Gln Leu Lys Ala Asp Val Gly Ile Pro Lys Ser Ile Lys Glu
            820                 825                 830
Thr Gly Met Val Thr Glu Glu Asp Phe Phe Asn Lys Val Asp Gln Val
            835                 840                 845
Ala Ile Met Ala Phe Asp Asp Gln Cys Thr Gly Ala Asn Pro Arg Tyr
    850                 855                 860
```

Pro Leu Val Ser Glu Leu Lys Gln Leu Met Ile Asp Ala Trp Asn Gly
865                 870                 875                 880

Val Val Pro Lys Leu
            885

<210> SEQ ID NO 49
<211> LENGTH: 2658
<212> TYPE: DNA
<213> ORGANISM: Piromyces sp.

<400> SEQUENCE: 49

```
atgtctggtt tacaaatgtt ccaaaacttg tccttgtacg gttccttggc tgaaattgat      60
acctctgaaa agttgaacga agccatggat aagttgactg ctgctcaaga acaattcaga     120
gagtacaatc aagaacaagt cgacaagatc ttcaaggctg ttgctttggc tgcttctcaa     180
aacagagttg cttttgctaa gtacgctcat gaagaaactc aaaagggtgt tttcgaagat     240
aaggtcatca agaatgaatt cgctgccgat tacatctacc ataagtactg taacgataag     300
accgccggta ttatcgaata cgatgaagct aatggtttga tggaaattgc tgaaccagtt     360
ggtccagttg ttggtattgc tccagttact aatccaacct ctaccattat ctacaagtcc     420
ttgattgcct tgaaaaccag aaactgcatc atcttttcac cacatccagg tgctcataag     480
gcttcagttt tgttgttaa ggtcttgcat caagctgctg ttaaggctgg tgctccagaa     540
aactgcattc aaattatctt cccaaagatg gacttgacca ccgaattatt gcatcatcaa     600
aagaccagat tcatttgggc tactggtggt ccaggtttgg ttcatgcttc ttatacttca     660
ggtaaaccag ctttgggtgg tggtcctggt aatgctccag ctttgattga cgaaacttgc     720
gatatgaatg aagctgttgg ttctatcgtt gtttccaaga cttccgattg cggtatgatt     780
tgtgctactg aaaacgctgt tgttgttgtt gaatccgtct acgaaaactt cgttgctacc     840
atgaagaaac gtggcgctta ctttatgacc ccagaagaaa ctaagaaggc ttctaatttg     900
ttgttcggtg aaggtatgag attgaatgct aagctgttg gtcaaactgc taagactttg     960
gctgaaatgg ctggttttga agttccagaa acaccgttg ttttgtgtgg tgaagcttct    1020
gaagtcaagt tgaagaaacc tatggctcac gaaaagttga ctactatttt gggtatctac    1080
aaggccaagg atttcgatga tggtgttaga ttgtgcaaag aattggttac tttcggtggt    1140
aaaggtcata ctgctgtctt gtacaccaat caaaacaaca aggacagaat cgaaaagtac    1200
caaaacgaag ttccagcctt ccatatcttg gttgatatgc atcttccttt gggttgtatt    1260
ggtgatatgt acaacttcag attggctcca gccttgacta ttacttgtgg tactatgggt    1320
ggtggatctt cttctgataa cattggtcca aagcacttgt tgaacatcaa gcgtgttggt    1380
atgagaagag aaaacatgtt gtggttcaag atcccaaagt ccgtttactt caagagagct    1440
attttgtctg aagccttgtc cgatttgaga gatactcaca aaagagccat catcattacc    1500
gatagaacca tgactatgtt gggtcaaacc gataagatta ttaaggcttg tgaaggtcat    1560
ggtatggtct gtactgttta cgataaggtt gttccagatc caaccattaa gtgcattatg    1620
gaaggtgtca acgaaatgaa cgttttcaaa ccagatttgg ctattgcttt aggtggtggt    1680
tcagctatgg atgctgctaa atgatgaga ttattctacg aatacccaga ccaagacttg    1740
caagatattg ctactagatt cgtcgacatc agaaagagag ttgttggttg tccaaagttg    1800
ggtagattga ttaagacctt ggtctgtatt ccaactactt ctggtactgg tgctgaagtt    1860
actccttttg ctgttgttac ttccgaagaa ggtagaaagt acccattggt tgattacgaa    1920
ttgactccag atatggctat cgttgatcca gaatttgctg ttggtatgcc aaagagattg    1980
```

-continued

```
acttcttgga ctggtattga tgctttgacc catgctattg aatcctacgt ttctattatg   2040
gctaccgatt ttaccagacc atactctttg agagccgttg gtttgatttt cgaatctttg   2100
tctttggcct acaacaacgg taaggatatt gaagctagag aaaagatgca taacgcttca   2160
gctattgctg gtatggcttt tgctaatgct ttcttgggtt gttgtcattc tgttgctcat   2220
caattgggtt ccgtttacca tattccacat ggtttggcta acgctttgat gttgtcccat   2280
atcattaagt acaacgctac tgattcccca gttaagatgg gtactttttcc acagtacaag   2340 tacccacaag ccatgagaca ttatgctgaa atcgccgaat tattattgcc accaacccaa   2400
gttgttaaga tgactgatgt tgacaaggtc caatacttga tcgatagagt cgaacaattg   2460
aaggccgatg ttggtattcc taagtctatc aaagaaaccg gtatggttac cgaagaagat   2520
ttcttcaaca aggttgatca agttgccatt atggccttcg atgatcaatg tactggtgct   2580
aatccaagat acccttttggt ttctgaattg aagcaattga tgatcgatgc ttggaatggt   2640
gttgttccaa agttgtaa                                                 2658
```

<210> SEQ ID NO 50
<211> LENGTH: 2658
<212> TYPE: DNA
<213> ORGANISM: Artificial Sequence
<220> FEATURE:
<223> OTHER INFORMATION: Encoding SEQ ID NO: 48 and codon-optimized for Saccharomyces cerevisiae

<400> SEQUENCE: 50

```
atgtccggtt tacaaatgtt ccaaaacttg tccttgtacg gttccttggc tgaaattgat     60
acttccgaaa agttgaacga agccatggat aagttgactg ctgctcaaga acaattcaga    120
gaatacaatc aagaacaagt cgacaagatc ttcaaggctg ttgctttggc tgcttctcaa    180
aacagagttg cttttgctaa atacgcccat gaagaaactc aaaagggtgt tttcgaagat    240
aaggtcatta gaacgaatt cgctgccgat tacatctacc ataagtactg taatgataag    300
accgccggta tcatcgaata cgatgaagct aatggtttga tggaaattgc tgaaccagtt    360
ggtccagttg ttggtattgc tccagttact aatccaacct ctaccatcat ctacaagtcc    420
ttgattgctt tgaaaaccag aaactgcatc atcttctcac cacatccagg tgctcataag    480
gcttcagttt tgttgttaa ggtcttgcat caagctgctg ttaaggctgg tgctccagaa    540
aactgtattc aaattatctt cccaaagatg gacttgacca ccgaattatt gcatcatcaa    600
aagaccagat catttggggc tactggtggt ccaggtttgg ttcatgcttc ttatacttca    660
ggtaaaccag ctttgggtgg tggtcctggt aatgctcctg ctttgattga cgaaacttgt    720
gatatgaatg aagccgttgg ttccatcgtt gtttctaaga cttttgattg cggtatgatt    780
tgcgctactg aaaacgccgt tgttgttgta gaatctgtct acgaaaattt cgttgccact    840
atgaagaaaa aggtgcttta ctttatgacc ccagaagaaa caagaaggc ctctaatttg    900 ttgttcggtg aaggtatgag attgaacgct aaagctgttg tcaaactgc taaaacttta    960 gctgaaatgg ctggtttcga agtcccagaa aacactgttg ttttgtgtgg tgaagcttcc   1020
gaagttaagt tgaagaacc tatggctcac gaaaaattga ccactatttt gggtatctac   1080
aaggccaagg atttcgatga tggtgttaga ttgtgcaaag aattggttac ttttggtggt   1140
aagggtcata ctgctgtctt gtacactaat caaaacaaca aggacagaat cgaaaagtac   1200
caaaacgaag ttccagcctt ccatatcttg gttgatatgc catcttcttt gggttgcatt   1260
ggtgatatgt acaactttag attggctcca gctttgacta ttacctgtgg tactatgggt   1320
```

```
ggtggttctt cttctgataa tatcggtcca aaacacttgt tgaacatcaa gagagttggt    1380
atgagaagag aaaacatgtt atggttcaag atcccaaagt ccgtctactt caaaagagcc    1440
attttgtctg aagctttgtc cgatttgaga gatactcata agagagccat tatcatcacc    1500
gatagaacta tgactatgtt gggtcaaacc gataagatta ttaaggcttg tgaaggtcat    1560
ggtatggtct gtactgttta cgataaggtt gttccagatc caaccattaa gtgcattatg    1620
gaaggtgtca acgaaatgaa cgttttcaaa ccagatttgg ctattgcatt aggtggtggt    1680
agtgctatgg atgctgctaa atgatgaga ttattctacg aatacccaga ccaagacttg    1740
caagatattg ctactagatt cgtcgacatc agaaaaagag ttgtcggttg tccaaaattg    1800
ggtagattga ttaagacctt ggtctgtatt ccaactactt ctggtactgg tgctgaagtt    1860
actccttttg ctgttgttac ttctgaagaa ggtagaaagt acccattggt tgattacgaa    1920
ttgactccag atatggcaat cgttgatcca gaatttgccg ttggtatgcc aaaaagattg    1980
acttcttgga ctggtattga tgctttgacc catgctattg aatcctacgt ttctattatg    2040
gctaccgatt tcaccagacc ttattctttg agagcagttg gtttgatctt cgaatctttg    2100
tctttggcct acaacaatgg taaggatatt gaagccagag aaaagatgca taacgcttca    2160
gctattgctg gtatggcatt tgctaatgct tttttgggtt gttgccattc cgttgctcat    2220
caattgggtt ctgtttacca tattccacat ggtttggcaa acgctttgat gttgtctcac    2280
attattaagt acaacgccac tgattcccca gttaagatgg gtacatttcc acaatacaaa    2340
tacccacaag ccatgagaca ttacgcgaaa attgcagaat tgttgttgcc tccaactcaa    2400
gttgttaaga tgaccgatgt tgataaggtc caatacttga tcgatagagt cgaacaattg    2460
aaggctgatg tcggtattcc aaagtctatc aaagaaactg gtatggttac cgaagaagat    2520
ttcttcaaca aggttgatca agttgccatt atggccttcg atgatcaatg tacaggtgct    2580
aatccaagat acccttttggt ttctgaattg aagcaattga tgattgatgc ctggaatggt    2640
gttgttccaa agttgtaa                                                 2658
```

<210> SEQ ID NO 51
<211> LENGTH: 891
<212> TYPE: PRT
<213> ORGANISM: Escherichia coli

<400> SEQUENCE: 51

```
Met Ala Val Thr Asn Val Ala Glu Leu Asn Ala Leu Val Glu Arg Val
1               5                   10                  15

Lys Lys Ala Gln Arg Glu Tyr Ala Ser Phe Thr Gln Glu Gln Val Asp
            20                  25                  30

Lys Ile Phe Arg Ala Ala Ala Leu Ala Ala Ala Asp Ala Arg Ile Pro
        35                  40                  45

Leu Ala Lys Met Ala Val Ala Glu Ser Gly Met Gly Ile Val Glu Asp
    50                  55                  60

Lys Val Ile Lys Asn His Phe Ala Ser Glu Tyr Ile Tyr Asn Ala Tyr
65                  70                  75                  80

Lys Asp Glu Lys Thr Cys Gly Val Leu Ser Glu Asp Asp Thr Phe Gly
                85                  90                  95

Thr Ile Thr Ile Ala Glu Pro Ile Gly Ile Ile Cys Gly Ile Val Pro
            100                 105                 110

Thr Thr Asn Pro Thr Ser Thr Ala Ile Phe Lys Ser Leu Ile Ser Leu
        115                 120                 125
```

```
Lys Thr Arg Asn Ala Ile Ile Phe Ser Pro His Pro Arg Ala Lys Asp
    130                 135                 140

Ala Thr Asn Lys Ala Ala Asp Ile Val Leu Gln Ala Ala Ile Ala Ala
145                 150                 155                 160

Gly Ala Pro Lys Asp Leu Ile Gly Trp Ile Asp Gln Pro Ser Val Glu
                165                 170                 175

Leu Ser Asn Ala Leu Met His His Pro Asp Ile Asn Leu Ile Leu Ala
                180                 185                 190

Thr Gly Gly Pro Gly Met Val Lys Ala Ala Tyr Ser Ser Gly Lys Pro
            195                 200                 205

Ala Ile Gly Val Gly Ala Gly Asn Thr Pro Val Val Ile Asp Glu Thr
        210                 215                 220

Ala Asp Ile Lys Arg Ala Val Ala Ser Val Leu Met Ser Lys Thr Phe
225                 230                 235                 240

Asp Asn Gly Val Ile Cys Ala Ser Glu Gln Ser Val Val Val Asp
                245                 250                 255

Ser Val Tyr Asp Ala Val Arg Glu Arg Phe Ala Thr His Gly Gly Tyr
                260                 265                 270

Leu Leu Gln Gly Lys Glu Leu Lys Ala Val Gln Asp Val Ile Leu Lys
        275                 280                 285

Asn Gly Ala Leu Asn Ala Ala Ile Val Gly Gln Pro Ala Tyr Lys Ile
    290                 295                 300

Ala Glu Leu Ala Gly Phe Ser Val Pro Glu Asn Thr Lys Ile Leu Ile
305                 310                 315                 320

Gly Glu Val Thr Val Asp Glu Ser Glu Pro Phe Ala His Glu Lys
                325                 330                 335

Leu Ser Pro Thr Leu Ala Met Tyr Arg Ala Lys Asp Phe Glu Asp Ala
            340                 345                 350

Val Glu Lys Ala Glu Lys Leu Val Ala Met Gly Gly Ile Gly His Thr
        355                 360                 365

Ser Cys Leu Tyr Thr Asp Gln Asp Asn Gln Pro Ala Arg Val Ser Tyr
    370                 375                 380

Phe Gly Gln Lys Met Lys Thr Ala Arg Ile Leu Ile Asn Thr Pro Ala
385                 390                 395                 400

Ser Gln Gly Gly Ile Gly Asp Leu Tyr Asn Phe Lys Leu Ala Pro Ser
                405                 410                 415

Leu Thr Leu Gly Cys Gly Ser Trp Gly Gly Asn Ser Ile Ser Glu Asn
            420                 425                 430

Val Gly Pro Lys His Leu Ile Asn Lys Lys Thr Val Ala Lys Arg Ala
        435                 440                 445

Glu Asn Met Leu Trp His Lys Leu Pro Lys Ser Ile Tyr Phe Arg Arg
    450                 455                 460

Gly Ser Leu Pro Ile Ala Leu Asp Glu Val Ile Thr Asp Gly His Lys
465                 470                 475                 480

Arg Ala Leu Ile Val Thr Asp Arg Phe Leu Phe Asn Asn Gly Tyr Ala
                485                 490                 495

Asp Gln Ile Thr Ser Val Leu Lys Ala Ala Gly Val Glu Thr Glu Val
            500                 505                 510

Phe Phe Glu Val Glu Ala Asp Pro Thr Leu Ser Ile Val Arg Lys Gly
        515                 520                 525

Ala Glu Leu Ala Asn Ser Phe Lys Pro Asp Val Ile Ile Ala Leu Gly
    530                 535                 540

Gly Gly Ser Pro Met Asp Ala Ala Lys Ile Met Trp Val Met Tyr Glu
```

```
                545                 550                 555                 560
His Pro Glu Thr His Phe Glu Glu Leu Ala Leu Arg Phe Met Asp Ile
                        565                 570                 575
Arg Lys Arg Ile Tyr Lys Phe Pro Lys Met Gly Val Lys Ala Lys Met
                        580                 585                 590
Ile Ala Val Thr Thr Thr Ser Gly Thr Gly Ser Glu Val Thr Pro Phe
                        595                 600                 605
Ala Val Val Thr Asp Asp Ala Thr Gly Gln Lys Tyr Pro Leu Ala Asp
                        610                 615                 620
Tyr Ala Leu Thr Pro Asp Met Ala Ile Val Asp Ala Asn Leu Val Met
625                 630                 635                 640
Asp Met Pro Lys Ser Leu Cys Ala Phe Gly Gly Leu Asp Ala Val Thr
                        645                 650                 655
His Ala Met Glu Ala Tyr Val Ser Val Leu Ala Ser Glu Phe Ser Asp
                        660                 665                 670
Gly Gln Ala Leu Gln Ala Leu Lys Leu Leu Lys Glu Tyr Leu Pro Ala
                        675                 680                 685
Ser Tyr His Glu Gly Ser Lys Asn Pro Val Ala Arg Glu Arg Val His
                        690                 695                 700
Ser Ala Ala Thr Ile Ala Gly Ile Ala Phe Ala Asn Ala Phe Leu Gly
705                 710                 715                 720
Val Cys His Ser Met Ala His Lys Leu Gly Ser Gln Phe His Ile Pro
                        725                 730                 735
His Gly Leu Ala Asn Ala Leu Leu Ile Cys Asn Val Ile Arg Tyr Asn
                        740                 745                 750
Ala Asn Asp Asn Pro Thr Lys Gln Thr Ala Phe Ser Gln Tyr Asp Arg
                        755                 760                 765
Pro Gln Ala Arg Arg Tyr Ala Glu Ile Ala Asp His Leu Gly Leu
                        770                 775                 780
Ser Ala Pro Gly Asp Arg Thr Ala Ala Lys Ile Glu Lys Leu Leu Ala
785                 790                 795                 800
Trp Leu Glu Thr Leu Lys Ala Glu Leu Gly Ile Pro Lys Ser Ile Arg
                        805                 810                 815
Glu Ala Gly Val Gln Glu Ala Asp Phe Leu Ala Asn Val Asp Lys Leu
                        820                 825                 830
Ser Glu Asp Ala Phe Asp Asp Gln Cys Thr Gly Ala Asn Pro Arg Tyr
                        835                 840                 845
Pro Leu Ile Ser Glu Leu Lys Gln Ile Leu Leu Asp Thr Tyr Tyr Gly
                        850                 855                 860
Arg Asp Tyr Val Glu Gly Glu Thr Ala Ala Lys Lys Glu Ala Ala Pro
865                 870                 875                 880
Ala Lys Ala Glu Lys Lys Ala Lys Lys Ser Ala
                        885                 890

<210> SEQ ID NO 52
<211> LENGTH: 2676
<212> TYPE: DNA
<213> ORGANISM: Escherichia coli

<400> SEQUENCE: 52
atggctgtta ctaatgtcgc tgaacttaac gcactcgtag agcgtgtaaa aaaagcccag      60
cgtgaatatg ccagtttcac tcaagagcaa gtagacaaaa tcttccgcgc cgccgctctg     120
gctgctgcag atgctcgaat cccactcgcg aaaatggccg ttgccgaatc cggcatgggt     180
```

-continued

| | |
|---|---|
| atcgtcgaag ataaagtgat caaaaaccac tttgcttctg aatatatcta caacgcctat | 240 |
| aaagatgaaa aaacctgtgg tgttctgtct gaagacgaca cttttggtac catcactatc | 300 |
| gctgaaccaa tcggtattat tgcggtatc gttccgacca ctaacccgac ttcaactgct | 360 |
| atcttcaaat cgctgatcag tctgaagacc cgtaacgcca ttatcttctc cccgcacccg | 420 |
| cgtgcaaaag atgccaccaa caaagcggct gatatcgttc tgcaggctgc tatcgctgcc | 480 |
| ggtgctccga agatctgat cggctggatc gatcaacctt ctgttgaact gtctaacgca | 540 |
| ctgatgcacc acccagacat caacctgatc ctcgcgactg gtggtccggg catggttaaa | 600 |
| gccgcataca gctccggtaa accagctatc ggtgtaggcg cgggcaacac tccagttgtt | 660 |
| atcgatgaaa ctgctgatat caaacgtgca gttgcatctg tactgatgtc caaaaccttc | 720 |
| gacaacggcg taatctgtgc ttctgaacag tctgttgttg ttgttgactc tgtttatgac | 780 |
| gctgtacgtg aacgttttgc aacccacggc ggctatctgt tgcagggtaa agagctgaaa | 840 |
| gctgttcagg atgttatcct gaaaacggt gcgctgaacg cggctatcgt tggtcagcca | 900 |
| gcctataaaa ttgctgaact ggcaggcttc tctgtaccag aaaacaccaa gattctgatc | 960 |
| ggtgaagtga ccgttgttga tgaaagcgaa ccgttcgcac atgaaaaact gtccccgact | 1020 |
| ctggcaatgt accgcgctaa agatttcgaa gacgcggtag aaaaagcaga gaactggtt | 1080 |
| gctatgggcg gtatcggtca tacctcttgc ctgtacactg accaggataa ccaaccggct | 1140 |
| cgcgtttctt acttcggtca gaaaatgaaa acggcgcgta tcctgattaa caccccagcg | 1200 |
| tctcagggtg gtatcggtga cctgtataac ttcaaactcg caccttccct gactctgggt | 1260 |
| tgtggttctt ggggtggtaa ctccatctct gaaaacgttg gtccgaaaca cctgatcaac | 1320 |
| aagaaaaccg ttgctaagcg agctgaaaac atgttgtggc acaaacttcc gaaatctatc | 1380 |
| tacttccgcc gtggctccct gccaatcgcg ctggatgaag tgattactga tggccacaaa | 1440 |
| cgtgcgctca tcgtgactga ccgcttcctg ttcaacaatg gttatgctga tcagatcact | 1500 |
| tccgtactga aagcagcagg cgttgaaact gaagtcttct tcgaagtaga agcggacccg | 1560 |
| accctgagca tcgttcgtaa aggtgcagaa ctggcaaact ccttcaaacc agacgtgatt | 1620 |
| atcgcgctgg gtggtggttc cccgatggac gccgcgaaga tcatgtgggt tatgtacgaa | 1680 |
| catccggaaa ctcacttcga agagctggcg ctgcgcttta tggatatccg taaacgtatc | 1740 |
| tacaagttcc cgaaaatggg cgtgaaagcg aaaatgatcg ctgtcaccac cacttctggt | 1800 |
| acaggttctg aagtcactcc gtttgcggtt gtaactgacg acgctactgg tcagaaatat | 1860 |
| ccgctggcag actatgcgct gactccggat atggcgattg tcgacgccaa cctggttatg | 1920 |
| gacatgccga agtccctgtg tgctttcggt ggtctggacg cagtaactca cgccatggaa | 1980 |
| gcttatgttt ctgtactggc atctgagttc tctgatggtc aggctctgca ggcactgaaa | 2040 |
| ctgctgaaag aatatctgcc agcgtcctac cacgaagggt ctaaaaatcc ggtagcgcgt | 2100 |
| gaacgtgttc acagtgcagc gactatcgcg ggtatcgcgt ttgcgaacgc cttcctgggt | 2160 |
| gtatgtcact caatggcgca caaactgggt tcccagttcc atattccgca cggtctggca | 2220 |
| aacgccctgc tgatttgtaa cgttattcgc tacaatgcga acgacaaccc gaccaagcag | 2280 |
| actgcattca gccagtatga ccgtccgcag gctcgccgtc gttatgctga aattgccgac | 2340 |
| cacttgggtc tgagcgcacc gggcgaccgt actgctgcta agatcgagaa actgctggca | 2400 |
| tggctggaaa cgctgaaagc tgaactgggt attccgaaat ctatccgtga agctggcgtt | 2460 |
| caggaagcag acttcctggc gaacgtggat aaactgtctg aagatgcatt cgatgaccag | 2520 |
| tgcaccggcg ctaacccgcg ttacccgctg atctccgagc tgaaacagat tctgctggat | 2580 |

| acctactacg gtcgtgatta tgtagaaggt gaaactgcag cgaagaaaga agctgctccg | 2640 |
| gctaaagctg agaaaaaagc gaaaaaatcc gcttaa | 2676 |

<210> SEQ ID NO 53
<211> LENGTH: 2676
<212> TYPE: DNA
<213> ORGANISM: Artificial Sequence
<220> FEATURE:
<223> OTHER INFORMATION: Encoding SEQ ID NO: 51 and codon-optimized for
    Saccharomyces cerevisiae

<400> SEQUENCE: 53

| atggctgtta ccaatgttgc tgaattgaac gctttggttg aaagagttaa gaaagcccaa | 60 |
| agagaatacg cttctttcac ccaagaacaa gttgacaaga tttttagagc tgctgctttg | 120 |
| gctgctgctg atgctagaat ccattggct aaaatggctg ttgcagaatc tggtatgggt | 180 |
| atcgttgaag ataaggttat caagaaccat ttcgcctctg agtacatcta caatgcttac | 240 |
| aaagacgaaa agacctgcgg tgttttgtct gaagatgata ctttcggtac tattaccatt | 300 |
| gccgaaccta ttggtattat ctgtggtatc gttccaacta ccaatccaac ttctactgcc | 360 |
| attttcaagt ccctgatttc cttgaaaact aggaacgcca ttatcttctc accacatcca | 420 |
| agagctaaag atgctacaaa caaagctgct gatattgtct tgcaagctgc tattgctgct | 480 |
| ggtgctccaa agatttgat tggttggatt gatcaaccat ccgtcgaatt gtctaatgct | 540 |
| ttaatgcatc acccagacat caacttgatt ttggctactg gtggtccagg tatggttaag | 600 |
| gctgcttatt cttctggtaa accagctatt ggtgttggtg caggtaatac tccagttgtt | 660 |
| attgacgaaa ccgccgatat taagagagct gttgcttctg ttttgatgtc caagactttt | 720 |
| gacaacggtg ttatttgcgc ttccgaacaa tcagttgttg ttgtcgattc tgtttacgat | 780 |
| gccgttagag aaagatttgc tactcatggt ggttacttgt tgcagggtaa agaattgaaa | 840 |
| gccgttcaag acgttatctt gaagaatggt gctttgaatg ctgctatagt tggtcaacca | 900 |
| gcttacaaaa ttgcagaatt ggctggtttt tccgttccag aaaacaccaa atcttgatc | 960 |
| ggtgaagtta ccgttgttga cgaatctgaa ccatttgctc acgaaaaatt gtctccaact | 1020 |
| ttggctatgt acagagctaa ggattttgaa gatgctgttg aaaaggccga aagttggtt | 1080 |
| gctatgggtg gtattggtca tacttcttgc ttgtacactg accaagataa tcaaccagca | 1140 |
| agagtttctt acttcggtca aaaaatgaag accgctagga tcttgattaa cactccagct | 1200 |
| tctcaaggtg gtataggtga cttgtacaat tttaagttgg ctccctcatt gaccttaggt | 1260 |
| tgtggttctt ggggtggtaa ttctatctct gaaaatgttg gtccaaagca cctgatcaac | 1320 |
| aaaaagactg ttgctaaaag ggctgagaat atgttgtggc ataagttgcc aaagtccatc | 1380 |
| tactttagaa gaggttcttt gccaattgcc ttggatgaag ttattaccga tggtcacaaa | 1440 |
| agagctttga tcgttactga cagattcctg tttaacaacg ttacgctga tcaaatcact | 1500 |
| tccgttttga aagcagctgg tgttgaaact gaagttttct tcgaagttga agctgatcca | 1560 |
| accttgtcta tcgttagaaa aggtgctgaa ttagccaact cctttaagcc agatgttatt | 1620 |
| attgctcttg gtggtggttc tccaatggat gctgctaaga ttatgtgggt tatgtacgaa | 1680 |
| catccagaaa ctcatttcga agaattggcc ttgagattca tggacattag aaagaggatc | 1740 |
| tacaagttcc caaagatggg tgttaaggct aagatgattg ctgttactac tacttctggt | 1800 |
| actggttctg aagttactcc atttgctgtt gttactgatg atgctactgg tcaaaagtac | 1860 |
| ccattggctg attatgcttt gactccagat atggctattg tcgatgctaa cttggttatg | 1920 |

-continued

```
gatatgccta aatctttgtg tgctttcggt ggtttggatg ctgttacaca tgctatggaa    1980
gcttacgttt ctgttttagc ctctgaattc tctgatggtc aagctttaca agccctgaag    2040
ttgttgaaag aatatttgcc agcttcctac cacgaaggtt caaaaaatcc agttgcaaga    2100
gaaagagttc attccgctgc tactattgct ggtattgctt ttgctaatgc ctttttgggt    2160
gtttgccatt ctatggctca taagttgggt tcccaattcc atattccaca tggtttggca    2220
aacgccttgt tgatctgtaa cgttattaga tacaacgcca acgacaaccc aacaaagcaa    2280
actgcttttt cacaatacga tagaccacag gctagaagaa gatatgctga aattgctgat    2340
cacttgggtt tgtctgctcc aggtgataga actgctgcta aaattgaaaa gttgttggct    2400
tggttggaaa ccttgaaggc tgaattgggt attccaaagt ctattagaga agccggtgtt    2460
caagaagctg attttttggc taatgtcgac aagttgtccg aagatgcatt tgatgatcaa    2520
tgtactggtg ctaatccaag atacccattg atctccgaat tgaagcaaat tttgttggac    2580
acctactacg gtagagatta cgttgaaggt gaaactgctg caagaaaga agctgctcca    2640 gctaaagctg aaaagaaagc taaaaagtcc gcctaa                              2676
```

```
<210> SEQ ID NO 54
<211> LENGTH: 954
<212> TYPE: PRT
<213> ORGANISM: Chlamydomonas rheinhardii

<400> SEQUENCE: 54
```

```
Met Met Ser Ser Ser Leu Val Ser Gly Lys Arg Val Ala Val Pro Ser
1               5                   10                  15

Ala Ala Lys Pro Cys Ala Ala Val Pro Leu Pro Arg Val Ala Gly Arg
            20                  25                  30

Arg Thr Ala Ala Arg Val Val Cys Glu Ala Ala Pro Ser Gly Ala Ala
        35                  40                  45

Pro Ala Ser Pro Lys Ala Glu Ala Ala Pro Val Ala Ala Ala Pro
    50                  55                  60

Ala Thr Pro His Ala Glu Val Lys Lys Glu Arg Ala Pro Ala Thr Asp
65                  70                  75                  80

Glu Ala Leu Thr Glu Leu Lys Ala Leu Leu Lys Arg Ala Gln Thr Ala
                85                  90                  95

Gln Ala Gln Tyr Ser Thr Tyr Thr Gln Glu Gln Val Asp Glu Ile Phe
            100                 105                 110

Arg Ala Ala Ala Glu Ala Ala Asn Ala Ala Arg Ile Pro Leu Ala Lys
        115                 120                 125

Met Ala Val Glu Glu Thr Arg Met Gly Val Ala Glu Asp Lys Val Val
    130                 135                 140

Lys Asn His Phe Ala Ser Glu Phe Ile Tyr Asn Lys Tyr Lys His Thr
145                 150                 155                 160

Lys Thr Cys Gly Val Ile Glu His Asp Pro Ala Gly Ile Gln Lys
                165                 170                 175

Val Ala Glu Pro Val Gly Val Ile Ala Gly Ile Val Pro Thr Thr Asn
            180                 185                 190

Pro Thr Ser Thr Ala Ile Phe Lys Ser Leu Leu Ser Leu Lys Thr Arg
        195                 200                 205

Asn Ala Leu Val Leu Cys Pro His Pro Arg Ala Ala Lys Ser Thr Ile
    210                 215                 220

Ala Ala Ala Arg Ile Val Arg Asp Ala Ala Val Ala Ala Gly Ala Pro
225                 230                 235                 240
```

```
Pro Asn Ile Ile Ser Trp Val Glu Thr Pro Ser Leu Pro Val Ser Gln
            245                 250                 255

Ala Leu Met Gln Ala Thr Glu Ile Asn Leu Ile Leu Ala Thr Gly Gly
        260                 265                 270

Pro Ala Met Val Arg Ala Ala Tyr Ser Ser Gly Asn Pro Ser Leu Gly
    275                 280                 285

Val Gly Ala Gly Asn Thr Pro Ala Leu Ile Asp Glu Thr Ala Asp Val
290                 295                 300

Ala Met Ala Val Ser Ser Ile Leu Leu Ser Lys Thr Phe Asp Asn Gly
305                 310                 315                 320

Val Ile Cys Ala Ser Glu Gln Ser Val Val Val Ala Lys Ala Tyr
                325                 330                 335

Asp Ala Val Arg Thr Glu Phe Val Arg Arg Gly Ala Tyr Phe Leu Thr
                340                 345                 350

Glu Asp Asp Lys Val Lys Val Arg Ala Gly Val Val Asp Gly Lys
                355                 360                 365

Leu Asn Pro Asn Ile Val Gly Gln Ser Ile Pro Lys Leu Ala Ala Leu
        370                 375                 380

Phe Gly Ile Lys Val Pro Gln Gly Thr Lys Val Leu Ile Gly Glu Val
385                 390                 395                 400

Glu Lys Ile Gly Pro Glu Glu Ala Leu Ser Gln Glu Lys Leu Cys Pro
                405                 410                 415

Ile Leu Ala Met Tyr Arg Ala Pro Asp Tyr Asp His Gly Val Lys Met
                420                 425                 430

Ala Cys Glu Leu Ile Met Tyr Gly Gly Ala Gly His Thr Ser Val Leu
                435                 440                 445

Tyr Thr Asn Pro Leu Asn Asn Ala His Ile Gln Gln Tyr Gln Ser Ala
    450                 455                 460

Val Lys Thr Val Arg Ile Leu Ile Asn Thr Pro Ala Ser Gln Gly Ala
465                 470                 475                 480

Ile Gly Asp Leu Tyr Asn Phe His Leu Asp Pro Ser Leu Thr Leu Gly
                485                 490                 495

Cys Gly Thr Trp Gly Ser Thr Ser Val Ser Thr Asn Val Gly Pro Gln
            500                 505                 510

His Leu Leu Asn Ile Lys Thr Val Thr Ala Arg Arg Glu Asn Met Leu
        515                 520                 525

Trp Phe Arg Val Pro Pro Lys Ile Tyr Phe Lys Gly Cys Leu Glu
    530                 535                 540

Val Ala Leu Thr Asp Leu Arg Gly Lys Ser Arg Ala Phe Ile Val Thr
545                 550                 555                 560

Asp Lys Pro Leu Phe Asp Met Gly Tyr Ala Asp Lys Val Thr His Ile
                565                 570                 575

Leu Asp Ser Ile Asn Val His His Gln Val Phe Tyr His Val Thr Pro
            580                 585                 590

Asp Pro Thr Leu Ala Cys Ile Glu Ala Gly Leu Lys Glu Ile Leu Glu
                595                 600                 605

Phe Lys Pro Asp Val Ile Ile Ala Leu Gly Gly Gly Ser Pro Met Asp
        610                 615                 620

Ala Ala Lys Ile Met Trp Leu Met Tyr Glu Cys Pro Asp Thr Arg Phe
625                 630                 635                 640

Asp Gly Leu Ala Met Arg Phe Met Asp Ile Arg Lys Arg Val Tyr Glu
                645                 650                 655
```

Val Pro Glu Leu Gly Lys Lys Ala Thr Met Val Cys Ile Pro Thr Thr
            660                 665                 670

Ser Gly Thr Gly Ser Glu Val Thr Pro Phe Ser Val Val Thr Asp Glu
            675                 680                 685

Arg Leu Gly Ala Lys Tyr Pro Leu Ala Asp Tyr Ala Leu Thr Pro Ser
        690                 695                 700

Met Ala Ile Val Asp Pro Gln Leu Val Leu Asn Met Pro Lys Lys Leu
705                 710                 715                 720

Thr Ala Trp Gly Gly Ile Asp Ala Leu Thr His Ala Leu Glu Ser Tyr
                725                 730                 735

Val Ser Ile Cys Ala Thr Asp Tyr Thr Lys Gly Leu Ser Arg Glu Ala
        740                 745                 750

Ile Ser Leu Leu Phe Lys Tyr Leu Pro Arg Ala Tyr Ala Asn Gly Ser
    755                 760                 765

Asn Asp Tyr Leu Ala Arg Glu Lys Val His Tyr Ala Ala Thr Ile Ala
770                 775                 780

Gly Met Ala Phe Ala Asn Ala Phe Leu Gly Ile Cys His Ser Met Ala
785                 790                 795                 800

His Lys Leu Gly Ala Ala Tyr His Val Pro His Gly Leu Ala Asn Ala
                805                 810                 815

Ala Leu Ile Ser His Val Ile Arg Tyr Asn Ala Thr Asp Met Pro Ala
            820                 825                 830

Lys Gln Ala Ala Phe Pro Gln Tyr Glu Tyr Pro Thr Ala Lys Gln Asp
        835                 840                 845

Tyr Ala Asp Leu Ala Asn Met Leu Gly Leu Gly Gly Asn Thr Val Asp
850                 855                 860

Glu Lys Val Ile Lys Leu Ile Glu Ala Val Glu Leu Lys Ala Lys
865                 870                 875                 880

Val Asp Ile Pro Pro Thr Ile Lys Glu Ile Phe Asn Asp Pro Lys Val
                885                 890                 895

Asp Ala Asp Phe Leu Ala Asn Val Asp Ala Leu Ala Glu Asp Ala Phe
            900                 905                 910

Asp Asp Gln Cys Thr Gly Ala Asn Pro Arg Tyr Pro Leu Met Ala Asp
        915                 920                 925

Leu Lys Gln Leu Tyr Leu Asp Ala His Ala Ala Pro Ile Leu Pro Val
    930                 935                 940

Lys Thr Leu Glu Phe Phe Ser Lys Ile Asn
945                 950

<210> SEQ ID NO 55
<211> LENGTH: 2865
<212> TYPE: DNA
<213> ORGANISM: Chlamydomonas rheinhardii

<400> SEQUENCE: 55
atgatgtcat cttcattggt ttctggtaag agagttgctg ttccttcagc tgccaagcca        60
tgtgctgctg ttccattgcc aagagttgct ggtagaagaa ctgctgctag agttgtttgt       120
gaagctgctc catctggtgc tgctccagct tctccaaaag ctgaagctgc tgctccagtt       180
gctgctgccc ctgccactcc acatgctgaa gttaagaaag aaagagcacc agctactgac       240
gaagctttga ctgaattgaa agccttgttg aaaagagccc aaactgctca agctcaatac       300
tctacttaca cccaagaaca agtcgacgaa attttagag ctgctgctga agctgcaaat        360
gctgctagaa ttccattggc taaaatggct gttgaagaaa ctagaatggg tgttgctgaa       420

```
gataaggttg ttaagaatca tttcgcctcc gaattcatct acaacaagta caaacatacc    480
aagacctgcg gtgttattga acatgatcca gctggtggta ttcaaaaagt tgctgaacca    540
gttggtgtta ttgctggtat agttccaact actaatccaa cttccaccgc tattttcaag    600
tctttgttgt ccttgaaaac cagaaacgct ttggttttgt gtccacatcc aagagctgct    660
aaatctacta ttgctgctgc aagaatcgta agagatgcag ctgttgctgc tggtgctcca    720
ccaaatatta tttcttgggt tgaaacccca tccttgccag tttctcaagc tttgatgcaa    780
gctactgaaa tcaacttgat tttggctact ggtggtccag ctatggttag agctgcttat    840
tcttctggta atccatcttt gggtgttggt gctggtaata ctccagcttt gattgacgaa    900
actgctgatg ttgctatggc tgtttcttct attttgttgt ccaagacctt cgataacggt    960
gttatttgtg cttctgaaca atccgttgtt gttgttgcta agcttacga tgctgttaga   1020
accgaattcg ttagaagagg tgcttacttc ttgaccgaag atgataaggt caaagttaga   1080
gctggtgttg ttgttgacgg taaattgaat ccaaacatcg ttggtcaatc cattccaaaa   1140
ttggctgctt tgttcggtat caaagttcca caaggtacta aggttttgat cggtgaagtt   1200
gaaaagatcg gtccagaaga agctttgtct caagaaaagt tgtgcccaat tttggctatg   1260
tatagagcac cagattacga tcatggtgtt aagatggctt gcgaattgat tatgtatggt   1320
ggtgcaggtc atacttctgt cttgtataca aacccattga acaacgccca catccaacaa   1380
tatcaatctg ctgttaagac cgtcagaatc ttgattaaca caccagcttc tcaaggtgct   1440
attggtgact tgtacaactt tcatttggat ccatctttga ccttgggttg tggtacttgg   1500
ggttctactt ctgtttctac taatgttggt ccacaacact tgttgaacat taagactgtt   1560
accgctagaa gagaaaacat gttgtggttt agagtcccac caaagatcta ctttaagggt   1620
ggttgtttgg aagttgcttt gacagatttg agaggtaagt ctagagcttt catcgttact   1680
gataagcctt tgttcgatat gggttacgct gataaggtta cccatatttt ggattccatc   1740
aacgttcacc accaagtttt ctatcatgtt actccagatc caaccttggc ttgtattgaa   1800
gctggtttga agaaatctt ggaattcaag ccagacgtca ttattgcttt gggtggtggt   1860
tctccaatgg atgctgctaa aattatgtgg ttgatgtacg aatgcccaga tacaagattt   1920
gatggtttgg ctatgagatt catggacatc agaaagagag tttacgaagt tccagaattg   1980
ggtaaaaagg ctaccatggt atgtattcca actacttctg gtactggttc tgaagttact   2040
ccattctctg ttgttaccga cgaaagattg ggtgctaaat atccattagc tgattacgct   2100
ttgacccat ctatggctat agttgatcca caattggtct tgaacatgcc aaaaaaattg   2160
actgcttggg gtggtattga tgctttgact catgctttgg aatcctacgt ttctatttgt   2220
gctaccgatt acaccaaggg tttgtctaga gaagctattt ccttgttgtt caagtacttg   2280
ccaagagctt acgctaatgg ttctaatgat tacttggcca gagaaaaggt tcattacgct   2340
gctacaattg ctggtatggc ttttgctaat gccttcttgg gtatttgtca ttctatggct   2400
cataagttgg gtgctgctta tcatgttcca catggtttag ctaacgctgc tttgatttcc   2460
catgtcatta gatacaacgc tactgatatg ccagctaaac aagctgcttt tccacaatat   2520
gaatacccaa ctgccaagca agattatgct gatttggcta atatgttggg tttgggtggt   2580
aacactgttg acgaaaaggt tatcaagttg atcgaagccg tcgaagaatt gaaagctaag   2640
gttgatattc caccaaccat caagaaaatc ttcaacgatc aaaggttga tgctgatttc   2700
ttggctaatg ttgatgcttt ggctgaagat gctttcgatg atcaatgtac tggtgctaat   2760
ccaagatatc cattgatggc tgacttgaag caattatact tggatgctca tgctgctcca   2820
``` atttttgccag ttaagacttt ggaattcttc tccaaaatca actaa 2865

<210> SEQ ID NO 56
<211> LENGTH: 2865
<212> TYPE: DNA
<213> ORGANISM: Artificial Sequence
<220> FEATURE:
<223> OTHER INFORMATION: Encoding SEQ ID NO: 54 and codon-optimized for
      Saccharomyces cerevisiae

<400> SEQUENCE: 56

```
atgatgtcct cctctttggt ttctggtaaa agagttgctg ttccatctgc tgctaaacca      60
tgtgctgctg ttcctttgcc aagagttgca ggtagaagaa ctgctgctag agttgtttgt    120
gaagctgctc catcaggtgc tgctccagct tctccaaaag cagaagctgc tgctcctgtt    180
gctgctgcac cagctacacc acatgctgaa gttaagaaag aaagagcccc agctactgac    240
gaagctttga ctgaattgaa agctttgttg aagagagccc aaactgctca agctcaatat    300
tctacttaca cccaagaaca agtcgacgaa attttcagac tgctgccga agctgctaat     360
gctgcaagaa ttccattggc taaaatggct gttgaagaaa ccagaatggg tgttgctgaa    420
gataaggttg ttaagaatca tttcgcctcc gaattcatct acaacaagta caacatacc     480
aagacctgcg gtgttattga acatgatcca gctggtggta ttcaaaaagt tgctgaacca    540
gttggtgtta tcgctggtat agttccaact actaatccaa cttctaccgc cattttcaag    600
tccttgttgt ctttgaaaac cagaaacgct ttggttttgt gtccacatcc aagagctgct    660
aaatctacta ttgctgcagc tagaatagtt agagatgctg cagttgcagc tggtgctcca    720
ccaaacatta tttcttgggt tgaaactcca tccttgccag tttctcaagc tttgatgcaa    780
gctactgaaa tcaacttgat attggctact ggtggtccag ctatggttag agctgcttat    840
tcttctggta atccatcttt gggtgttggt gctggtaata ctccagcttt gattgacgaa    900
actgctgatg ttgctatggc cgtttcttct attttgttgt ctaagacctt cgacaacggt    960
gttatatgtg cttctgaaca atccgttgtt gttgtcgcta agcttatga tgctgttaga   1020
accgaattcg ttagaagagg tgcttacttc ttgaccgaag atgataaggt aaaagttaga   1080
gccggtgttg tcgttgatgg taaattgaat ccaaacatcg tcggtcaatc cattccaaaa   1140
ttggctgctt tgttcggtat taaggttcca caaggtacta aggttttgat cggtgaagtt   1200
gaaaagatcg gtccagaaga agctttgtct caagaaaagt tgtgtccaat cttggctatg   1260
tatagagcac cagattatga tcacggtgtt aagatggctt gcgaattgat tatgtatggt   1320
ggtgcaggtc atacttctgt cttgtacact aatccattga caacgccca tatccaacaa   1380
tatcaatctg ctgttaagac cgtcagaatc ttgattaaca ctccagcatc tcaaggtgct   1440
attggtgact tgtacaattt ccatttggac ccatctttga cttttgggttg tggtacttgg   1500
ggttctactt ctgttttctac taatgttggt ccacaacact tgtttaacat caagactgtt   1560
actgctagaa gagaaaacat gttgtggttt agagttccac caaagatcta ctttaagggt   1620
ggttgtttag aagttgcctt gactgatttg agaggtaagt ctagagcttt catcgttact   1680
gataagcctt tgtttgacat gggttacgct gataaggtta cccatattt ggattccatc   1740
aacgttcacc accaagtttt ctatcatgtt actccagatc caaccttggc ttgcattgaa   1800
gctggttga aagaaatctt ggaattcaag ccagatgtca ttattgcttt aggtggtggt   1860
tctccaatgg atgctgctaa gattatgtgg ttgatgtat aatgtccaga caccagattc   1920
gatggtttgg ctatgagatt catggacatc agaaagagag tttacgaagt tccagaattg   1980
```

```
ggtaaaaagg ctaccatggt ctgtattcca acaacttctg gtactggttc tgaagttact    2040
ccattctctg ttgttacaga cgaaagattg ggtgctaaat acccattggc tgattatgct    2100
ttgactccat ctatggctat agttgatcca caattggttt tgaacatgcc aaaaaagttg    2160
actgcttggg gtggtattga tgctttaact catgctttgg aatcctacgt ttctatttgt    2220
gctactgatt acaccaaggg tttgtctaga gaagccattt ctttgttgtt taagtacttg    2280
cctagagctt acgccaatgg ttctaatgat tatttggcca gagaaaaggt tcattacgct    2340
gctacaattg ctggtatggc ttttgctaat gccttcttgg gtatttgtca ttccatggct    2400
cataagttgg gtgctgctta tcatgttcca cacggtttgg caaatgctgc tttgatttct    2460
catgtcatta gatacaacgc taccgatatg ccagctaaac aagctgcttt tccacaatat    2520
gaatacccaa ctgctaagca agattacgcc gatttggcta atatgttggg tttgggtggt    2580
aacactgttg acgaaaaggt tatcaaattg atcgaagccg tcgaagaatt gaaggctaaa    2640
gttgatattc caccaaccat caaagaaata ttcaacgatc caaaggttga cgctgatttc    2700
ttggctaatg ttgatgcatt agctgaagat gccttcgatg atcaatgtac tggtgctaat    2760
ccaagatatc cattgatggc tgatttgaag caattatact tggatgctca tgctgcccca    2820
attttgccag ttaagacttt ggaatttttc tcaaagatta actaa                    2865

<210> SEQ ID NO 57
<211> LENGTH: 5
<212> TYPE: PRT
<213> ORGANISM: Artificial Sequence
<220> FEATURE:
<223> OTHER INFORMATION: Synthetic motif sequence
<220> FEATURE:
<221> NAME/KEY: VARIANT
<222> LOCATION: 3
<223> OTHER INFORMATION: Xaa = Any Amino Acid

<400> SEQUENCE: 57

Leu Pro Xaa Thr Gly
1               5
```

BACTERIAL-DERIVED NITROGEN SOURCE FOR ETHANOL FERMENTATION

CROSS-REFERENCE TO RELATED APPLICATIONS AND DOCUMENTS

This application claims priority from U.S. provisional patent applications 63/050,588 filed on Jul. 10, 2020 and 63/106,785 filed on Oct. 28, 2020.

STATEMENT REGARDING SEQUENCE LISTING

The Sequence Listing associated with this application is provided in text format in lieu of a paper copy, and is hereby incorporated by reference into the specification. The name of the text file containing the Sequence Listing is 580127_432_SEQUENCE_LISTING.txt. The text file is 162,999 bytes, was created on Jul. 7, 2021, and is being submitted electronically via EFS-Web.

TECHNOLOGICAL FIELD

The present disclosure concerns the use of a recombinant bacterial host cell to provide a source of nitrogen for a yeast in a process for making ethanol from the fermentation of a biomass.

BACKGROUND

Nitrogen availability is an important aspect of any fermentation process and lack of accessible nitrogen for yeast contributes to stuck or sluggish fermentations. The addition of urea to corn mash is a common practice in the bio-ethanol industry to increase fermentation performance and final ethanol titers. Urea is employed due to its relatively low cost and ease of handling. However, urea must be cleaved into ammonia and $CO_2$ prior to assimilation, so its use imposes a metabolic burden on yeast. As a result, it is not the preferred nitrogen source of *Saccharomyces cerevisiae* and decreased growth rates are typically seen for *S. cerevisiae* cultures in which urea is the sole exogenous nitrogen source. When preferred nitrogen sources are available, *S. cerevisiae* utilizes a nitrogen catabolite repression system (NCR) which down regulates pathways involved in the utilization of non-favorable nitrogen sources such as urea. Nitrogen sources which induce NCR include free amino acids such as glutamine, asparagine, and glutamate, as well as ammonia. The mashing process does liberate some free amino nitrogen and these are utilized as a nitrogen source throughout the fermentation by *S. cerevisiae*. However, the majority of amino nitrogen remains inaccessible to the yeast in the form of proteins and large peptides. The addition of a source of an exogenous and purified protease to corn bio-ethanol fermentations is sometimes used to increase the availability of free amino acids and improve fermentation performance.

It would be highly desirable to provide a nitrogen source for a fermenting yeast which would limit or impede stuck or sluggish fermentations. Preferably this nitrogen source would induce the NCR in the yeast (so as to be metabolically advantageous for the yeast) and/or would limit the amount of exogenous nitrogen source to the fermenting yeast. In some embodiments, the nitrogen source would reduce the addition of an exogenous enzyme (so as to limit the cost associated with the fermentation).

BRIEF SUMMARY

The present disclosure concerns a recombinant bacterial host cell that is capable of providing a nitrogen source to a yeast during a fermentation process to convert a biomass into ethanol. The nitrogen source is generated by the metabolic (e.g., proteolytic) activity of the recombinant bacterial host cell.

According to a first embodiment, the present disclosure provides a recombinant bacterial host cell being capable of converting a biomass into ethanol and having at least one first genetic modification. The at least one first genetic modification is for increasing, when compared to a corresponding control bacterial cell lacking the at least one first genetic modification, the proteolytic activity associated with the recombinant bacterial host cell. The at least one first genetic modification is also for providing a nitrogen source to a yeast capable of converting the biomass into ethanol, wherein the nitrogen source comprises a peptide, an amino acid and/or ammonia. In an embodiment, the proteolytic activity associated with the recombinant bacterial host cell is extracellular. In yet another embodiment, the at least one first genetic modification allows an increase in the expression or the activity of one or more protease when compared to the expression of the one or more protease in the corresponding control bacterial cell lacking the at least one first genetic modification. In such embodiment, the one or more protease is secreted or tethered to the bacterial cell membrane. In an embodiment, the one or more protease comprises an endopeptidase. In still a further embodiment, the one or more protease comprises a native protease. In still a further embodiment, the at least one first genetic modification allows a reduction in the expression or the biological activity of a transcription factor repressing the expression of the one or more native protease. In a specific embodiment, the transcription factor is a OmpR-family response regulator (PrcR). In yet another specific embodiment, the at least one first genetic modification comprises modifying a regulatory region of the one or more native protease. In yet a further specific embodiment, the at least one first genetic modification comprises removing, at least in part, a PrcR-responsive element in the regulatory region of the one or more native protease. In yet another embodiment, the one or more native protease comprises lactocepin (PrtP). In an embodiment, the at least one first genetic modification allows the expression of a heterologous protease, a variant of the heterologous protease having proteolytic activity or a fragment of the heterologous protease having proteolytic activity. In another embodiment, the heterologous protease, variant or fragment comprises a neutral protease and/or an acid protease. In still another embodiment, the heterologous protease comprises lactocepin, a variant of lactocepin having proteolytic activity or a fragment lactocepin having proteolytic activity. In still another embodiment, the heterologous protease comprises NprE, a variant of NprE having proteolytic activity or a fragment of NprE having proteolytic activity. In a further embodiment, the recombinant bacterial host cell further comprises at least one second genetic modification allowing the expression of a heterologous ketoisovalerate decarboxylase, a variant of the heterologous ketoisovalerate decarboxylase having decarboxylase activity or a fragment of the heterologous ketoisovalerate decarboxylase having decarboxylase activity. In still a further embodiment, the recombinant bacterial host cell has at least one inactivated native gene coding for a glutamine synthetase (such as, for example, glnA). In still a further embodiment, the recombinant bacterial host cell further comprises at least one third genetic modification for expressing one or more heterologous enzyme for converting the biomass into ethanol. In an embodiment, the biomass comprises or is derived from corn. In still another embodiment, the one or more heterologous enzyme for converting the biomass into ethanol comprises a polypeptide having pyruvate decarboxylase activity, a polypeptide having alcohol dehydrogenase activity or a combination thereof. In a further embodiment, the recombinant bacterial host cell has a decreased lactate dehydrogenase activity when compared to a corresponding bacterial cell lacking the at least one second genetic modification. In yet a further embodiment, the recombinant bacterial host cell has at least one inactivated native gene coding for a lactate dehydrogenase (such as, for example, ldh1, ldh2, ldh3 or ldh4). In an embodiment, the recombinant bacterial host cell is a recombinant lactic acid bacteria (LAB) host cell. In another embodiment, the recombinant bacterial host cell is from the genus *Lactobacillus* sp. (such as, for example, from the species *Lactobacillus paracasei*).

According to a second aspect, the present disclosure concerns combination comprising a recombinant bacterial host cell as described herein and a yeast capable of converting a biomass into ethanol. In an embodiment, the yeast is a recombinant yeast host cell. In still a further embodiment, the recombinant yeast host cell is capable of expressing a heterologous glucoamylase. In yet another embodiment, the yeast is of the genus *Saccharomyces* sp. (such as for example, from the species *Saccharomyces cerevisiae*).

According to a third aspect, the present disclosure concerns a composition comprising starch and a recombinant bacterial host cell as described herein. In an embodiment, starch is in a gelatinized form. In still another embodiment, the composition further comprises a yeast as described herein.

According to a fourth aspect, the present disclosure concerns a process for converting a biomass into ethanol. The process comprises contacting the biomass with a recombinant bacterial host cell as described herein and a yeast capable as described herein under condition to allow the conversion of at least a part of the biomass into ethanol. In an embodiment, the biomass comprises or is derived from corn. In yet another embodiment, the corn is provided as a mash. In an embodiment, the process is for increasing the amount of a peptide, an amino acid and/or ammonia prior to, during or after the conversion (also referred to as the fermentation). In still another embodiment, the amino acid comprises glutamine, asparagine or glutamate. In an embodiment, the process can comprise adding a reduced amount of a nitrogen source to the biomass and achieving at least the same fermentation yield than a control fermentation completed in the absence of the recombinant bacterial host cell. In such embodiment, the reduced amount of the nitrogen source is lower than the amount necessary in the control fermentation. In an embodiment, the nitrogen source is a non-favorable nitrogen source (such as, for example, urea). In still another embodiment, the process further comprises adding less than 600 ppm of urea to the fermentation medium. In another embodiment, the process comprises adding a reduced amount of an exogenous enzyme to the biomass and achieving at least the same fermentation yield than a control fermentation completed in the absence of the recombinant bacterial host cell. In such embodiment, the reduced amount of the exogenous enzyme is lower than the amount necessary in the control fermentation. In an embodiment, the exogenous enzyme comprises or is a protease. In an embodiment, the exogenous enzyme comprises or is a glucoamylase.

BRIEF DESCRIPTION OF THE DRAWINGS

Having thus generally described the nature of the invention, reference will now be made to the accompanying drawings, showing by way of illustration, a preferred embodiment thereof, and in which.

DETAILED DESCRIPTION

Figure 1:
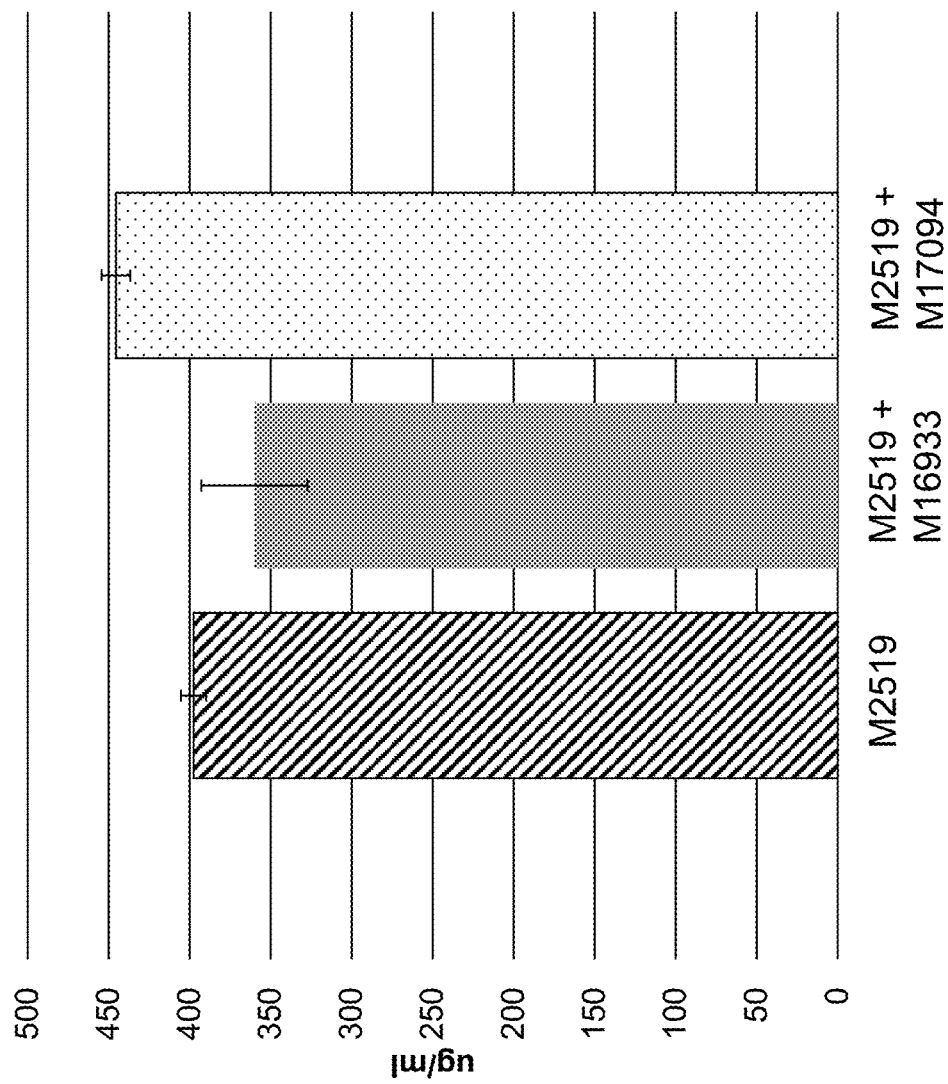
FIG. 1 shows the total residual free amino acids following fermentation of corn mash with yeast strain M2519 with and without the addition of ethanologen M16933 and M17094. Results are shown as the concentration of total amino acid (μg/ml) in the corn mash in function of the fermenting organisms used: M2519 only (diagonal hatch), M2519 and M16933 (grey) and M2519 and M17094 (dotted).

The present disclosure concerns a recombinant bacterial host cell having the ability to convert a biomass into ethanol and including at least one (first) genetic modification. The at least one genetic modification increases the proteolytic activity of the recombinant bacterial host cell (when compared to the proteolytic activity of a control bacterial cell lacking the at least one genetic modification). The at least one genetic modification also provides a source of nitrogen to a yeast which is also capable of converting the biomass into ethanol. The nitrogen source includes, without limitations, one or more peptide, one or more discrete/free amino acid, ammonia or combinations thereof. Without wishing to be bound to theory, the nitrogen source can allow the yeast to improve its fermentation yield, to maintain its robustness and, in some embodiments, the nutritional value of the whole stillage obtained from the fermentation.

Some bacteria, such as lactic acid bacteria (LAB) (and including, for example, *Lactobacillus paracasei* strain), are typically auxotrophic for several amino acids and therefore depend on peptides and amino acids to supply their nitrogen needs. Ammonia is a native by-product of this catabolism, so increasing the flux of amino acid utilization by a recombinant bacterial host cell could therefore improve nitrogen availability for a fermenting yeast (such as S. cerevisiae). As shown in the Example, the deletion of the regulatory protein PrcR in a recombinant LAB up-regulated a large number of genes, the majority of which are involved in nitrogen metabolism. As it is known in the art, the expression of the cell-anchored proteinase PrtP was shown to be increased 27-fold when the prcR gene is deactivated. In the Example, Lb. paracasei 12A was converted into an ethanologen and subsequently the gene encoding the PrcR regulatory protein was inactivated as a means of improving nitrogen availability within corn ethanol fermentations.

The recombinant bacterial host cell is used with a yeast (e.g., a fermenting yeast, which can, in some embodiment be a recombinant yeast host cell) to convert the biomass into a fermentation product/byproduct (such as ethanol). These recombinant microbial (bacterial and yeast) host cells can be obtained by introducing one or more genetic modifications in a corresponding native (parental) microbial host cell. When the genetic modification is aimed at reducing or inhibiting the expression of a specific targeted gene (which is endogenous to the host cell), the genetic modifications can be made in one or all copies of the targeted gene(s). When the genetic modification is aimed at increasing the expression of a specific targeted gene, the genetic modification can be made in one or multiple genetic locations. In the context of the present disclosure, when microbial cells are qualified as being "recombinant" or "genetically engineered", it is understood to mean that they have been manipulated to either add at least one or more heterologous or exogenous nucleic acid residue and/or remove at least one endogenous (or native) nucleic acid residue. In some embodiments, the one or more nucleic acid residues that are added can be derived from a heterologous cell or the recombinant cell itself. In the latter scenario, the nucleic acid residue(s) is (are) added at a genomic location which is different than the native genomic location. Alternatively or in combination, one or more additional copy of a native gene at its native genomic location is also considered to be a heterologous nucleic acid molecule. The genetic manipulation(s) did not occur in nature and are the results of in vitro manipulations of the native microbial host cell.

When expressed in recombinant microbial cells, the heterologous polypeptides described herein are encoded on one or more heterologous nucleic acid molecule. The term "heterologous" when used in reference to a nucleic acid molecule (such as a promoter or a coding sequence) refers to a nucleic acid molecule that is not natively found in the microbial cell. "Heterologous" also includes a native coding region, or portion thereof, that is removed from the source organism and subsequently reintroduced into the source organism in a form that is different from the corresponding native gene. This form can be, for example, the introduction of at least one copy of a native gene at a location which is different from its native location and/or the introduction of at least one additional copy of a native gene at its native location. The heterologous nucleic acid molecule is purposively introduced into the recombinant microbial cell. The term "heterologous" as used herein also refers to an element (nucleic acid or polypeptide) that is derived from a source other than the endogenous source. Thus, for example, a heterologous element could be derived from a different strain of host cell, or from an organism of a different taxonomic group (e.g., different kingdom, phylum, class, order, family, genus, or species, or any subgroup within one of these classifications). With respect to nucleic acid molecules, the term "heterologous" also refers to corresponding degenerate sequences capable of encoding a polypeptide having the same amino acid sequence. The term "heterologous" when used in reference to a polypeptide refers to a polypeptide encoded by the heterologous nucleic acid molecule.

When a heterologous nucleic acid molecule is present in the recombinant microbial cell, it can be integrated in the recombinant microbial host cell's chromosome. The term "integrated" as used herein refers to genetic elements that are placed, through molecular biology techniques, into the chromosome of a recombinant microbial host cell. For example, genetic elements can be placed into the chromosomes of the microbial cell as opposed to in a vector, such as a plasmid, carried by the recombinant microbial host cell. Methods for integrating genetic elements into the chromosome of a recombinant microbial host cell are well known in the art and include homologous recombination. The heterologous nucleic acid molecule can be present in one or more copies in the recombinant microbial host cell's chromosome(s). Alternatively, the heterologous nucleic acid molecule can be independently replicating from the microbial cell's chromosome. In such embodiment, the nucleic acid molecule can be stable and self-replicating.

In some embodiments, heterologous nucleic acid molecules which can be introduced into the recombinant microbial cells are codon-optimized with respect to the intended recipient recombinant microbial host cell (e.g., bacterial or yeast for example). As used herein the term "codon-optimized coding region" means a nucleic acid coding region that has been adapted for expression in the cells of a given organism by replacing at least one, or more than one, codons with one or more codons that are more frequently used in the genes of that organism. In general, highly expressed genes in an organism are biased towards codons that are recognized by the most abundant tRNA species in that organism. One measure of this bias is the "codon adaptation index" or "CAI," which measures the extent to which the codons used to encode each amino acid in a particular gene are those which occur most frequently in a reference set of highly expressed genes from an organism. The CAI of codon optimized heterologous nucleic acid molecule described herein corresponds to between about 0.8 and 1.0, between about 0.8 and 0.9, or about 1.0.

In some embodiments, the heterologous nucleic acid molecule(s) which can be introduced into the recombinant microbial cells are codon-optimized with respect to the intended recipient recombinant microbial cell so as to limit or prevent homologous recombination with the corresponding native gene.

The heterologous nucleic acid molecules of the present disclosure comprise a coding region for the one or more polypeptides to be expressed by the recombinant microbial cell. A DNA or RNA "coding region" is a DNA or RNA molecule which is transcribed and/or translated into a polypeptide in a cell in vitro or in vivo when placed under the control of appropriate regulatory sequences. "Suitable regulatory regions" refer to nucleic acid regions located upstream (5' non-coding sequences), within, or downstream (3' non-coding sequences) of a coding region, and which influence the transcription, RNA processing or stability, or translation of the associated coding region. Regulatory regions may include promoters, translation leader sequences, RNA processing sites, effector binding sites and stem-loop structures. The boundaries of the coding region are determined by a start codon at the 5' (amino) terminus and a translation stop codon at the 3' (carboxyl) terminus. A coding region can include, but is not limited to, prokaryotic regions, cDNA from mRNA, genomic DNA molecules, synthetic DNA molecules, or RNA molecules. If the coding region is intended for expression in a eukaryotic cell, a polyadenylation signal and transcription termination sequence will usually be located 3' to the coding region. In an embodiment, the coding region can be referred to as an open reading frame. "Open reading frame" is abbreviated ORF and means a length of nucleic acid, either DNA, cDNA or RNA, that comprises a translation start signal or initiation codon, such as an ATG or AUG, and a termination codon and can be potentially translated into a polypeptide sequence.

The heterologous nucleic acid molecules described herein can comprise a non-coding region, for example a transcriptional and/or translational control regions. "Transcriptional and translational control regions" are DNA regulatory regions, such as promoters, enhancers, terminators, and the like, that provide for the expression of a coding region in a microbial cell. In eukaryotic cells, polyadenylation signals are control regions.

The heterologous nucleic acid molecule can be introduced in the recombinant microbial host cell using a vector. A "vector," e.g., a "plasmid", "cosmid" or "artificial chromosome" (such as, for example, a bacterial or yeast artificial chromosome) refers to an extra chromosomal element and is usually in the form of a circular double-stranded DNA molecule. Such vectors may be autonomously replicating sequences, genome integrating sequences, phage or nucleotide sequences, linear, circular, or supercoiled, of a single- or double-stranded DNA or RNA, derived from any source, in which a number of nucleotide sequences have been joined or recombined into a unique construction which is capable of introducing a promoter fragment and DNA sequence for a selected gene product along with appropriate 3' untranslated sequence into the recombinant microbial host cell.

In the heterologous nucleic acid molecule described herein, the promoter and the nucleic acid molecule coding for the one or more heterologous polypeptides can be operatively linked to one another. In the context of the present disclosure, the expressions "operatively linked" or "operatively associated" refers to fact that the promoter is physically associated to the nucleotide acid molecule coding for the one or more polypeptide in a manner that allows, under certain conditions, for expression of the one or more polypeptide from the nucleic acid molecule. In an embodiment, the promoter can be located upstream (5') of the nucleic acid sequence coding for the one or more polypeptide. In still another embodiment, the promoter can be located downstream (3') of the nucleic acid sequence coding for the one or more polypeptide. In the context of the present disclosure, one or more than one promoter can be included in the heterologous nucleic acid molecule. When more than one promoter is included in the heterologous nucleic acid molecule, each of the promoters is operatively linked to the nucleic acid sequence coding for the one or more polypeptide. The promoters can be located, in view of the nucleic acid molecule coding for the one or more polypeptide, upstream, downstream as well as both upstream and downstream.

"Promoter" refers to a DNA fragment capable of controlling the expression of a coding sequence or functional RNA. The term "expression," as used herein, refers to the transcription and stable accumulation of sense (mRNA) from the heterologous nucleic acid molecule described herein. Expression may also refer to translation of mRNA into a polypeptide. Promoters may be derived in their entirety from a native gene, or be composed of different elements derived from different promoters found in nature, or even comprise synthetic DNA segments. It is understood by those skilled in the art that different promoters may direct the expression at different stages of development, or in response to different environmental or physiological conditions. Promoters which cause a gene to be expressed in most cells at most times at a substantial similar level are commonly referred to as "constitutive promoters". It is further recognized that since in most cases the exact boundaries of regulatory sequences have not been completely defined, DNA fragments of different lengths may have identical promoter activity. A promoter is generally bounded at its 3' terminus by the transcription initiation site and extends upstream (5' direction) to include the minimum number of bases or elements necessary to initiate transcription at levels detectable above background. Within the promoter will be found a transcription initiation site (conveniently defined for example, by mapping with nuclease S1), as well as protein binding domains (consensus sequences) responsible for the binding of the polymerase.

The promoter can be heterologous to the native gene encoding the native polypeptide or to the nucleic acid molecule encoding the heterologous polypeptide. The promoter can be heterologous or derived from a strain being from the same genus or species as the microbial cell. In an embodiment, the promoter is derived from the same genus or species of the microbial cell and the heterologous polypeptide is derived from different genus.

In some embodiments, the present disclosure concerns the expression of one or more heterologous polypeptide, a variant thereof or a fragment thereof in a recombinant microbial host cell. The polypeptide "variants" have at least 50%, 55%, 60%, 65%, 70%, 75%, 80%, 85%, 90%, 95%, 96%, 97%, 98% or 99% identity to the heterologous polypeptide described herein as well as exhibit the biological activity associated with the heterologous polypeptide. In embodiments in which the heterologous polypeptide is a transcription factor, the variant transcription factor must exhibit transcription factor activity. In embodiments in which the heterologous polypeptide is a pyruvate decarboxylase, a variant pyruvate decarboxylase must exhibit pyruvate decarboxylase activity. In embodiments in which the heterologous polypeptide is an alcohol dehydrogenase, a variant alcohol dehydrogenase must exhibit alcohol dehydrogenase activity. In embodiments in which the heterologous polypeptide is a protease, a variant protease must exhibit protease activity. In embodiments in which the heterologous polypeptide is a ketoisovalerate decarboxylase, a variant ketoisovalerate decarboxylase must exhibit ketoisovalerate decarboxylase activity. In an embodiment, the variant polypeptide exhibits at least 50%, 55%, 60%, 65%, 70%, 75%, 80%, 85%, 90%, 95%, 96%, 97%, 98% or 99% of the biological activity of the wild-type heterologous polypeptide. A variant comprises at least one amino acid difference when compared to the amino acid sequence of the native polypeptide. The term "percent identity", as known in the art, is a relationship between two or more polypeptide sequences or two or more polynucleotide sequences, as determined by comparing the sequences. The level of identity can be determined conventionally using known computer programs. Identity can be readily calculated by known methods, including but not limited to those described in: Computational Molecular Biology (Lesk, A. M., ed.) Oxford University Press, NY (1988); Biocomputing: Informatics and Genome Projects (Smith, D. W., ed.) Academic Press, NY (1993); Computer Analysis of Sequence Data, Part I (Griffin, A. M., and Griffin, H. G., eds.) Humana Press, NJ (1994); Sequence Analysis in Molecular Biology (von Heinje, G., ed.) Academic Press (1987); and Sequence Analysis Primer (Gribskov, M. and Devereux, J., eds.) Stockton Press, NY (1991). Preferred methods to determine identity are designed to give the best match between the sequences tested. Methods to determine identity and similarity are codified in publicly available computer programs. Sequence alignments and percent identity calculations may be performed using the Megalign program of the LASERGENE bioinformatics computing suite (DNASTAR Inc., Madison, Wis.). Multiple alignments of the sequences disclosed herein were performed using the Clustal method of alignment (Higgins and Sharp (1989) CABIOS. 5:151-153) with the default parameters (GAP PENALTY=10, GAP LENGTH PEN ALT Y=10). Default parameters for pairwise alignments using the Clustal method were KTUPLB 1, GAP PENALTY=3, WINDOW=5 and DIAGONALS SAVED=5.

The variant heterologous polypeptides described herein may be (i) one in which one or more of the amino acid residues are substituted with a conserved or non-conserved amino acid residue (preferably a conserved amino acid residue) and such substituted amino acid residue may or may not be one encoded by the genetic code, or (ii) one in which one or more of the amino acid residues includes a substituent group, or (iii) one in which the mature polypeptide is fused with another compound, such as a compound to increase the half-life of the polypeptide (for example, polyethylene glycol), or (iv) one in which the additional amino acids are fused to the mature polypeptide for purification of the polypeptide.

A "variant" of the polypeptide can be a conservative variant or an allelic variant. As used herein, a conservative variant refers to alterations in the amino acid sequence that do not adversely affect the biological functions of the polypeptide. A substitution, insertion or deletion is said to adversely affect the polypeptide when the altered sequence prevents or disrupts a biological function associated with the polypeptide. For example, the overall charge, structure or hydrophobic-hydrophilic properties of the polypeptide can be altered without adversely affecting its biological activity. Accordingly, the amino acid sequence can be altered, for example to render the polypeptide more hydrophobic or hydrophilic, without adversely affecting the biological activities of the polypeptide.

The heterologous polypeptide can be a fragment of the native heterologous polypeptide or fragment of a variant of the polypeptide which exhibits the biological activity of the heterologous polypeptide or the variant. In an embodiment, the fragment polypeptide exhibits at least 50%, 55%, 60%, 65%, 70%, 75%, 80%, 85%, 90%, 95%, 96%, 97%, 98% or 99% of the biological activity of the heterologous polypeptide or variant thereof. In embodiments in which the heterologous polypeptide is a transcription factor, the variant transcription factor must exhibit transcription factor activity. In embodiments in which the heterologous polypeptide is a pyruvate decarboxylase, a fragment of the pyruvate decarboxylase must exhibit pyruvate decarboxylase activity. In embodiments in which the heterologous polypeptide is an alcohol dehydrogenase, a fragment of the alcohol dehydrogenase must exhibit alcohol dehydrogenase activity. In embodiments in which the heterologous polypeptide is a protease, a fragment of the protease must exhibit protease activity. In embodiments in which the heterologous polypeptide is a ketoisovalerate decarboxylase, a fragment of the ketoisovalerate decarboxylase must exhibit ketoisovalerate decarboxylase activity. Polypeptide "fragments" can have at least at least 100, 200, 300, 400, 500 or more consecutive amino acids of the polypeptide or the polypeptide variant. A fragment comprises at least one less amino acid residue when compared to the amino acid sequence of the polypeptide and still possess the biological activity of the full-length enzyme. In some embodiments, the "fragments" have at least 50%, 55%, 60%, 65%, 70%, 75%, 80%, 85%, 90%, 95%, 96%, 97%, 98% or 99% identity to the heterologous polypeptides described herein. In some embodiments, fragments of the polypeptides can be employed for producing the corresponding full-length polypeptide by peptide synthesis. Therefore, the fragments can be employed as intermediates for producing the full-length polypeptides.

In some additional embodiments, the present disclosure also provides expressing a polypeptide encoded by a gene ortholog of a gene known to encode the heterologous polypeptide or inactivating a gene or its corresponding gene ortholog in the recombinant microbial host cell. A "gene ortholog" is understood to be a gene in a different species that evolved from a common ancestral gene by speciation. In the context of the present disclosure, a gene ortholog encodes a polypeptide exhibiting the same biological function than the native polypeptide.

In some further embodiments, the present disclosure also provides expressing a polypeptide encoded by a gene paralog of a gene known to encode the polypeptide or inactivating a gene or its corresponding gene paralog in the recombinant microbial host cell. A "gene paralog" is understood to be a gene related by duplication within the genome. In the context of the present disclosure, a gene paralog encodes a polypeptide that could exhibit additional biological function than the native polypeptide.

Recombinant Bacterial Host Cell

The recombinant bacterial host cell of the present disclosure bears at least one first genetic modification for increasing its proteolytic activity to ultimately provide a nitrogen source to a fermenting yeast. The recombinant bacterial host cell can be any bacterial cell which has the intrinsic ability to ferment a biomass into ethanol or that can be genetically engineered to have the ability to ferment a biomass into ethanol. In an embodiment, the recombinant bacterial host cell can be a Gram-negative bacterial cell. For example, the recombinant bacterial host cell can be from the genus *Escherichia* (such as for example, from the species *Escherichia coli*) or from the genus *Zymomonas* (such as, for example, from the species *Zymomonas mobilis*). In another embodiment, the recombinant bacterial host cell can be a Gram-positive bacterial cell. In yet another embodiment, the recombinant bacterial host cell can be a lactic acid bacteria or LAB. LAB are a group of Gram-positive bacteria, non-respiring non-spore-forming, cocci or rods, which produce lactic acid as the major end product of the fermentation of carbohydrates. Bacterial genus of LAB include, but are not limited to, *Lactobacillus, Leuconostoc, Pediococcus, Lactococcus, Streptococcus, Aerococcus, Carnobacterium, Enterococcus, Oenococcus, Sporolactobacillus, Tetragenococcus, Vagococcus,* and *Weissella.* Bacterial species of LAB include, but are not limited to, *Lactococcus lactis, Lactococcus garviae, Lactococcus raffinolactis, Lactococcus plantarum, Oenococcus oeni, Pediococcus pentosaceus, Pediococcus acidilactici, Carnococcus allantoicus, Carnobacterium gallinarum, Vagococcus fessus, Streptococcus thermophilus, Enterococcus phoeniculicola, Enterococcus plantarum, Enterococcus raffinosus, Enterococcus avium, Enterococcus pallens Enterococcus hermanniensis, Enterococcus faecalis,* and *Enterococcus faecium.* In an embodiment, the LAB is a *Lactobacillus* sp. and, include, without limitation the following genera *Lactobacillus delbrueckii* group, *Paralactobacillus, Holzapfelia, Amylolactobacillus, Bombilactobacillus, Companilactobacillus, Lapidilactobacillus, Agrilactobacillus, Schleiferilactobacillus, Loigolactobacilus, Lacticaseibacillus, Latilactobacillus, Dellaglioa, Liquorilactobacillus, Ligilactobacillus, Lactiplantibacillus, Furfurilactobacillus, Paucilactobacillus, Limosilactobacillus, Fructilactobacillus, Acetilactobacillus, Apilactobacillus, Levilactobacillus, Secundilactobacillus* and *Lentilactobacillus* In some additional embodiments, the *Lactobacillus* species is *L. acetotolerans, L. acidifarinae, L. acidipiscis, L. acidophilus, L. agilis, L. algidus, L. alimentarius, L. amylolyticus, L. amylophilus, L. amylotrophicus, L. amylovorus, L. animalis, L. antri, L. apodemi, L. aviarius, L. bifermentans, L. brevis, L. buchneri, L. camelliae, L. casei, L. catenaformis, L. ceti, L. coleohominis, L. collinoides, L. composti, L. concavus, L. coryniformis, L. crispatus, L. crustorum, L. curvatus, L. delbrueckii* (including *L. delbrueckii* subsp. *bulgaricus, L. delbrueckii* subsp. *delbrueckii, L. delbrueckii* subsp. *lactis*), *L. dextrinicus, L. diolivorans, L. equi, L. equigenerosi, L. farraginis, L. farciminis, L. fermentum, L. fornicalis, L. fructivorans, L. frumenti, L. fuchuensis, L. gallinarum, L. gasseri, L. gastricus, L. ghanensis, L. graminis, L. ammesii, L. hamsteri, L. harbinensis, L. hayakitensis, L. helveticus, L. hilgardii, L. omohiochii, L. iners, L. ingluviei, L. intestinalis, L. jensenii, L. johnsonii, L. kalixensis, L. efiranofaciens, L. kefiri, L. kimchii, L. kitasatonis, L. kunkeei, L. leichmannii, L. lindneri, L. alefermentans, L. mall, L. manihotivorans, L. mindensis, L. mucosae, L. murinus, L. nagelii, L. namurensis, L. nantensis, L. oligofermentans, L. oris, L. panis, L. pantheris, L. parabrevis, L. parabuchneri, L. paracasei, L. paracollinoides, L. parafarraginis, L. parakefiri, L. aralimentarius, L. paraplantarum, L. pentosus, L. perolens, L. plantarum, L. pontis, L. protectus, L. psittaci, L. renmini, L. reuteri, L. rhamnosus, L. rimae, L. rogosae, L. rossiae, L. ruminis, L. saerimneri, L. sakei, L. salivarius, L. sanfranciscensis, L. satsumensis, L. secaliphilus, L. sharpeae, L. siliginis, L. spicheri, L. suebicus, L. thailandensis, L. ultunensis, L. vaccinostercus, L. vaginalis, L. versmoldensis, L. vini, L. vitulinus, L. zeae* or *L. zymae*. In a specific embodiment, the recombinant LAB host cell is from the genus *Lactobacillus* sp. and can be, in a further embodiment, from the species *Lactobacillus paracasei* (which has recently been reclassified as *Lacticaseibacillus paracasei*).

The presence of the first genetic modification in the recombinant bacterial host cells is associated with biological effects: one associated with the phenotype of the recombinant bacterial host cell and another associated with the fermenting yeast. The at least one first genetic modification increases the proteolytic activity associated with the recombinant bacterial host cell, when compared to the proteolytic activity of a control bacterial host cell lacking the at least one first genetic modification or prior to the introduction of the at least one first genetic modification. Otherwise stated, the proteolytic activity associated with the recombinant bacterial host cell is higher than the proteolytic activity associated with the control bacterial host cell. As used in the context of the present disclosure, the "proteolytic activity associated with a bacterial cell" refers to the ability of such bacterial cell to hydrolyze a protein into a shorter peptide and/or to hydrolyze a peptide into discrete (e.g., free) amino acids. In the context of the present disclosure, the term "protease" (also referred to as "peptidase") refers to a polypeptide having proteolytic activity (e.g., a proteolytic enzyme). Proteolytic enzymes can be classified into two groups based on the type of proteolytic activity they exhibit: endopeptidases (which include proteinases) and exopeptidases. Endopeptidases exhibit endo-acting peptide bond hydrolase activity, whereas exopeptidases exhibit exo-acting peptide bond hydrolase activity. In an embodiment, the proteolytic activity associated with the bacterial cell refers to the activity associated with proteinases. In a further embodiment, the proteolytic activity associated with the bacterial cell can be extracellular. For example, the proteolytic activity associated with a bacterial cell can be determined in intact bacterial cells and be limited to the extracellular proteolytic activity. The extracellular proteolytic activity refers to proteolytic activity associated to proteases which have been secreted by the recombinant bacterial host cell. The proteases secreted by the recombinant bacterial host cell can remain associated with the surface of the bacterial cell (and in some embodiments may be anchored or tethered at the surface of the bacterial cell) or they can be independent from the recombinant bacterial host cell (e.g., free). In some embodiments, the proteolytic activity associated with a bacterial cell can be intracellular. The intracellular proteolytic activity refers to the proteolytic activity associated with proteases which are not secreted and are either present in the cytoplasm or that can be associated with the internal bacterial cell membrane or organelles. In an embodiment, the proteolytic activity of the recombinant bacterial host cell can include both the extracellular and intracellular proteolytic activity associated with the recombinant bacterial cell.

The other biological effects of the first genetic modification is associated with the fermenting yeast. The recombinant bacterial cell bearing the at least one first genetic modification can also provide a nitrogen source to the yeast. The nitrogen source comprises a peptide, an amino acid (e.g., discrete or free), ammonia, as well as combinations thereof. The nitrogen source preferably does not include urea. In some embodiments, the recombinant bacterial host cell does not have the intrinsic ability to hydrolyze urea into ammonia (e.g., urease activity).

The at least one first genetic modification can lead to the increase in the expression or the activity of a polypeptide having proteolytic activity, such as, for example, a protease (which can be native or heterologous), a variant or a fragment thereof. The expression or activity of the protease observed in the recombinant bacterial host cell is considered "increased" when compared to the expression or activity of the protease in a control bacterial cell lacking the at least one first genetic modification.

The at least one first genetic modification can lead to the increase in the expression or the activity of a polypeptide having proteolytic activity which exerts its activity outside the bacterial cell (e.g., extracellular polypeptide having proteolytic activity). The extracellular polypeptide having proteolytic activity can be secreted by the recombinant bacterial host cell and, in some further embodiments, it can be anchored to the extracellular side of the bacterial cellular membrane. In an embodiment, the extracellular polypeptide having proteolytic activity is anchored to the bacterial cellular membrane and can be, for example, an extracellular protease.

Without wishing to be bound to theory, in some embodiments, it is understood that the peptides that are generated by the recombinant bacterial host cell having an increased proteolytic activity cannot be readily metabolized by the yeast. Instead such peptides can be imported inside the recombinant bacterial host cell using an oligopeptide transport system (OPP). Once imported inside the recombinant bacterial host cell, bacterial intracellular proteases are believed to further cleave these peptides to release free amino acids as well as ammonia. The enzymatic products (e.g., free amino acids and ammonia) are then further released from the recombinant bacterial host cell and provide a source of nitrogen source to the fermenting yeast.

As such, in some embodiments, the recombinant bacterial host cell is capable of expressing an oligopeptide transport system (which may be native and/or heterologous to the recombinant bacterial host cell). In some embodiments, the recombinant bacterial host cell has been genetically manipulated to overexpress a native oligopeptide transport system. Alternatively or in combination, the recombinant bacterial host cell has been genetically manipulated to express a heterologous oligopeptide transport system. In some additional embodiments, the recombinant bacterial host cell is capable of expressing one or more native or heterologous intracellular proteases to cleave the enzymatic products (e.g., peptides) of the secreted and extracellular protease into amino acids and ammonia. In some embodiments, the recombinant bacterial host cell can overexpress one or more native intracellular protease and/or can express one or more heterologous intracellular protease. In additional embodiments, the recombinant bacterial host cell can overexpress one or more native intracellular exopeptidase and/or can express one or more heterologous intracellular exopeptidase. In still a further embodiment, the intracellular exopeptidase can be, for example, PepN.

In an embodiment, the recombinant bacterial host cell is capable of expressing one or more first polypeptide having proteolytic activity. For example, the first polypeptide can be a protease (and in some embodiments, a proteinase). The protease (and in some embodiments the proteinase) can be native or heterologous to the recombinant bacterial host cell. The proteolytic activity can be provided by the presence of at least one first nucleic acid molecule (which may be heterologous) encoding the one or more first polypeptide having proteolytic activity (which can be, in some embodiments, a heterologous polypeptide having proteolytic activity or a mutated native polypeptide having increased proteolytic activity). In some embodiments, more than one first nucleic acid molecules can be provided to encode a plurality of polypeptides having proteolytic activity. In such embodiments, each first nucleic acid molecules can include one or more coding sequences corresponding to one or more polypeptides having proteolytic activity. In another embodiment, a single first nucleic acid molecule can encode the one or more polypeptides having proteolytic activity.

Alternatively or in combination, the increased proteolytic activity can be provided by the presence of at least one first nucleic acid molecule (which may be heterologous) encoding a regulatory region which would favor the overexpression of a native polypeptide having proteolytic activity. This can be done, for example, by adding at least one nucleic acid residue (and in some embodiment a stretch of nucleic acid residues) in the regulatory region of the gene coding for the native protease (and in some embodiments, the native proteinase) to favor the binding of a regulatory protein (such as for example a transcription factor which favors the expression of the native gene) to the regulatory region. In some embodiments, this first genetic modification can lead to the constitutive expression of the native protease (and in some embodiments, the native proteinase). Alternatively or in combination, the increased proteolytic activity can be provided by inactivating, at least in part, a regulatory region which suppresses the expression of the one or more native protease (and in some embodiments, the native proteinase). This can be done, for example, by removing at least one nucleic acid residue (and in some embodiment a stretch of nucleic acid residues) in the regulatory region of the gene coding for the native protease (and in some embodiments, the native proteinase) to limit or impede the binding of a regulatory protein (such as for example a transcription factor which represses the expression of the native gene) to the regulatory region.

In an embodiment, the first genetic modification is intended to allow the expression of a heterologous polypeptide which is a protease and the first heterologous nucleic acid molecule encodes the heterologous protease. The presence of the first nucleic acid molecule, under the appropriate conditions, causes the expression (and in some embodiments the overexpression) of the first heterologous protease.

Proteases are a class of enzymes that catalyzes proteolysis (e.g., the breakdown of a polypeptide into smaller polypeptides, peptides or amino acids). Proteases are classified under E.C. 3.4 and can be derived from a bacterial cell, a plant cell, a yeast cell or a fungal cell. Proteases can be classified according to their catalytic residue: serine proteases (using a serine alcohol), cysteine proteases (using a cysteine thiol), threonine proteases (using a threonine secondary alcohol), aspartic proteases (using an aspartate carboxylic acid), glutamic proteases (using a glutamate carboxylic acid), metalloproteases (using a metal) and asparagine peptide lyases (using an asparagine to perform an elimination reaction). Proteases can also be classified according to their optimal pH (e.g., the pH at which the protease has the most enzymatic activity). The recombinant bacterial host cell can express a heterologous protease which is neutral or acidic. When the optimal pH of a protease is neutral (e.g., between pH 6.0 and 7.5), the protease is considered to be a neutral protease. When the optimal pH of a protease is acidic (e.g., below 6.0), the protease is considered to be an acidic protease. In some embodiments, an acidic protease has an optimal pH between 2.0 and 5.0 and is inactivated at a pH above 6.0. It is understood that since the yeast fermentation is usually conducted at an acidic pH (e.g., between 4.0 to 5.5 for example). it is preferable that the recombinant bacterial host cell expresses a neutral or acidic protease (which may be native or heterologous) to increase its proteolytic activity.

In a specific embodiment, the heterologous protease is a secreted and extracellular protease such as for example a member of the subtilisin serine protease family. In an embodiment, the member of the subtilisin serine protease family is a cell-envelop proteinase (CEP). In an embodiment, the CEP can be, for example, lactocepin (which may also be referred to as PrtP), PrtB, PrtH, PrtR or PrtS.

Lactocepin is encoded by the prtP gene. Lactocepin is an extracellular protease which exhibits endopeptidase activity and is associated with the bacterial cell envelop. It is attached to the bacterial cell envelop with a LPxTG (SEQ ID NO: 57) motif. In an embodiment, the lactocepin is derived from *Lactobacillus* sp., for example a *Lactobacillus paracasei*. In an embodiment, the heterologous protease is associated with GenBank accession number WP_014952255, is a variant of GenBank accession number WP_014952255 or is a fragment of GenBank accession number WP_014952255. In another embodiment, the lactocepin is derived from a Lactococus sp., for example a *Lactococcus lactis*. In another embodiment, the heterologous protease is associated with GenBank accession number ARE27274, is a variant of GenBank accesion number ARE27274 or is a fragment of GenBank accession number ARE27274.

PrtB is encoded by the prtB gene. PrtB is an extracellular protease which exhibits endopeptidase activity and is associated with the bacterial cell envelop. It is attached to the bacterial cell envelop with a LPxTG (SEQ ID NO: 57) motif. In an embodiment, PrtB is derived from *Lactobacillus* sp., for example a *Lactobacillus delbrueckii*. In an embodiment, the heterologous protease is associated with GenBank accession number EPB98635, is a variant of GenBank accession number EPB98635 or is a fragment of GenBank accession number EPB98635.

PrtH is encoded by the prtH gene. PrtH is an extracellular protease which exhibits endopeptidase activity and is associated with the bacterial cell envelop. It is attached to the bacterial cell envelop with a LPxTG (SEQ ID NO: 57) motif. In an embodiment, PrtH is derived from *Lactobacillus* sp., for example a *Lactobacillus helveticus*. In an embodiment, the heterologous protease is associated with GenBank accession number AAD50643, is a variant of GenBank accession number AAD50643 or is a fragment of GenBank accession number AAD50643.

PrtR is encoded by the prtR gene. PrtR is an extracellular protease which exhibits endopeptidase activity and is associated with the bacterial cell envelop. It is attached to the bacterial cell envelop with a LPxTG (SEQ ID NO: 57) motif. In an embodiment, PrtR is derived from *Lactobacillus* sp., for example a *Lactobacillus rhamnosus*. In an embodiment, the heterologous protease is associated with GenBank accession number CAD43138, is a variant of GenBank accession number CAD43138 or is a fragment of GenBank accession number CAD43138.

PrtS is encoded by the prtS gene. PrtS is an extracellular protease which exhibits endopeptidase activity and is associated with the bacterial cell envelop. It is attached to the bacterial cell envelop with a LPxTG (SEQ ID NO: 57) motif. In an embodiment, PrtS is derived from *Steptococcus* sp., for example a *Streptococcus thermophilus*. In an embodiment, the heterologous protease is associated with GenBank accession number BBQ09553, is a variant of GenBank accession number BBQ09553 or is a fragment of GenBank accession number BBQ09553.

PepN is an intracellular exopeptidase which can, in some embodiments, be expressed by the recombinant bacterial host cell. In an embodiment, PepN is derived from a *Lactobacillus* sp. In yet additional embodiments, PepN is derived from *Lactobacillus helveticus* and even can be associated with GenBank accession number AGQ22917 (which can have, in some embodiments, the amino acid sequence of SEQ ID NO: 57), is a variant of AGQ22917 (which can be, in some embodiments, a variant of the amino acid sequence of SEQ ID NO: 57) or is a fragment of AGQ22917 (which can be, in some embodiments, a fragment of the amino acid sequence of SEQ ID NO: 57). In yet additional embodiments, PepN is derived from *Lactobacillus casei* and even can be associated with GenBank accession number GEK39407 (which can have, in some embodiments, the amino acid sequence of SEQ ID NO: 58), is a variant of GEK39407 (which can be, in some embodiments, a variant of the amino acid sequence of SEQ ID NO: 58) or is a fragment of GEK39407 (which can be, in some embodiments, a fragment of the amino acid sequence of SEQ ID NO: 58). In an embodiment, PepN is derived from a *Lactococcus* sp. In yet additional embodiments, PepN is derived from *Lactococcus lactis* and even can be associated with GenBank accession number CAL96925.1 (which can have, in some embodiments, the amino acid sequence of SEQ ID NO: 59), is a variant of CAL96925.1 (which can be, in some embodiments, a variant of the amino acid sequence of SEQ ID NO: 59) or is a fragment of CAL96925.1 (which can be, in some embodiments, a fragment of the amino acid sequence of SEQ ID NO: 59).

In yet another embodiment, the heterologous protease can be a secreted and extracellular metalloprotease (including a zinc-dependent metalloprotease). In an embodiment, the secreted and extracellular metalloprotease can be derived from *Bacillus* sp., for example from *Bacillus subtilis* or from *Bacillus thermoproteolyticus*. In an embodiment, the metalloprotease can be NprE. NprE is encoded by the nprE gene. In an embodiment, NprE is derived from a *Bacillus* sp., for example a *Bacillus subtilis*. In an embodiment, the heterologous protease is associated with GenBank accession number WP_168780890, is a variant of GenBank accession number WP_168780890 or is a fragment of GenBank accession number WP_168780890. In another embodiment, the secreted and extracellular metalloprotease can be from the peptidase family M4 (thermolysin) family. In an embodiment, NprE is derived from a *Bacillus* sp., for example a *Bacillus subtilis*. In an embodiment, the heterologous protease is associated with GenBank accession number CAA54291, is a variant of GenBank accession number CAA54291 or is a fragment of GenBank accession number CAA54291.

In an embodiment, the heterologous protease is an aspartic protease or a protease susceptible of having aspartic-like activity. The heterologous protease can be derived from a known protease expressed in a prokaryotic (such as a bacteria) or a eukaryotic cell (such as a yeast, a mold, a plant or an animal). Embodiments of aspartic proteases include, without limitation, SAP1 (from *Candida albicans* or from *Candida dubliniensis*), PEP1 (from *Aspergillus fumigatus* or from *Saccharomycopsis fibuligera*)

In an embodiment, the heterologous protease can be derived from a fungal organism. For example, the heterologous protease can be derived from the genus *Candida, Clavispora, Saccharomyces, Yarrowia, Meyerozyma, Aspergillus* or *Saccharomycopsis*. When the heterologous protease is derived from the genus *Candida*, it can be derived from the species *Candida albicans, Candida dubliniensis* or *Candida tropicalis*. When the heterologous protease is derived from *Candida albicans*, it can have the amino acid of SEQ ID NO: 31. When the heterologous protease is derived from *Candida dubliensis*, it can have the amino acid sequence of SEQ ID NO: 32, be a variant of SEQ ID NO: 32 or be a fragment of SEQ ID NO: 32. When the heterologous protease is derived from *Candida tropicalis*, it can have the amino acid sequence of SEQ ID NO: 33, be a variant of SEQ ID NO: 33 or be a fragment of SEQ ID NO: 33. When the heterologous protease is derived from the genus *Clavispora*, it can be derived from the species *Clavispora lusitaniae*. When the heterologous protease is derived from the species *Clavispora lusitaniae*, it can have the amino acid sequence of SEQ ID NO: 34 or 35, be a variant of SEQ ID NO: 34 or 35 or be a fragment of SEQ ID NO: 34 or 35. When the heterologous protease is derived from the genus *Saccharomyces*, it can be derived from the species *Saccharomyces cerevisiae*. When the heterologous protease is derived from the species *Saccharomyces cerevisiae*, it can have the amino acid sequence of SEQ ID NO: 36, be a variant of SEQ ID NO: 36 or be a fragment of SEQ ID NO: 36. When the heterologous protease is derived from the genus *Yarrowia*, it can be derived from the species *Yarrowia lipolytica*. When the heterologous protease is derived from the species *Yarrowia lipolytica*, it can have the amino acid sequence of SEQ ID NO: 37, be a variant of SEQ ID NO: 37 or be a fragment of SEQ ID NO: 37. When the heterologous protease is derived from the genus *Meyerozyma*, it can be derived from the species *Meyerozyma guilliermondii*. When the heterologous protease is derived from the species *Meyerozyma*

*guilliermondii*, it can have the amino acid sequence of SEQ ID NO: 38, be a variant of SEQ ID NO: 38 or be a fragment of SEQ ID NO: 38. When the heterologous protease is derived from the genus *Aspergillus*, it can be derived from the species *Aspergillus fumigatus*. When the heterologous protease is derived from the species *Aspergillus fumigatus*, it can have the amino acid sequence of SEQ ID NO: 39, be a variant of SEQ ID NO: 39 or be a fragment of SEQ ID NO: 39. When the heterologous protease is derived from the species *Saccharomycopsis*, it can be derived from the species *Saccharomycopsis fibuligera*. When the heterologous protease is derived from the species *Saccharomycopsis fibuligera*, it can have the amino acid sequence of SEQ ID NO: 40, be a variant of SEQ ID NO: 40 or be a fragment of SEQ ID NO: 40.

In an embodiment, the heterologous protease can be derived from a bacterial organism. For example, the heterologous protease can be derived from the genus *Bacillus*. When the heterologous protease is derived from the genus *Bacillus*, it can be derived from the species *Bacillus subtilis*, it can have the amino acid sequence of SEQ ID NO: 41, be a variant of SEQ ID NO: 41 or be a fragment of SEQ ID NO: 41.

In an embodiment, the heterologous protease can be derived from a plant. For example, the heterologous protease can be derived from the genus *Ananas*. When the heterologous protease is derived from the genus *Ananas*, it can be derived from the species *Ananas comosus*, it can have the amino acid sequence of SEQ ID NO: 42, be a variant of SEQ ID NO: 32 or be a fragment of SEQ ID NO: 32.

Alternatively or in combination, the at least one first genetic modification can include the inactivation (at least in part and in some embodiments in its entirety) of a polypeptide which inhibits (e.g., an inhibitor) the expression or the activity of one or more native polypeptide having proteolytic activity in the recombinant bacterial host cell. The inhibitor can, for example, physically bind to the polypeptide having proteolytic activity. The inhibitor can be a regulatory protein which interacts, directly or indirectly, with the regulatory region of the gene encoding the polypeptide having proteolytic activity. For example, the at least one first genetic modification can include the inactivation of a polypeptide which inhibits (e.g., an inhibitor) the expression or the activity of one or more native polypeptide having proteolytic activity in the recombinant bacterial host cell. The inactivation (partial or complete) of the inhibitor will cause an increase in the expression level or the activity of one or more native polypeptide having proteolytic activity. This can be done, for example, by removing at least one nucleotide residue in a gene encoding the inhibitor, a part of the gene encoding the inhibitor or the entire gene encoding the inhibitor. The at least one first genetic modification can be done in one or more locus where the native gene encoding the inhibitor is present. In an embodiment, the at least one first genetic modification can be done in all loci where the native gene encoding the inhibitor is present. This can also be done, for example, by modifying one or more regulatory region present in the gene encoding the polypeptide having proteolytic activity to remove, at least in part, a nucleic acid residue (or a plurality of nucleic acid residues) involved in the (direct or indirect) binding of the inhibitor.

In a specific embodiment, the inhibitor is a transcription factor which limits (e.g., causes a transcriptional repression or suppression) the expression of a polypeptide having proteolytic activity. In an embodiment, the transcription factor limits the expression of one or more polypeptide having secreted and extracellular activity, such as, for example, lactocepin. In some embodiments, the transcription factor is a OmpR-family response regulator (also referred to as PrcR, is encoded by a gene ortholog of prcR or is encoded by a gene paralog of prcR). The transcription factor PrcR is encoded by the prcR gene. In such embodiments, the first genetic modification can include inactivating the prcR gene (in part or in its entirety). Alternatively or in combination, the first genetic modification can include modifying the regulatory region of the gene encoding the polypeptide having proteolytic activity, for example to remove one or all PrcR-responsive element. It is understood that the removal of one or all PrcR-responsive element will limit or avoid the transcriptional repression caused by PrcR and therefore increase the expression of the gene encoding the polypeptide having proteolytic activity. As used in the context of the present disclosure, the expression "PrcR-responsive element" refers to a stretch of (continuous or not) nucleic acid residues involved in the binding of PrcR to the regulatory region of the gene encoding the polypeptide having proteolytic activity (lactocepin for example).

In an embodiment, PrcR is found in a *Lactobacillus* sp., for example a *Lactobacillus paracasei*. When the recombinant bacterial host cell is a *Lactobacillus paracasei*, PrcR can be associated with GenBank accession number CAQ66977, a variant of GenBank accession number CAQ66977 or a fragment of GenBank accession number CAQ66977. In another embodiment, PrcR is found in a *Leuconostoc* sp.

It is understood that the first genetic modification can include the expression of a heterologous polypeptide having proteolytic activity and/or the inactivation of an inhibitor of a native polypeptide capable (e.g., an inhibitor) of inhibiting the expression or the activity of a native polypeptide having proteolytic activity. In one example, the first genetic modification can include the expression of the heterologous polypeptide but not the inactivation of the inhibitor. In another example, the first genetic modification can include the inactivation of the inhibitor but not the expression of the heterologous polypeptide. In still a further embodiment, the first genetic modification can include the expression of the heterologous polypeptide as well as the inactivation of the inhibitor.

In some embodiments, the recombinant bacterial host cell can have the ability to metabolize one or more amino acid. This ability can be native or can be genetically engineered in the recombinant bacterial cell. As such, the recombinant bacterial host cell can be selected for its ability to metabolize one or more amino acid. Alternatively, the recombinant bacterial host cell can include a further (second) genetic modification to favor the production of a favorable nitrogen source to the yeast, for example a NCR-inducing amino acid or ammonia. In some embodiments, the NCR-inducing amino acid is glutamine, asparagine, glutamate and combinations thereof.

In one specific example, the at least one second genetic modification can allow the expression of one or more heterologous ketoisovalerate decarboxylase, a variant heterologous ketoisovalerate decarboxylase having decarboxylase activity or a fragment heterologous ketoisovalerate decarboxylase having decarboxylase activity. Polypeptides having ketoisovalerate decarboxylase activity are able to convert 2-keto acids formed by native ammonia lyases and transaminases into aldehydes. This results in additional production of 2-keto acids and ammonia by the cell. Therefore, by providing the recombinant bacterial host cell with an increase in ketoisovalerate decarboxylase activity, it can increase its ammonia production to provide a nitrogen source to the fermenting yeast. This can be achieved by introducing one or more copies of a heterologous nucleic acid molecule encoding a heterologous ketoisovalerate decarboxylase. This can also be achieved by modifying the regulatory region of the native gene encoding the ketoisovalerate decarboxylase to increase its expression. In an embodiment, the heterologous polypeptide having ketoisovalerate decarboxylase activity is from *Lactococcus* sp., for example *Lactococcus lactis*. In some embodiments, the heterologous polypeptide having ketoisovalerate decarboxylase activity is associated with GenBank accession number CAG34226, is a variant GenBank accession number CAG34226 or is a fragment of GenBank accession number CAG34226.

Alternatively or in combination, the at least one second genetic modification can include inactivating (at least in part or in its entirety) the native glutamine synthetase gene. The enzyme encoded by the glutamine synthetase gene is responsible for the condensation of glutamate and ammonia to form glutamine. As such, by inactivating the native glutamine synthetase gene (or a gene ortholog or paralog) in the recombinant bacterial host cell, an increase in the levels of glutamate and ammonia can be obtained and serve as a NCR-inducing nitrogen source to the fermenting yeast. In *Lactobacillus paracasei*, the glutamine synthetase gene (glnA) encodes an enzyme associated with GenBank accession number KWT55545. In addition, two glnA paralogs have been identified in *L. paracasei* and they are associated with GenBank accession numbers EKQ01497 and EKP99556. As such, the recombinant bacterial host cell of the present disclosure can have an inactivated glnA gene and optionally inactivated glnA paralogs. In another embodiment, the recombinant bacterial host cell of the present disclosure can have an inactivated glnA gene and inactivated glnA paralogs. This can be done, for example, by removing at least one nucleotide residue in a gene encoding the glutamine synthetase or its paralog, a part of the gene encoding the glutamine synthetase or the entire gene encoding the glutamine synthetase or its paralog. The genetic inactivation can be done in one or more locus where the native gene encoding the glutamine synthetase is present. In an embodiment, the at least one second genetic modification can be done in all loci where the native gene encoding the glutamine synthetase or its paralog is present.

As indicated above, the recombinant bacterial host cell also has the ability to convert a biomass into ethanol. The biomass that can be converted into ethanol by the recombinant bacterial host cell can be corn or can be derived from corn (which may be in a raw or gelatinized). The recombinant bacterial host cell can have the intrinsic ability to convert the biomass into ethanol and does not need to be further modified in that respect. However, in some embodiments, the recombinant bacterial cell that has the intrinsic ability to convert the biomass into ethanol can be genetically modified to enhance the conversion. In embodiments in which the recombinant bacterial host cell does not have the intrinsic ability to convert the biomass into ethanol, it can be genetically modified to provide such ability.

In some embodiments, the recombinant bacterial host cell has the ability to express one or more heterologous polypeptide for converting the biomass into the fermentation product. This ability can be provided by the presence of at least one further (third) genetic modification. In some embodiments, the third genetic modification concerns the introduction of a heterologous nucleic acid molecule encoding the one or more polypeptide for converting, at least in part, a biomass into a fermented product in the recombinant bacterial host cell. This heterologous nucleic acid molecule can be expressed in a constitutive fashion or not by the recombinant bacterial host cell. In some embodiments, more than one heterologous nucleic acid molecules can be provided to encode a plurality of polypeptides for converting, at least in part, the biomass into ethanol. In such embodiments, each heterologous nucleic acid molecules can include one or more coding sequences corresponding to one or more polypeptides. In another embodiment, a single heterologous nucleic acid molecule can encode the one or more polypeptides.

In an embodiment, the one or more polypeptide for converting, at least in part, the biomass into ethanol comprises a pyruvate decarboxylase, an alcohol dehydrogenase or a combination thereof. When the recombinant bacterial host cell has an intrinsic ability of expressing a pyruvate decarboxylase, the heterologous nucleic acid molecule can encode a heterologous alcohol dehydrogenase. In such embodiment, it is possible that the heterologous nucleic acid molecule (same or different molecule) encodes a heterologous pyruvate decarboxylase (to increase the overall pyruvate decarboxylase activity of the recombinant bacterial host cell). When the recombinant bacterial host cell has an intrinsic ability of expressing an alcohol dehydrogenase, the heterologous nucleic acid molecule can encode a pyruvate decarboxylase. In such embodiment, it is possible that the heterologous nucleic acid molecule further encodes a heterologous alcohol dehydrogenase (to increase the overall alcohol dehydrogenase activity of the first recombinant bacterial host cell). If the recombinant bacterial host cell does not have the intrinsic ability of expressing a pyruvate decarboxylase and an alcohol dehydrogenase, the heterologous nucleic acid molecule can encode an alcohol dehydrogenase and a pyruvate decarboxylase (on the same or different nucleic acid molecules). The one or more heterologous nucleic acid molecules can be integrated in the bacterial chromosome or be independently replicating from the bacterial chromosome. The heterologous nucleic acid molecules encoding the pyruvate decarboxylase and the alcohol dehydrogenase can be on the same or distinct heterologous nucleic acid molecules.

In an embodiment, the one or more polypeptide for converting a biomass into ethanol includes a heterologous pyruvate decarboxylase. In such embodiment, the recombinant bacterial host cell includes, on a heterologous nucleic acid molecule, a coding sequence for a heterologous pyruvate decarboxylase. As used herein, the term "pyruvate decarboxylase" refers to an enzyme catalyzing the decarboxylation of pyruvic acid to acetaldehyde and carbon dioxide.

In *Zymomonas mobilis*, the pyruvate decarboxylase gene is referred to as PDC (Gene ID: 33073732) and could be used in the recombinant bacterial host cell of the present disclosure. In some additional embodiments, the pyruvate decarboxylase polypeptide can be from *Lactobacillus forum* (Accession Number WP_009166425.1), *Lactobacillus fructivorans* (Accession Number WP_039145143.1), *Lactobacillus lindneri* (Accession Number WP_065866149.1), *Lactococcus lactis* (Accession Number WP_104141789.1), *Carnobacterium gallinarum* (Accession Number WP_034563038.1), *Enterococcus plantarum* (Accession Number WP_069654378.1), *Clostridium acetobutylicum* (Accession Number NP_149189.1), *Bacillus megaterium* (Accession Number WP_075420723.1), *Bacillus thuringiensis* (Accession Number WP_052587756.1) as well as variants and fragments thereof. In the recombinant bacterial host cell of the present disclosure, the heterologous pyruvate decarboxylase can have the amino acid of SEQ ID NO: 1, be a variant of SEQ ID NO: 1 (having pyruvate carboxylase activity) or be a fragment of SEQ ID NO: 1 (having pyruvate carboxylase activity). In some specific embodiments, the recombinant bacterial host cell of the present disclosure can express a heterologous nucleic acid molecule comprising the nucleic acid sequence of SEQ ID NO: 2, a variant thereof (encoding a polypeptide having pyruvate carboxylase activity), a fragment thereof (encoding a polypeptide having pyruvate carboxylase activity) or a degenerate sequence encoding the polypeptide having the amino acid sequence SEQ ID NO: 1 (its variant or its fragment). In some specific embodiments, the recombinant bacterial host cell of the present disclosure can express a heterologous nucleic acid molecule comprising the nucleic acid sequence of SEQ ID NO: 3, a variant thereof (encoding a polypeptide having pyruvate carboxylase activity), a fragment thereof (encoding a polypeptide having pyruvate carboxylase activity) or a degenerate sequence encoding the polypeptide having the amino acid sequence SEQ ID NO: 1 (its variant or its fragment).

In an embodiment, the one or more polypeptide for converting the biomass into ethanol includes a heterologous alcohol dehydrogenase. In such embodiment, the recombinant bacterial host cell includes a heterologous nucleic acid molecule coding for a heterologous alcohol dehydrogenase. The nucleic acid sequence encoding the heterologous alcohol dehydrogenase can physically be located on the same or on a distinct nucleic acid molecule as the nucleic acid sequence encoding the pyruvate decarboxylase. As used herein, the term "alcohol dehydrogenase" refers to an enzyme of the EC 1.1.1.1 class. In some embodiments, the alcohol dehydrogenase is an iron-containing alcohol dehydrogenase.

The alcohol dehydrogenase that can be expressed in the recombinant microbial host cell includes, but is not limited to, ADH4 from *Saccharomyces cerevisiae*, ADHB from *Zymomonas mobilis*, FUCO from *Escherichia coli*, ADHE from *Escherichia coli*, ADH1 from *Clostridium acetobutylicum*, ADH1 from *Entamoeba nuttalli*, BDHA from *Clostridium acetobutylicum*, BDHB from *Clostridium acetobutylicum*, 4HBD from *Clostridium kluyveri*, DHAT from *Citrobacter freundii* or DHAT from *Klebsiella pneumoniae*. In an embodiment, the alcohol dehydrogenase can be ADHB from *Zymomonas mobilis* (Gene ID: AHJ71151.1), *Lactobacillus reuteri* (Accession Number: KRK51011.1), *Lactobacillus mucosae* (Accession Number WP_048345394.1), *Lactobacillus brevis* (Accession Number WP_003553163.1), *Streptococcus thermophiles* (Accession Number WP_113870363.1) as well as variants thereof and fragments thereof. In the recombinant bacterial host cell of the present disclosure, the alcohol dehydrogenase can have the amino acid of SEQ ID NO: 4, be a variant of SEQ ID NO: 4 (having alcohol dehydrogenase activity) or a fragment of SEQ ID NO: 4 (having alcohol dehydrogenase activity). In some specific embodiments, the recombinant microbial host cell of the present disclosure can express a heterologous nucleic acid molecule comprising the nucleic acid sequence of SEQ ID NO: 5, be a variant of the nucleic acid sequence of SEQ ID NO: 5 (encoding a polypeptide having alcohol dehydrogenase activity), be a fragment of the nucleic acid sequence of SEQ ID NO: 5 (encoding a polypeptide having alcohol dehydrogenase activity) or a degenerate sequence encoding the polypeptide having the amino acid sequence SEQ ID NO: 4 (its variant or its fragment). In some specific embodiments, the recombinant microbial host cell of the present disclosure can express a heterologous nucleic acid molecule comprising the nucleic acid sequence of SEQ ID NO: 6, be a variant of the nucleic acid sequence of SEQ ID NO: 6 (encoding a polypeptide having alcohol dehydrogenase activity), be a fragment of the nucleic acid sequence of SEQ ID NO: 6 (encoding a polypeptide having alcohol dehydrogenase activity) or a degenerate sequence encoding the polypeptide having the amino acid sequence SEQ ID NO: 4 (its variant or its fragment).

In an embodiment, the one or more polypeptide for converting the biomass into ethanol exhibits a bifunctional acetylating acetaldehyde dehydrogenase and alcohol dehydrogenase. In such embodiment, the recombinant bacterial host cell includes a heterologous nucleic acid molecule a coding sequence for a heterologous a bifunctional acetylating acetaldehyde dehydrogenase and alcohol dehydrogenase.

The polypeptide having a bifunctional acetylating acetaldehyde dehydrogenase and alcohol dehydrogenase activity can be obtained, for example, from *Escherichia* sp., such as *Escherichia coli* (mphF, see GenBank accession number CUU95910), from *Pseudomonas* sp., such as *Pseudomonas oleovorans* (pheF, see GenBank accession number ANC68225) as well as variants thereof and fragments thereof.

In some embodiments, it may be advantageous to reduce the lactate dehydrogenase activity in the recombinant bacterial host cell to allow or increase the conversion of the biomass into ethanol. In such embodiment, the recombinant bacterial host cell can be genetically modified as to decrease its lactate dehydrogenase activity. As used in the context of the present disclosure, the expression "lactate dehydrogenase" refers to an enzyme of the E.C. 1.1.1.27 class which is capable of catalyzing the conversion of pyruvic acid into lactate. The recombinant bacterial host cell can thus have one or more gene coding for a protein having lactate dehydrogenase activity which is inactivated (via partial or total deletion of the gene). In bacteria, the ldh1, ldh2, ldh3 and ldh4 genes encode proteins having lactate dehydrogenase activity. Some bacteria may contain as many as six or more such genes (i.e., ldh5, ldh6, etc.). In an embodiment, at least one of the ldh1, ldh2, ldh3 and ldh4 genes, their corresponding orthologs and paralogs is inactivated in the recombinant bacterial host cell. In an embodiment, only one of the ldh genes is inactivated in the recombinant bacterial host cell. For example, in the recombinant bacterial host cell of the present disclosure, only the ldh1 gene can be inactivated. In another embodiment, at least two of the ldh genes are inactivated in the recombinant bacterial host cell. In another embodiment, only two of the ldh genes are inactivated in the recombinant bacterial host cell. In a further embodiment, at least three of the ldh genes are inactivated in the recombinant bacterial host cell. In a further embodiment, only three of the ldh genes are inactivated in the recombinant bacterial host cell. In a further embodiment, at least four of the ldh genes are inactivated in the recombinant bacterial host cell. In a further embodiment, only four of the ldh genes are inactivated in the recombinant bacterial host cell. In a further embodiment, at least five of the ldh genes are inactivated in the recombinant bacterial cell. In a further embodiment, only five of the ldh genes are inactivated in the recombinant bacterial host cell. In a further embodiment, at least six of the ldh genes are inactivated in the recombinant bacterial host cell. In a further embodiment, only six of the ldh genes are inactivated in the recombinant bacterial host cell. In still another embodiment, all of the ldh genes are inactivated in the recombinant bacterial host cell.

In some embodiments, it may be advantageous to reduce the mannitol-1-phosphate 5-dehydrogenase activity in the recombinant bacterial host cell to allow or increase the conversion of the biomass into the fermentation product In such embodiments, the recombinant bacterial host cell can be genetically engineered to decrease its mannitol-1-phosphate 5-dehydrogenase activity. As used in the context of the present disclosure, the expression "mannitol-1-P 5-dehydrogenase" refer to an enzyme of the E.C. 1.1.1.17 class which is capable of catalyzing the conversion of mannitol into fructose-6-phosphate. The recombinant bacterial host cell can thus have one or more gene coding for a protein having mannitol dehydrogenase activity which is inactivated (via partial or total deletion of the gene). In bacteria, the mltD1 and mltD2 genes encode proteins having mannitol-1-P 5-dehydrogenase activity. In an embodiment, at least one of the mltD1 and mltD2 genes, their corresponding orthologs and paralogs is inactivated in the recombinant bacterial host cell. In an embodiment, only one of the mltD1 and mltD2 genes is inactivated in the recombinant bacterial host cell. In another embodiment, both of the mltD1 and mltD2 genes are inactivated in the recombinant bacterial host cell.

In some embodiments, the recombinant bacterial host cell, especially in embodiments in which the recombinant bacterial host cell is a recombinant LAB host cell, can express a bacteriocin. In some embodiments, the recombinant bacterial host cell can have the intrinsic ability (e.g., an ability that is not conferred by the introduction of a heterologous nucleic acid molecule) to express and produce at least one bacteriocin (e.g., a native bacteriocin). In some embodiments, the recombinant bacterial host cell can comprises one or more fourth genetic modification to express and produce one or more bacteriocin (in addition to the one it already expresses, if any). In such embodiment, the recombinant bacterial host cell will include one or more heterologous nucleic acid molecule encoding the bacteriocin and/or the polypeptide(s) associated with the immunity to the bacteriocin. The coding sequence for the bacteriocin and for the polypeptide(s) associated with the immunity to the further bacteriocin can be provided on the same or distinct heterologous nucleic acid molecules. The heterologous nucleic acid molecule(s) (which can be heterologous) can be integrated in the bacterial chromosome or be independently replicating from the bacterial chromosome.

Bacteriocins are known as a class of peptides and polypeptides exhibiting, as their biological activity, anti-bacterial properties. Bacteriocins can exhibit bacteriostatic or cytotoxic activity. Bacteriocin can be provided as a monomeric polypeptide, a dimer polypeptide (homo- and heterodimers) as well as a circular polypeptide. Since bacteriocin are usually expressed to be exported outside of the cell, they are usually synthesized as pro-polypeptides including a leader sequence, the latter being cleaved upon secretion. The bacteriocin of the present disclosure can be expressed using their native leader sequence or a heterologous leader sequence. It is known in the art that some bacteriocins are modified after being translated to include uncommon amino acids (such as lanthionine, methyllanthionine, didehydroalanine, and/or didehydroaminobutyric acid). The amino acid sequences provided herein for the different bacteriocins do not include such post-translational modifications, but it is understood that a recombinant bacterial host cell expressing a bacteriocin from a second heterologous nucleic acid molecule can produce a polypeptide which does not exactly match the amino acid sequence of the different SEQ ID NOs, but the exported bacteriocin can be derived from such amino acid sequences (by post-translational modification).

In other embodiments, the recombinant bacterial host cell can also lack the intrinsic ability to express one or more bacteriocin and can be genetically modified to express and produce one or more bacteriocin (e.g., a recombinant bacteriocin). In such embodiment, the recombinant bacterial host cell can comprise one or more heterologous nucleic acid molecule encoding the recombinant bacteriocin and its associated immunity polypeptide(s). The coding sequence for the recombinant bacteriocin and for the polypeptide(s) associated with the immunity to the recombinant bacteriocin can be provided on the same or distinct nucleic acid molecules. In some embodiments, the recombinant bacterial host cell can be genetically modified to express and produce more than one recombinant bacteriocin and associated immunity polypeptide(s). In such embodiment, the recombinant bacterial host cell will include one or more heterologous nucleic acid molecule encoding the additional recombinant bacteriocin and/or the polypeptide(s) associated with the immunity to the additional recombinant bacteriocin. The coding sequence for the recombinant bacteriocin and for the polypeptide(s) associated with the immunity to the recombinant bacteriocin can be provided on the same or distinct nucleic acid molecules. The nucleic acid molecule(s) (which can be heterologous) can be integrated in the bacterial chromosome or be independently replicating from the bacterial chromosome.

In some embodiments, the recombinant bacterial host cell will be cultured in the presence of a bacteriocin it does not express (natively or in a recombinant fashion). For example, the biomass can be supplemented with a purified and exogenous source of a bacteriocin. In such embodiment, the recombinant bacterial host cell can be genetically modified to express and produce a polypeptide conferring immunity to the bacteriocin present in the biomass. In such embodiment, the recombinant bacterial host cell will include one or more heterologous nucleic acid molecule encoding a bacteriocin immunity polypeptide(s). When more than one type of bacteriocins are present in the biomass, the coding sequence for the polypeptide(s) associated with the immunity of each bacteriocin can be provided on the same or distinct nucleic acid molecules. In such embodiments, the recombinant bacterial host cell can be genetically modified to express and produce more than one associated bacteriocin immunity polypeptide. In such embodiment, the recombinant bacterial host cell will include one or more heterologous nucleic acid molecule encoding the additional polypeptide(s) associated with the immunity to each the bacteriocin present in the biomass. The coding sequence for the polypeptide(s) associated with the immunity to the bacteriocin(s) can be provided on the same or distinct nucleic acid molecules. Such heterologous nucleic acid molecule(s) can be integrated in the bacterial chromosome or be independently replicating from the bacterial chromosome.

In some embodiments, the at least one bacteriocin comprises one or more bacteriocin from Gram-negative bacteria. The bacteriocin from Gram-negative bacteria which can be used also or in combination with one or more additional bacteriocin. Bacteriocins from Gram-negative bacteria include, but are not limited to, microcins, colicin-like bacteriocins and tailocins. In some embodiments, the at least one bacteriocin comprises one or more bacteriocin from Gram-positive bacteria. The bacteriocin from Gram-positive bacteria which can be used also or in combination with one or more additional bacteriocin. Bacteriocins from Gram-positive bacteria include, but are not limited to, class I bacteriocins (such as, for example nisin A and/or nisin Z), class II bacteriocins, including class IIa (such as, for example, pediocin) and IIb (such as, for example, brochocin for example) bacteriocins, class III bacteriocins, class IV bacteriocins and circular bacteriocins (such as, for example, gassericin). Known bacteriocins include, but are not limited to, acidocin, actagardine, agrocin, alveicin, aureocin, aureocin A53, aureocin A70, bisin, carnocin, carnocyclin, caseicin, cerein, circularin A, colicin, curvaticin, divercin, duramycin, enterocin, enterolysin, epidermin/gallidermin, erwiniocin, gardimycin, gassericin A, glycinecin, halocin, haloduracin, klebicin, lactocin S, lactococcin, lacticin, leucoccin, lysostaphin, macedocin, mersacidin, mesentericin, microbisporicin, microcin S, mutacin, nisin A, nisin Z, paenibacillin, planosporicin, pediocin, pentocin, plantaricin, pneumocyclicin, pyocin, reutericin 6, sakaci, salivaricin, sublancin, subtilin, sulfolobicin, tasmancin, thuricin 17, trifolitoxin, variacin, vibriocin, warnericin and warnerin.

In a specific embodiment, the bacteriocin expressed by the recombinant bacterial host cell or encoded by the heterologous nucleic acid molecule can be a Gram-positive class I bacteriocin. The Gram-positive class I bacteriocin can be the only bacteriocin expressed in the recombinant bacterial host cell or it can be expressed with one or more further bacteriocin. For example, nisin can be the only bacteriocin present in the biomass or produced by the recombinant bacterial host cell. In another example, nisin can be in combination with pediocin and brochocin in the biomass or expressed by the recombinant host bacterial cell. In some embodiments, the Gram-positive class I bacteriocin can be nisin A, nisin Z, nisin J, nisin H, nisin Q and/or nisin U. Nisin is a bacteriocin natively produced by some strains of *Lactococcus lactis*. Nisin is a relatively broad-spectrum bacteriocin effective against many Gram-positive organisms as well as spores. In an embodiment, nisin A has the amino acid sequence of SEQ ID NO: 9 (including its native leader sequence), is a variant of the amino acid sequence of SEQ ID NO: 9 (retaining, at least in part, the biological activity of nisin A) or is a fragment of the amino acid sequence of SEQ ID NO: 9 (retaining, at least in part, the biological activity of nisin A). In an embodiment, nisin A has the amino acid sequence of SEQ ID NO: 10 (excluding its native leader sequence), is a variant of the amino acid sequence of SEQ ID NO: 10 (retaining, at least in part, the biological activity of nisin A) or is a fragment of the amino acid sequence of SEQ ID NO: 10 (retaining, at least in part, the biological activity of nisin A). In an embodiment, nisin Z has the amino acid sequence of SEQ ID NO: 7 (including its native leader sequence), is a variant of the amino acid sequence of SEQ ID NO: 7 (retaining, at least in part, the biological activity of nisin Z) or is a fragment of the amino acid sequence of SEQ ID NO: 7 (retaining, at least in part, the biological activity of nisin Z). In an embodiment, nisin Z has the amino acid sequence of SEQ ID NO: 8 (excluding its native leader sequence), is a variant of the amino acid sequence of SEQ ID NO: 8 (retaining, at least in part, the biological activity of nisin Z) or is a fragment of the amino acid sequence of SEQ ID NO: 8 (retaining, at least in part, the biological activity of nisin Z).

In embodiments in which the recombinant bacterial host cell produces nisin as the bacteriocin or in which nisin is present in the biomass, the recombinant bacterial host cell can possess the machinery for making nisin or can be genetically engineered to express the machinery for making nisin. Polypeptides involved in the production and/or the regulation of production of nisin include, but are not limited to NisA, NisZ, NisJ, NisH, NisQ, NisB, NisT, NisC, NisP, NisR and/or NisK. The one or more polypeptides involved in the production and/or the regulation of production of nisin can be located on the same or a distinct nucleic acid molecule as the one encoding nisin.

In embodiments in which the recombinant bacterial host cell produces nisin as the bacteriocin or in which nisin is present in the biomass, the recombinant bacterial host cell possesses immunity against nisin or can be genetically engineered to gain immunity against nisin. A polypeptide known to confer immunity or resistance against nisin is NisI. In an embodiment, NisI has the amino acid sequence of SEQ ID NO: 11 (as well as functional variants and fragments thereof retaining at least on part their ability to confer immunity against nisin). As such, the heterologous nucleic acid molecule can further encode NisI. Additional polypeptides involved in conferring immunity against nisin include, without limitation, NisE (which is a nisin transporter), NisF (which is a nisin transporter) and NisG (which is a nisin permease). As such, the second heterologous nucleic acid molecule can further encode NisE, NisF and/or NisG. In an embodiment, NisE has the amino acid sequence of SEQ ID NO: 13 (as well as functional variants and fragments thereof retaining, at least in part, their ability to transport nisin). In an embodiment, NisF has the amino acid sequence of SEQ ID NO: 12 (as well as functional variants and fragments thereof retaining, at least in part, their ability to transport nisin). In an embodiment, NisG has the amino acid sequence of SEQ ID NO: 14 (as well as functional variants and fragments thereof retaining, at least in part, their ability to transport nisin). The one or more polypeptides involved in the conferring immunity against nisin can be located on the same or on a distinct nucleic acid molecule as the one encoding nisin and/or the polypeptides involved in the production and/or the regulation of production of nisin.

In a specific embodiment, the bacteriocin present in the biomass or expressed by the recombinant bacterial host cell can be a Gram-positive class II bacteriocin. The Gram-positive class II bacteriocin can be the only bacteriocin expressed in the recombinant bacterial host cell or it can be expressed with one or more further bacteriocin. Gram-positive class II bacteriocins include two subgroups: class IIA and class IIB bacteriocins. In a specific example, the Gram-positive class IIA bacteriocin can be, without limitation, pediocin (also referred to as the PedA polypeptide). In an embodiment, pediocin has the amino acid sequence of SEQ ID NO: 20 (including its native leader sequence), is a variant of the amino acid sequence of SEQ ID NO: 20 (retaining, at least in part, the biological activity of pediocin) or is a fragment of the amino acid sequence of SEQ ID NO: 20 (retaining, at least in part, the biological activity of pediocin). In an embodiment, pediocin has the amino acid sequence of SEQ ID NO: 21 (excluding its native leader sequence), is a variant of the amino acid sequence of SEQ ID NO: 21 (retaining, at least in part, the biological activity of pediocin) or is a fragment of the amino acid sequence of SEQ ID NO: 21 (retaining, at least in part, the biological activity of pediocin).

In embodiments in which the recombinant bacterial host cell produces pediocin as the bacteriocin or in which pediocin is present in the biomass, the recombinant bacterial host cell can possess the machinery for making and regulating pediocin production or can be genetically engineered to express the machinery for making and regulating pediocin production. A polypeptide known to confer immunity or resistance against pediocin is PedB. In an embodiment, PedB has the amino acid sequence of SEQ ID NO: 22 (as well as functional variants and fragments thereof retaining at least on part their ability to confer immunity against pediocin). As such, the recombinant bacterial host cell can express PedB or be genetically engineered to express PedB. In some embodiments, the heterologous nucleic acid molecule can further encode PedB (which can be present on the same nucleic acid molecule encoding PedA or a distinct one).

In a specific example, the Gram-positive class IIB bacteriocin can be, without limitation, brochocin. Brochocin is an heterodimer comprising a BrcA polypeptide and a BrcB polypeptide. In an embodiment, BrcA has the amino acid sequence of SEQ ID NO: 23 (including the pediocin leader sequence), is a variant of the amino acid sequence of SEQ ID NO: 23 (retaining, at least in part, the biological activity of brochocin when forming an heterodimer with BrcB) or is a fragment of the amino acid sequence of SEQ ID NO: 23 (retaining, at least in part, the biological activity of brochocin when forming an heterodimer with BrcB). In an embodiment, BrcA has the amino acid sequence of SEQ ID NO: 24 (excluding its native leader sequence), is a variant of the amino acid sequence of SEQ ID NO: 24 (retaining, at least in part, the biological activity of brochocin when forming an heterodimer with BrcB) or is a fragment of the amino acid sequence of SEQ ID NO: 24 (retaining, at least in part, the biological activity of brochocin when forming an heterodimer with BrcB). In an embodiment, BrcB has the amino acid sequence of SEQ ID NO: 25 (including the pediocin leader sequence), is a variant of the amino acid sequence of SEQ ID NO: 25 (retaining, at least in part, the biological activity of brochocin when forming an heterodimer with BrcA) or is a fragment of the amino acid sequence of SEQ ID NO: 25 (retaining, at least in part, the biological activity of brochocin when forming an heterodimer with BrcA). In an embodiment, BrcB has the amino acid sequence of SEQ ID NO: 26 (excluding its native leader sequence), is a variant of the amino acid sequence of SEQ ID NO: 26 (retaining, at least in part, the biological activity of brochocin when forming an heterodimer with BrcA) or is a fragment of the amino acid sequence of SEQ ID NO: 26 (retaining, at least in part, the biological activity of brochocin when forming an heterodimer with BrcA).

In embodiments in which the recombinant bacterial host cell produces brochocin as the bacteriocin or in which brochocin is present in the biomass, the recombinant bacterial host cell possesses immunity against brochocin. A polypeptide known to confer immunity or resistance against brochocin is BrcI In an embodiment, BrcI has the amino acid sequence of SEQ ID NO: 27 (as well as functional variants and fragments thereof retaining at least on part their ability to confer immunity against brochocin). As such, the recombinant bacterial host cell can express BrcI or be genetically engineered to express BrcI. In some embodiments, the heterologous nucleic acid molecule can further encode BrcI (which can be present on the same nucleic acid molecule encoding BrcA/BrcB or a distinct one).

In embodiments in which the bacteriocin expressed by the recombinant bacterial host cell is a Gram-positive class II bacteriocin, the recombinant bacterial host cell can express a native non-sec dependent secretory machinery and/or include one or more heterologous nucleic acid molecules encoding a native non-sec dependent secretory machinery for exporting the Gram-positive class II bacteriocin. An exemplary component of a non-sec dependent secretory machinery for exporting the Gram-positive class II bacteriocin is PedC (which can also be referred to as BrcD) which can have, in some additional embodiments, GenBank Accession Number WP_005918571, be a variant of GenBank Accession Number WP_005918571 having disulfide isomerase activity or be a fragment of GenBank Accession Number WP_005918571 having disulfide isomerase activity. A further exemplary component of a non-sec dependent secretory machinery for exporting the Gram-positive class II bacteriocin is PedD (which can also be referred to as PapD) which can have, in some additional embodiments, Uniprot Accession Number P36497.1, be a variant of Uniprot Accession Number P36497.1 having ATP-binding and transporting activity or be a fragment of Uniprot Accession Number P36497.1 having ATP-binding and transporting activity.

In some embodiments, the Gram-positive class II bacteriocin, its variants and its fragments can be associated with a sec-dependent leader peptide so as to facilitate its transport outside the recombinant bacterial host cell.

In a specific example, the Gram-positive cyclic bacteriocin can be gasserin. In an embodiment, gasserin has the amino acid sequence of SEQ ID NO: 15 (including its native leader sequence), is a variant of the amino acid sequence of SEQ ID NO: 15 (retaining, at least in part, the biological activity of gasserin) or is a fragment of the amino acid sequence of SEQ ID NO: 15 (retaining, at least in part, the biological activity of gasserin). In an embodiment, gasserin has the amino acid sequence of SEQ ID NO: 16 (excluding its native leader sequence), is a variant of the amino acid sequence of SEQ ID NO: 16 (retaining, at least in part, the biological activity of gasserin) or is a fragment of the amino acid sequence of SEQ ID NO: 16 (retaining, at least in part, the biological activity of gasserin). In such embodiment, the recombinant bacterial host cell is capable of expressing gasserin which can be expressed from the heterologous nucleic acid molecule.

In embodiments in which the first recombinant bacterial host cell produces gasserin as the bacteriocin or in which gasserin is present in the culture medium, the recombinant bacterial host cell can possess the machinery for making or for regulating the production of gasserin or can be genetically engineered to express the machinery for making or for regulating the production of gasserin. Polypeptides involved in the machinery for making gasserin include, without limitations, GaaT (which is a gasserin transporter) and GaaE (which is a gasserin permease). As such, the heterologous nucleic acid molecule can further encode GaaT and/or GaaE (which can be on the same or on a different nucleic acid molecule than the one encoding gasserin). In an embodiment, GaaT has the amino acid sequence of SEQ ID NO: 18 (as well as functional variants and fragments thereof retaining, at least in part, their ability to transport gasserin). In an embodiment, GaaE has the amino acid sequence of SEQ ID NO: 19 (as well as functional variants and fragments thereof retaining, at least in part, their ability to transport gasserin).

In embodiments in which the recombinant bacterial host cell produces gasserin as the bacteriocin or in which gasserin is present in the biomass, the recombinant bacterial host cell possesses immunity against gasserin or can be genetically engineered to gain immunity against gasserin. A polypeptide known to confer immunity or resistance against gasserin is GaaI. In an embodiment, GaaI has the amino acid sequence of SEQ ID NO: 17 (as well as functional variants and fragments thereof retaining at least on part their ability to confer immunity against gasserin). As such, the heterologous nucleic acid molecule can further encode GaaI (which can be on the same or on a different nucleic acid molecule than the one encoding gasserin, GaaT or GaaE).

In embodiments in which the biomass comprises one or more antibiotic, it is important that the viability or the growth of the recombinant bacterial host cell is not reduced or slowed due to the presence of such antibiotic. As such, in some embodiments, the recombinant bacterial host cell can include one or more further nucleic acid molecule encoding one or more polypeptide involved in conferring resistance to the antibiotic(s) present in the biomass. Alternatively or in combination, the recombinant bacterial host cell can be made more resistant towards the antibiotic(s) present in the biomass by being submitted (prior to the fermentation) to an adaptation process. During an adaptation process, the recombinant bacterial host cell is submitted to increasing concentrations of the antibiotic for which resistance is sought. In an embodiment, the recombinant bacterial host cell comprises one or more genes conferring resistance to a beta lactam, such as penicillin. In another embodiment, the recombinant bacterial host cell comprises one or more genes conferring resistance to streptogramin, such as virginiamycin. In another embodiment, the recombinant bacterial host cell comprises one or more genes conferring resistance to aminoglycoside, such as streptomycin. In yet a further embodiment, the recombinant bacterial host cell comprises one or more genes conferring resistance to a macrolide, such as, for example, erythromycin. In still another embodiment, the recombinant bacterial host cell comprises one or more genes conferring resistance to a polyether, such as monensin. In an embodiment, the recombinant bacterial host cell is adapted to become more resistant to a beta lactam, such as penicillin. In another embodiment, the recombinant bacterial host cell is adapted to become more resistant to streptogramin, such as virginiamycin. In another embodiment, the recombinant bacterial host cell com is adapted to become more resistant to aminoglycoside, such as streptomycin. In yet a further embodiment, the recombinant bacterial host cell is adapted to become more resistant to a macrolide, such as, for example, erythromycin. In still another embodiment, the recombinant bacterial host cell is adapted to become more resistant to a polyether, such as monensin.

The recombinant bacterial host cell can be provided as a cell concentrate, optionally in combination with the yeast. The cell concentrate comprising the recombinant bacterial host cell can be obtained, for example, by propagating the recombinant bacterial host cell in a culture medium and removing at least one components of the medium comprising the propagated recombinant bacterial cells. This can be done, for example, by dehydrating, filtering (including ultrafiltrating) and/or centrifuging the medium comprising the propagated recombinant bacterial host cells. In an embodiment, the recombinant bacterial host cell can be provided as a frozen concentrate in the combination.

Fermenting Yeast

The recombinant bacterial host cell of the present disclosure is used in combination with a yeast cell to convert the biomass into ethanol. In the context of the present disclosure, the yeast cell is considered to be a fermenting yeast cell because it is responsible for the majority of the conversion of the biomass into ethanol. The yeast cell can be a wild-type native yeast cell or a can be recombinant yeast host cell. In some embodiments, the yeast cell can be a population comprising both a wild-type native yeast cell and a recombinant yeast host cell.

Suitable yeast cells can be, for example, from the genus *Saccharomyces, Kluyveromyces, Arxula, Debaryomyces, Candida, Pichia, Phaffia, Schizosaccharomyces, Hansenula, Kloeckera, Schwanniomyces* or *Yarrowia*. Suitable yeast species can include, for example, *S. cerevisiae, S. bulderi, S. barnetti, S. exiguus, S. uvarum, S. diastaticus, K. lactis, K. marxianus* or *K. fragilis*. In some embodiments, the yeast is selected from the group consisting of *Saccharomyces cerevisiae, Schizzosaccharomyces pombe, Candida albicans, Pichia pastoris, Pichia stipitis, Yarrowia lipolytica, Hansenula polymorpha, Phaffia rhodozyma, Candida utilis,* *Arxula adeninivorans, Debaryomyces hansenii, Debaryomyces polymorphus, Schizosaccharomyces pombe* and *Schwanniomyces occidentalis*. In one particular embodiment, the yeast cell is *Saccharomyces cerevisiae*. In some embodiments, the yeast cell can be an oleaginous yeast cell. For example, the oleaginous yeast cell can be from the genus *Blakeslea, Candida, Cryptococcus, Cunninghamella, Lipomyces, Mortierella, Mucor, Phycomyces, Pythium, Rhodosporidum, Rhodotorula, Trichosporon* or *Yarrowia*. In some alternative embodiments, the yeast cell can be an oleaginous microalgae host cell (e.g., for example, from the genus *Thraustochytrium* or *Schizochytrium*). In an embodiment, the yeast cell is from the genus *Saccharomyces* and, in some embodiments, from the species *Saccharomyces cerevisiae*.

In a specific embodiment, the yeast cell can have one or more genetic modifications to increase the biological activity of a polypeptide having acetylating aldehyde dehydrogenase activity. This can be provided for example by introducing a heterologous nucleic acid molecule encoding a heterologous polypeptide having acetylating aldehyde dehydrogenase activity in the yeast cell. In embodiments, the genetic modification can comprise introducing a heterologous nucleic acid molecule encoding a polypeptide having acetylating aldehyde dehydrogenase activity in the recombinant yeast cell. As used in the present disclosure, a polypeptide having acetylating aldehyde dehydrogenase activity has the ability to convert acetyl-coA into an aldehyde. In some embodiments, the polypeptide having acetylating aldehyde dehydrogenase activity is an acetaldehyde/alcohol dehydrogenases (AADH) or is a bifunctional acetylating aldehyde dehydrogenase/alcohol dehydrogenase (ADHE). The bifunctional acetaldehyde/alcohol dehydrogenase is an enzyme capable of converting acetyl-CoA into acetaldehyde as well as acetaldehyde into ethanol. Heterologous bifunctional acetaldehyde/alcohol dehydrogenases include but are not limited to those described in U.S. Pat. No. 8,956,851 and WO 2015/023989, incorporated herewith in their entirety. Heterologous AADHs of the present disclosure include, but are not limited to, the ADHE polypeptides or a polypeptide encoded by an adhe gene ortholog. In an embodiment, the ADHE is from a *Bifidobacterium* sp., such as for example, a *Bifidobacterium adolescentis*. In such embodiment, the ADHE from *Bifidobacterium adolescentis* can have the amino acid sequence of SEQ ID NO: 43 (or be variants and fragments thereof) and, in some additional embodiments, be encoded by a nucleic acid molecule having the nucleic acid sequence of SEQ ID NO: 44 or 45 or a degenerate sequence encoding the polypeptide having the amino acid sequence SEQ ID NO: 43 (its variant or its fragment). In another embodiment, the ADHE is from a *Clostridium* sp., such as for example, *Clostridium phytofermentans*. In such embodiment, the ADHE from *Clostridium phytofermentans* can have the amino acid sequence of SEQ ID NO: 46 or be variants and fragments thereof) and, in some additional embodiments, be encoded by a nucleic acid molecule having the amino acid sequence of SEQ ID NO: 47. In another embodiment, the ADHE is from a *Piromyces* sp. In such embodiment, the ADHE from *Piromyces* sp. can have the amino acid sequence of SEQ ID NO: 48 (or be variants and fragments thereof) and, in some additional embodiments, be encoded by a nucleic acid molecule having the amino acid sequence of SEQ ID NO: 49 or 50. In another embodiment, the ADHE is from a *Escherichia* sp., such as for example, *Escherichia coli*. In such embodiment, the ADHE from *Escherichia coli* can have the amino acid sequence of SEQ ID NO: 51 (or be variants and fragments thereof) and, in some additional embodiments, be encoded by a nucleic acid molecule having the amino acid sequence of SEQ ID NO: 52 or 53. In another embodiment, the ADHE is from a *Chlamydomonas* sp., such as for example, *Chlamydomonas rheinhardii*. In such embodiment, the ADHE from *Chlamydomonas rheinhardii* can have the amino acid sequence of SEQ ID NO: 54 (or be variants and fragments thereof) and, in some additional embodiments, be encoded by a nucleic acid molecule having the amino acid sequence of SEQ ID NO: 55 or 56.

In some embodiments, the yeast cell can also include one or more genetic modifications limiting the production of glycerol. For example, the genetic modification can be a genetic modification leading to the reduction in the production, and in an embodiment to the inhibition in the production, of one or more native enzymes that function to produce glycerol. As used in the context of the present disclosure, the expression "reducing the production of one or more native enzymes that function to produce glycerol" refers to a genetic modification which limits or impedes the expression of genes associated with one or more native polypeptides (in some embodiments enzymes) that function to produce glycerol, when compared to a corresponding yeast strain which does not bear such genetic modification. In some instances, the additional genetic modification reduces but still allows the production of one or more native polypeptides that function to produce glycerol. In other instances, the genetic modification inhibits the production of one or more native enzymes that function to produce glycerol. Polypeptides that function to produce glycerol refer to polypeptides which are endogenously found in the yeast cell. Native enzymes that function to produce glycerol include, but are not limited to, the GPD1 and the GPD2 polypeptide (also referred to as GPD1 and GPD2, respectively) as well as the GPP1 and the GPP2 polypeptides (also referred to as GPP1 and GPP2, respectively). In an embodiment, the yeast cell bears a genetic modification in at least one of the gpd1 gene (encoding the GPD1 polypeptide), the gpd2 gene (encoding the GPD2 polypeptide), the gpp1 gene (encoding the GPP1 polypeptide) or the gpp2 gene (encoding the GPP2 polypeptide). In another embodiment, the yeast cell bears a genetic modification in at least two of the gpd1 gene (encoding the GPD1 polypeptide), the gpd2 gene (encoding the GPD2 polypeptide), the gpp1 gene (encoding the GPP1 polypeptide) or the gpp2 gene (encoding the GPP2 polypeptide). Examples of recombinant yeast cells bearing such genetic modification(s) leading to the reduction in the production of one or more native enzymes that function to produce glycerol are described in WO 2012/138942, which is incorporated herewith in its entirety. In some embodiments, the yeast cell has a genetic modification (such as a genetic deletion or insertion) only in one enzyme that functions to produce glycerol, in the gpd2 gene, which would cause the yeast cell to have a knocked-out gpd2 gene. In some embodiments, the recombinant yeast host cell can have a genetic modification in the gpd1 gene and the gpd2 gene resulting is a recombinant yeast host cell being knock-out for the gpd1 gene and the gpd2 gene. In some specific embodiments, the yeast cell can be a knock-out for the gpd1 gene and have duplicate copies of the gpd2 gene (in some embodiments, under the control of the gpd1 promoter). In yet another embodiment, the yeast cell does not bear such genetic modification and includes its native genes coding for the GPP/GDP proteins. As such, in some embodiments, there are no genetic modifications leading to the reduction in the production of one or more native enzymes that function to produce glycerol in the yeast cell.

Alternatively or in combination, the yeast cell can also include one or more additional genetic modifications facilitating the transport of glycerol in the yeast cell. For example, the additional genetic modification can be a genetic modification leading to the increase in activity of one or more native enzymes that function to transport glycerol. In some embodiments, the additional genetic modification is the introduction of a heterologous nucleic acid molecule encoding a glycerol transporter. Native enzymes that function to transport glycerol synthesis include, but are not limited to, the FPS1 polypeptide as well as the STL1 polypeptide. The FPS1 polypeptide is a glycerol exporter and the STL1 polypeptide functions to import glycerol in the recombinant yeast host cell. By either reducing or inhibiting the expression of the FPS1 polypeptide and/or increasing the expression of the STL1 polypeptide, it is possible to control, to some extent, glycerol synthesis.

The STL1 protein is natively expressed in yeasts and fungi, therefore the heterologous protein functioning to import glycerol can be derived from yeasts and fungi. STL1 genes encoding the STL1 protein include, but are not limited to, *Saccharomyces cerevisiae* Gene ID: 852149, *Candida albicans*, *Kluyveromyces lactis* Gene ID: 2896463, *Ashbya gossypii* Gene ID: 4620396, *Eremothecium sinecaudum* Gene ID: 28724161, *Torulaspora delbrueckii* Gene ID: 11505245, *Lachancea thermotolerans* Gene ID: 8290820, *Phialophora attae* Gene ID: 28742143, *Penicillium digitatum* Gene ID: 26229435, *Aspergillus oryzae* Gene ID: 5997623, *Aspergillus fumigatus* Gene ID: 3504696, *Talaromyces atroroseus* Gene ID: 31007540, *Rasamsonia emersonii* Gene ID: 25315795, *Aspergillus flavus* Gene ID: 7910112, *Aspergillus terreus* Gene ID: 4322759, *Penicillium chrysogenum* Gene ID: 8310605, *Alternaria alternata* Gene ID: 29120952, *Paraphaeosphaeria sporulosa* Gene ID: 28767590, *Pyrenophora tritici-repentis* Gene ID: 6350281, *Metarhizium robertsii* Gene ID: 19259252, *Isaria fumosorosea* Gene ID: 30023973, *Cordyceps militaris* Gene ID: 18171218, *Pochonia chlamydosporia* Gene ID: 28856912, *Metarhizium majus* Gene ID: 26274087, *Neofusicoccum parvum* Gene ID:19029314, *Diplodia corticola* Gene ID: 31017281, *Verticillium dahliae* Gene ID: 20711921, *Colletotrichum gloeosporioides* Gene ID: 18740172, *Verticillium albo-atrum* Gene ID: 9537052, *Paracoccidioides lutzii* Gene ID: 9094964, *Trichophyton rubrum* Gene ID: 10373998, *Nannizzia gypsea* Gene ID: 10032882, *Trichophyton verrucosum* Gene ID: 9577427, *Arthroderma benhamiae* Gene ID: 9523991, *Magnaporthe oryzae* Gene ID: 2678012, *Gaeumannomyces graminis* var. *tritici* Gene ID: 20349750, *Togninia minima* Gene ID: 19329524, *Eutypa lata* Gene ID: 19232829, *Scedosporium apiospermum* Gene ID: 27721841, *Aureobasidium namibiae* Gene ID: 25414329, *Sphaerulina musiva* Gene ID: 27905328 as well as *Pachysolen tannophilus* GenBank Accession Numbers JQ481633 and JQ481634, *Saccharomyces paradoxus* STL1 and *Pichia sorbitophilia*. In an embodiment, the STL1 protein is encoded by *Saccharomyces cerevisiae* Gene ID: 852149.

Alternatively or in combination, the yeast cell can be modified to bear a genetic modification allowing the expression of a saccharolytic enzyme. For example, the additional genetic modification can be a genetic modification leading to the increase in expression of one or more native saccharolytic enzyme. In some embodiments, the additional genetic modification is the introduction of a heterologous polypeptide encoding a saccharolytic enzyme. As used in the context of the present disclosure, a "saccharolytic enzyme" can be any enzyme involved in carbohydrate digestion, metabolism and/or hydrolysis, including amylases, cellulases, hemicellulases, cellulolytic and amylolytic accessory enzymes, inulinases, levanases, and pentose sugar utilizing enzymes. In an embodiment, the saccharolytic enzyme is an amylolytic enzyme. As used herein, the expression "amylolytic enzyme" refers to a class of enzymes capable of hydrolyzing starch or hydrolyzed starch. Amylolytic enzymes include, but are not limited to alpha-amylases (EC 3.2.1.1, sometimes referred to fungal alpha-amylase, see below), maltogenic amylase (EC 3.2.1.133), glucoamylase (EC 3.2.1.3), glucan 1,4-alpha-maltotetraohydrolase (EC 3.2.1.60), pullulanase (EC 3.2.1.41), iso-amylase (EC 3.2.1.68) and amylomaltase (EC 2.4.1.25). In a specific embodiment, the saccharolytic enzyme is a glucoamylase. In an embodiment, the one or more amylolytic enzymes can be an alpha-amylase from *Aspergillus oryzae*, a maltogenic alpha-amylase from *Geobacillus stearothermophilus*, a glucoamylase from *Saccharomycopsis fibuligera*, a glucan 1,4-alpha-maltotetraohydrolase from *Pseudomonas saccharophila*, a pullulanase from *Bacillus naganoensis*, a pullulanase from *Bacillus acidopullulyticus*, an iso-amylase from *Pseudomonas amyloderamosa*, and/or amylomaltase from *Thermus thermophilus*. Some amylolytic enzymes have been described in WO 2018/167670 and are incorporated herein by reference.

For example, the yeast cell can bear one or more genetic modifications allowing for the production of a heterologous glucoamylase. Many microbes produce an amylase to degrade extracellular starches. In addition to cleaving the last α(1-4) glycosidic linkages at the non-reducing end of amylose and amylopectin, yielding glucose, γ-amylase will cleave α(1-6) glycosidic linkages. The heterologous glucoamylase can be derived from any organism. In an embodiment, the heterologous protein is derived from a γ-amylase, such as, for example, the glucoamylase of *Saccharomycopsis filbuligera* (e.g., encoded by the glu 0111 gene). Examples of yeast cells bearing such genetic modifications are described in WO 2011/153516 as well as in WO 2017/037614 and herewith incorporated in its entirety. In an embodiment, the recombinant yeast host cell is capable of expressing the heterologous glucoamylase having the amino acid sequence of SEQ ID NO: 28, a variant of the amino acid sequence of SEQ ID NO: 28 having glucoamylase activity or is a fragment of the amino acid sequence of SEQ ID NO: 28 having glucoamylase activity. In some embodiments, the heterologous nucleic acid molecule encoding the polypeptide having glucoamylase activity has the nucleic acid sequence of SEQ ID NO: 29, is a variant of the nucleic acid sequence of SEQ ID NO: 29 (encoding a polypeptide having glucoamylase activity), is a fragment of the nucleic acid sequence of SEQ ID NO: 29 (encoding a polypeptide having glucoamylase activity) or is a degenerate sequence encoding the polypeptide having the amino acid sequence SEQ ID NO: 28 (its variant or its fragment).

Alternatively or in combination, the yeast cell can have increased biological activity in one or more involved in formate/acetyl-CoA production polypeptide. For example, the yeast host cell can bear one or more genetic modifications for increasing formate/acetyl-CoA production. In order to do so, yeast cell can bear one or more genetic modification for increasing its pyruvate formate lyase activity. For example, the yeast cell can have one or more heterologous nucleic acid molecules encoding one or more polypeptide having formate lyase activity. As used in the context of the present disclosure, "a heterologous enzyme that function to increase formate/acetyl-CoA production" refers to polypeptides which may or may not be endogenously found in the yeast host cell and that are purposefully introduced into the yeast cells to anabolize formate. In some embodiments, the heterologous enzyme that can be a heterologous pyruvate formate lyase (PFL), such as PFLA or PFLB heterologous PFL of the present disclosure include, but are not limited to, the PFLA polypeptide, a polypeptide encoded by a pfla gene ortholog or paralog, the PFLB polypeptide or a polypeptide encoded by a pflb gene ortholog or paralog.

Embodiments of the pyruvate formate lyase activating enzyme and of PFLA can be derived, without limitation, from the following (the number in brackets correspond to the Gene ID number): *Escherichia coli* (MG1655945517), *Shewanella oneidensis* (1706020), *Bifidobacterium longum* (1022452), *Mycobacterium bovis* (32287203), *Haemophilus parasuis* (7277998), *Mannheimia haemolytica* (15341817), *Vibrio vulnificus* (33955434), *Cronobacter sakazakii* (29456271), *Vibrio alginolyticus* (31649536), *Pasteurella multocida* (29388611), *Aggregatibacter actinomycetemcomitans* (31673701), *Actinobacillus suis* (34291363), *Finegoldia magna* (34165045), *Zymomonas mobilis* subsp. *mobilis* (3073423), *Vibrio tubiashii* (23444968), *Gallibacterium anatis* (10563639), *Actinobacillus pleuropneumoniae serovar* (4849949), *Ruminiclostridium thermocellum* (35805539), *Cylindrospermopsis raciborskii* (34474378), *Lactococcus garvieae* (34204939), *Bacillus cytotoxicus* (33895780), *Providencia stuartii* (31518098), *Pantoea ananatis* (31510290), *Teredinibacter turnerae* (29648846), *Morganella morganii* subsp. *morganii* (14670737), *Vibrio anguillarum* (77510775106), *Dickeya dadantii* (39379733484), *Xenorhabdus bovienii* (8830449), *Edwardsiella ictaluri* (7959196), *Proteus mirabilis* (6801040), *Rahnella aquatilis* (34350771), *Bacillus pseudomycoides* (34214771), *Vibrio alginolyticus* (29867350), *Vibrio nigripulchritudo* (29462895), *Vibrio orientalis* (25689084), *Kosakonia sacchari* (23844195), *Serratia marcescens* subsp. *marcescens* (23387394), *Shewanella baltica* (11772864), *Vibrio vulnificus* (2625152), *Streptomyces acidiscabies* (33082227), *Streptomyces davaonensis* (31227069), *Streptomyces scabiei* (24308152), *Volvox carteri f. nagariensis* (9616877), *Vibrio breoganii* (35839746), *Vibrio mediterranei* (34766273), *Fibrobacter succinogenes* subsp. *succinogenes* (34755395), *Enterococcus gilvus* (34360882), *Akkermansia muciniphila* (34173806), *Enterobacter hormaechei* subsp. *Steigerwaltii* (34153767), *Dickeya zeae* (33924935), *Enterobacter* sp. (32442159), *Serratia odorifera* (31794665), *Vibrio crassostreae* (31641425), *Selenomonas ruminantium* subsp. *lactilytica* (31522409), *Fusobacterium necrophorum* subsp. *funduliforme* (31520833), *Bacteroides uniformis* (31507008), *Haemophilus somnus* (233631487328), *Rodentibacter pneumotropicus* (31211548), *Pectobacterium carotovorum* subsp. *carotovorum* (29706463), *Eikenella corrodens* (29689753), *Bacillus thuringiensis* (29685036), *Streptomyces rimosus* subsp. *Rimosus* (29531909), *Vibrio fluvialis* (29387180), *Klebsiella oxytoca* (29377541), *Parageobacillus thermoglucosidans* (29237437), *Aeromonas veronii* (28678409), *Clostridium innocuum* (26150741), *Neisseria mucosa* (25047077), *Citrobacter freundii* (23337507), *Clostridium bolteae* (23114831), *Vibrio tasmaniensis* (7160642), *Aeromonas salmonicida* subsp. *salmonicida* (4995006), *Escherichia coli* O157:H7 str. *Sakai* (917728), *Escherichia coli* O83:H1 str. (12877392), *Yersinia pestis* (11742220), *Clostridioides difficile* (4915332), *Vibrio fischeri* (3278678), *Vibrio parahaemolyticus* (1188496), *Vibrio corallfilyticus* (29561946), *Kosakonia cowanii* (35808238), *Yersinia ruckeri* (29469535), *Gardnerella vaginalis* (99041930), *Listeria fleischmannii* subsp. *Coloradonensis* (34329629), *Photo-*

*bacterium kishitanii* (31588205), *Aggregatibacter actinomycetemcomitans* (29932581), *Bacteroides caccae* (36116123), *Vibrio toranzoniae* (34373279), *Providencia alcalifaciens* (34346411), *Edwardsiella anguillarum* (33937991), *Lonsdalea quercina* subsp. *Quercina* (33074607), *Pantoea septica* (32455521), *Butyrivibrio proteoclasticus* (31781353), *Photorhabdus temperata* subsp. *Thracensis* (29598129), *Dickeya solani* (23246485), *Aeromonas hydrophila* subsp. *hydrophila* (4489195), *Vibrio cholerae* O1 biovar E1 Tor str. (2613623), *Serratia rubidaea* (32372861), *Vibrio bivalvicida* (32079218), *Serratia liquefaciens* (29904481), *Gilliamella apicola* (29851437), *Pluralibacter gergoviae* (29488654), *Escherichia coli* O104:H4 (13701423), *Enterobacter aerogenes* (10793245), *Escherichia coli* (7152373), *Vibrio campbellii* (5555486), *Shigella dysenteriae* (3795967), *Bacillus thuringiensis* serovar konkukian (2854507), *Salmonella enterica* subsp. *enterica* serovar Typhimurium (1252488), *Bacillus anthracis* (1087733), *Shigella flexneri* (1023839), *Streptomyces griseoruber* (32320335), *Ruminococcus gnavus* (35895414), *Aeromonas fluvialis* (35843699), *Streptomyces ossamyceticus* (35815915), *Xenorhabdus doucetiae* (34866557), *Lactococcus piscium* (34864314), *Bacillus glycinifermentans* (34773640), *Photobacterium damselae* subsp. *Damselae* 34509297, *Streptomyces venezuelae* 34035779, *Shewanella algae* (34011413), *Neisseria sicca* (33952518), *Chania multitudinisentens* (32575347), *Kitasatospora purpeofusca* (32375714), *Serratia fonticola* (32345867), *Aeromonas enteropelogenes* (32325051), *Micromonospora aurantiaca* (32162988), *Moritella viscosa* (31933483), *Yersinia aldovae* (31912331), *Leclercia adecarboxylata* (31868528), *Salinivibrio costicola* subsp. *costicola* (31850688), *Aggregatibacter aphrophilus* (31611082), *Photobacterium leiognathi* (31590325), *Streptomyces canus* (31293262), *Pantoea dispersa* (29923491), *Pantoea rwandensis* (29806428), *Paenibacillus borealis* (29548601), *Aliivibrio wodanis* (28541257), *Streptomyces virginiae* (23221817), *Escherichia coli* (7158493), *Mycobacterium tuberculosis* (887973), *Streptococcus mutans* (1028925), *Streptococcus cristatus* (29901602), *Enterococcus hirae* (13176624), *Bacillus licheniformis* (3031413), *Chromobacterium violaceum* (24949178), *Parabacteroides distasonis* (5308542), *Bacteroides vulgatus* (5303840), *Faecalibacterium prausnitzii* (34753201), *Melissococcus plutonius* (34410474), *Streptococcus gallolyticus* subsp. *gallolyticus* (34397064), *Enterococcus malodoratus* (34355146), *Bacteroides oleiciplenus* (32503668), *Listeria monocytogenes* (985766), *Enterococcus faecalis* (1200510), *Campylobacter jejuni* subsp. *jejuni* (905864), *Lactobacillus plantarum* (1063963), *Yersinia enterocolitica* subsp. *enterocolitica* (4713333), *Streptococcus equinus* (33961143), *Macrococcus canis* (35294771), *Streptococcus sanguinis* (4807186), *Lactobacillus salivarius* (3978441), *Lactococcus lactis* subsp. *lactis* (1115478), *Enterococcus faecium* (12999835), *Clostridium botulinum A* (5184387), *Clostridium acetobutylicum* (1117164), *Bacillus thuringiensis serovar konkukian* (2857050), *Cryobacterium flavum* (35899117), *Enterovibrio norvegicus* (35871749), *Bacillus acidiceler* (34874556), *Prevotella intermedia* (34516987), *Pseudobutyrivibrio ruminis* (34419801), *Pseudovibrio ascidiaceicola* (34149433), *Corynebacterium coyleae* (34026109), *Lactobacillus curvatus* (33994172), *Cellulosimicrobium cellulans* (33980622), *Lactobacillus agilis* (33975995), *Lactobacillus sakei* (33973512), *Staphylococcus simulans* (32051953), *Obesumbacterium proteus* (29501324), *Salmonella enterica* subsp. *enterica serovar Typhi* (1247402), *Streptococcus agalactiae* (1014207), *Streptococcus agalactiae* (1013114), *Legionella pneumophila* subsp. *pneumophila* str. Philadelphia (119832735), *Pyrococcus furiosus* (1468475), *Mannheimia haemolytica* (15340992), *Thalassiosira pseudonana* (7444511), *Thalassiosira pseudonana* (7444510), *Streptococcus thermophilus* (31940129), *Sulfolobus solfataricus* (1454925), *Streptococcus iniae* (35765828), *Streptococcus iniae* (35764800), *Bifidobacterium thermophilum* (31839084), *Bifidobacterium animalis* subsp. *lactis* (29695452), *Streptobacillus moniliformis* (29673299), *Thermogladius calderae* (13013001), *Streptococcus oralis* subsp. *tigurinus* (31538096), *Lactobacillus ruminis* (29802671), *Streptococcus parauberis* (29752557), *Bacteroides ovatus* (29454036), *Streptococcus gordonii* str. *Challis* substr. CH1 (25052319), *Clostridium botulinum* B str. *Eklund* 17B (19963260), *Thermococcus litoralis* (16548368), *Archaeoglobus sulfaticallidus* (15392443), *Ferroglobus placidus* (8778929), *Archaeoglobus profundus* (8739370), *Listeria seeligeri serovar* 1/2b (32488230), *Bacillus thuringiensis* (31632063), *Rhodobacter capsulatus* (31491679), *Clostridium botulinum* (29749009), *Clostridium perfringens* (29571530), *Lactococcus garvieae* (12478921), *Proteus mirabilis* (6799920), *Lactobacillus animalis* (32012274), *Vibrio alginolyticus* (29869205), *Bacteroides thetaiotaomicron* (31617701), *Bacteroides thetaiotaomicron* (31617140), *Bacteroides cellulosilyticus* (29608790), *Bacteroides ovatus* (29453452), *Bacillus mycoides* (29402181), *Chlamydomonas reinhardtii* (5726206), *Fusobacterium periodonticum* (35833538), *Selenomonas flueggei* (32477557), *Selenomonas noxia* (32475880), *Anaerococcus hydrogenalis* (32462628), *Centipeda periodontii* (32173931), *Centipeda periodontii* (32173899), *Streptococcus thermophilus* (31938326), *Enterococcus durans* (31916360), *Fusobacterium nucleatum* (31730399), *Anaerostipes hadrus* (31625694), *Anaerostipes hadrus* (31623667), *Enterococcus haemoperoxidus* (29838940), *Gardnerella vaginalis* (29692621), *Streptococcus salivarius* (29397526), *Klebsiella oxytoca* (29379245), *Bifidobacterium breve* (29241363), *Actinomyces odontolyticus* (25045153), *Haemophilus ducreyi* (24944624), *Archaeoglobus fulgidus* (24793671), *Streptococcus uberis* (24161511), *Fusobacterium nucleatum* subsp. *animalis* (23369066), *Corynebacterium accolens* (23249616), *Archaeoglobus veneficus* (10394332), *Prevotella melaninogenica* (9497682), *Aeromonas salmonicida* subsp. *salmonicida* (4997325), *Pyrobaculum islandicum* (4616932), *Thermofilum pendens* (4600420), *Bifidobacterium adolescentis* (4556560), *Listeria monocytogenes* (986485), *Bifidobacterium thermophilum* (35776852), *Methanothermobacter* sp. CaT2 (24854111), *Streptococcus pyogenes* (901706), *Exiguobacterium sibiricum* (31768748), *Clostridioides difficile* (4916015), *Clostridioides difficile* (4913022), *Vibrio parahaemolyticus* (1192264), *Yersinia enterocolitica* subsp. *enterocolitica* (4712948), *Enterococcus cecorum* (29475065), *Bifidobacterium pseudolongum* (34879480), *Methanothermus fervidus* (9962832), *Methanothermus fervidus* (9962056), *Corynebacterium simulans* (29536891), *Thermoproteus uzoniensis* (10359872), *Vulcanisaeta distributa* (9752274), *Streptococcus mitis* (8799048), *Ferroglobus placidus* (8778420), *Streptococcus suis* (8153745), *Clostridium novyi* (4541619), *Streptococcus mutans* (1029528), *Thermosynechococcus elongatus* (1010568), *Chlorobium tepidum* (1007539), *Fusobacterium nucleatum* subsp. *nucleatum* (993139), *Streptococcus pneumoniae* (933787), *Clostridium baratii* (31579258), *Enterococcus mundtii* (31547246), *Prevotella ruminicola* (31500814), *Aeromonas hydrophila* subsp. *hydrophila* (4490168), *Aeromonas hydrophila* subsp. *hydrophila* (4487541), Clostridium acetobutylicum (1117604), Chromobacterium subtsugae (31604683), Gilliamella apicola (29849369), Klebsiella pneumoniae subsp. pneumoniae (11846825), Enterobacter cloacae subsp. cloacae (9125235), Escherichia coli (7150298), Salmonella enterica subsp. enterica serovar Typhimurium (1252363), Salmonella enterica subsp. enterica serovar Typhi (1247322), Bacillus cereus (1202845), Bacteroides thetaiotaomicron (1074343), Bacteroides thetaiotaomicron (1071815), Bacillus coagulans (29814250), Bacteroides cellulosilyticus (29610027), Bacillus anthracis (2850719), Monoraphidium neglectum (25735215), Monoraphidium neglectum (25727595), Alloscardovia omnicolens (35868062), Actinomyces neuii subsp. neuii (35867196), Acetoanaerobium sticklandii (35557713), Exiguobacterium undae (32084128), Paenibacillus pabuli (32034589), Paenibacillus etheri (32019864), Actinomyces oris (31655321), Vibrio alginolyticus (31651465), Brochothrix thermosphacta (29820407), Lactobacillus sakei subsp. sakei (29638315), Anoxybacillus gonensis (29574914), variants thereof as well as fragments thereof. In an embodiment, the PFLA protein is derived from the genus Bifidobacterium and in some embodiments from the species Bifidobacterium adolescentis.

Embodiments of PFLB can be derived, without limitation, from the following (the number in brackets correspond to the Gene ID number): Escherichia coli (945514), Shewanella oneidensis (1170601), Actinobacillus suis (34292499), Finegoldia magna (34165044), Streptococcus cristatus (29901775), Enterococcus hirae (13176625), Bacillus (3031414), Providencia alcalifaciens (34345353), Lactococcus garvieae (34203444), Butyrivibrio proteoclasticus (31781354), Teredinibacter turnerae (29651613), Chromobacterium violaceum (24945652), Vibrio campbellii (5554880), Vibrio campbellii (5554796), Rahnella aquatilis HX2 (34351700), Serratia rubidaea (32375076), Kosakonia sacchari SP1 (23845740), Shewanella baltica (11772863), Streptomyces acidiscabies (33082309), Streptomyces davaonensis (31227068), Parabacteroides distasonis (5308541), Bacteroides vulgatus (5303841), Fibrobacter succinogenes subsp. succinogenes (34755392), Photobacterium damselae subsp. Damselae (34512678), Enterococcus gilvus (34361749), Enterococcus gilvus (34360863), Enterococcus malodoratus (34355213), Enterococcus malodoratus (34354022), Akkermansia muciniphila (34174913), Lactobacillus curvatus (33995135), Dickeya zeae (33924934), Bacteroides oleiciplenus (32502326), Micromonospora aurantiaca (32162989), Selenomonas ruminantium subsp. lactilytica (31522408), Fusobacterium necrophorum subsp. funduliforme (31520832), Bacteroides uniformis (31507007), Streptomyces rimosus subsp. Rimosus (29531908), Clostridium innocuum (26150740), Haemophilus] ducreyi (24944556), Clostridium bolteae (23114829), Vibrio tasmaniensis (7160644), Aeromonas salmonicida subsp. salmonicida (4997718), Listeria monocytogenes (986171), Enterococcus faecalis (1200511), Lactobacillus plantarum (1064019), Vibrio fischeri (3278780), Lactobacillus sakei (33973511), Gardnerella vaginalis (9904192), Vibrio vulnificus (33954428), Vibrio toranzoniae (34373229), Anaerostipes hadrus (34240161), Edwardsiella anguillarum (33940299), Edwardsiella anguillarum (33937990), Lonsdalea quercina subsp. Quercina (33074710), Enterococcus faecium (12999834), Aeromonas hydrophila subsp. hydrophila (4489100), Clostridium acetobutylicum (1117163), Escherichia coli (7151395), Shigella dysenteriae (3795966), Bacillus thuringiensis serovar konkukian (2856201), Salmonella enterica subsp. enterica serovar Typhimurium (1252491), Shigella flexneri (1023824), Streptomyces griseoruber (32320336), Cryobacterium flavum (35898977), Ruminococcus gnavus (35895748), Bacillus acidiceler (34874555), Lactococcus piscium (34864362), Vibrio mediterranei (34766270), Faecalibacterium prausnitzii (34753200), Prevotella intermedia (34516966), Photobacterium damselae subsp. Damselae (34509286), Pseudobutyrivibrio ruminis (34419894), Melissococcus plutonius (34408953), Streptococcus gallolyticus subsp. gallolyticus (34398704), Enterobacter hormaechei subsp. Steigerwaltii (34155981), Enterobacter hormaechei subsp. Steigerwaltii (34152298), Streptomyces venezuelae (34036549), Shewanella algae (34009243), Lactobacillus agilis (33976013), Streptococcus equinus (33961013), Neisseria sicca (33952517), Kitasatospora purpeofusca (32375782), Paenibacillus borealis (29549449), Vibrio fluvialis (29387150), Aliivibrio wodanis (28542465), Aliivibrio wodanis (28541256), Escherichia coli (7157421), Salmonella enterica subsp. enterica serovar Typhi (1247405), Yersinia pestis (1174224), Yersinia enterocolitica subsp. enterocolitica (4713334), Streptococcus suis (8155093), Escherichia coli (947854), Escherichia coli (946315), Escherichia coli (945513), Escherichia coli (948904), Escherichia coli (917731), Yersinia enterocolitica subsp. enterocolitica (4714349), variants thereof as well as fragments thereof. In an embodiment, the PFLB protein is derived from the genus Bifidobacterium and in some embodiments from the species Bifidobacterium adolescentis.

In some embodiments, the yeast cell comprises a genetic modification for expressing a PFLA protein, a PFLB protein or a combination thereof. In a specific embodiment, the yeast cell comprises a genetic modification for expressing a PFLA protein and a PFLB protein which can, in some embodiments, be provided on distinct heterologous nucleic acid molecules. As indicated below, the recombinant yeast host cell can also include additional genetic modifications to provide or increase its ability to transform acetyl-CoA into an alcohol such as ethanol.

Alternatively or in combination, the yeast cell can be genetically engineered to have increased biological activity in a polypeptide capable of utilizing acetyl-CoA. For example, the yeast cell can bear one or more genetic modifications for utilizing acetyl-CoA for example, by providing or increasing acetaldehyde and/or alcohol dehydrogenase activity. For example, the yeast cell can have one or more heterologous nucleic acid molecules encoding one or more polypeptide for utilizing acetyl-CoA. Acetyl-CoA can be converted to an alcohol such as ethanol using second an acetaldehyde dehydrogenase and then an alcohol dehydrogenase. Acylating acetaldehyde dehydrogenases (E.C. 1.2.1.10) are known to catalyze the conversion of acetaldehyde into acetyl-CoA in the presence of CoA. Alcohol dehydrogenases (E.C. 1.1.1.1) are known to be able to catalyze the conversion of acetaldehyde into ethanol. The acetaldehyde dehydrogenase and alcohol dehydrogenase activity can be provided by a single protein (e.g., a bifunctional acetaldehyde/alcohol dehydrogenase) or by a combination of more than one protein (e.g., an acetaldehyde dehydrogenase and an alcohol dehydrogenase). In embodiments in which the acetaldehyde/alcohol dehydrogenase activity is provided by more than one protein, it may not be necessary to provide the combination of proteins in a recombinant form in the recombinant yeast host cell as the cell may have some pre-existing acetaldehyde or alcohol dehydrogenase activity. In such embodiments, the genetic modification can include providing one or more heterologous nucleic acid molecule encoding one or more of a heterologous acetaldehyde dehydrogenase (AADH), a heterologous alcohol dehydrogenase (ADH) and/or heterologous bifunctional acetaldehyde/alcohol dehydrogenases (ADHE). In another embodiment, the genetic modification comprises introducing a heterologous nucleic acid encoding a heterologous bifunctional acetaldehyde/alcohol dehydrogenases (AADH) such as those described in U.S. Pat. No. 8,956,851 and WO 2015/023989, incorporated herewith in their entirety. Heterologous AADHs of the present disclosure include, but are not limited to, the ADHE polypeptides or a polypeptide encoded by an adhe gene ortholog or paralog.

Alternatively or in combination, the yeast cell can be genetically engineered to have increased proteolytic activity. For example, the yeast cell can bear a genetic modification to increase the expression of native polypeptides having protease activity (by modifying, for example, the promoter driving the expression of such native polypeptides having protease activity). Alternatively or in combination, the yeast cell can be genetically engineered to express a heterologous polypeptide having protease activity. In an embodiment, the heterologous protease is an aspartic protease or a protease susceptible of having aspartic-like activity. The heterologous protease can be derived from a known protease expressed in a prokaryotic (such as a bacteria) or a eukaryotic cell (such as a yeast, a mold, a plant or an animal). Embodiments of aspartic proteases include, without limitation, SAP1 (from *Candida albicans* or from *Candida dubliniensis*), PEP1 (from *Aspergillus fumigatus* or from *Saccharomycopsis fibuligera*).

In an embodiment, the heterologous protease can be derived from a fungal organism. For example, the heterologous protease can be derived from the genus *Candida, Clavispora, Saccharomyces, Yarrowia, Meyerozyma, Aspergillus* or *Saccharomycopsis*. When the heterologous protease is derived from the genus *Candida*, it can be derived from the species *Candida albicans, Candida dubliniensis* or *Candida tropicalis*. When the heterologous protease is derived from *Candida albicans*, it can have the amino acid of SEQ ID NO: 31. When the heterologous protease is derived from *Candida dubliensis*, it can have the amino acid sequence of SEQ ID NO: 32. When the heterologous protease is derived from *Candida tropicalis*, it can have the amino acid sequence of SEQ ID NO: 33. When the heterologous protease is derived from the genus *Clavispora*, it can be derived from the species *Clavispora lusitaniae*. When the heterologous protease is derived from the species *Clavispora lusitaniae*, it can have the amino acid sequence of SEQ ID NO: 34 or 35. When the heterologous protease is derived from the genus *Saccharomyces*, it can be derived from the species *Saccharomyces cerevisiae*. When the heterologous protease is derived from the species *Saccharomyces cerevisiae*, it can have the amino acid sequence of SEQ ID NO: 36. When the heterologous protease is derived from the genus *Yarrowia*, it can be derived from the species *Yarrowia lipolytica*. When the heterologous protease is derived from the species *Yarrowia lipolytica*, it can have the amino acid sequence of SEQ ID NO: 37. When the heterologous protease is derived from the genus *Meyerozyma*, it can be derived from the species *Meyerozyma guilliermondii*. When the heterologous protease is derived from the species *Meyerozyma guilliermondii*, it can have the amino acid sequence of SEQ ID NO: 38. When the heterologous protease is derived from the genus *Aspergillus*, it can be derived from the species *Aspergillus fumigatus*. When the heterologous protease is derived from the species *Aspergillus fumigatus*, it can have the amino acid sequence of SEQ ID NO: 39. When the heterologous protease is derived from the species *Saccharomycopsis*, it can be derived from the species *Saccharomycopsis fibuligera*. When the heterologous protease is derived from the species *Saccharomycopsis fibuligera*, it can have the amino acid sequence of SEQ ID NO: 40.

In an embodiment, the heterologous protease can be derived from a bacterial organism. For example, the heterologous protease can be derived from the genus *Bacillus*. When the heterologous protease is derived from the genus *Bacillus*, it can be derived from the species *Bacillus subtilis*, it can have the amino acid sequence of SEQ ID NO: 41.

In an embodiment, the heterologous protease can be derived from a plant. For example, the heterologous protease can be derived from the genus *Ananas*. When the heterologous protease is derived from the genus *Ananas*, it can be derived from the species *Ananas comosus*, it can have the amino acid sequence of SEQ ID NO: 42.

The recombinant bacterial host cell described herein can be provided as a combination with the yeast cell described herein. In such combination, the recombinant bacterial host cell can be provided in a distinct container from the yeast cell. The co-culture itself can be provided in distinct containers (one for the recombinant bacterial cell, another one for the yeast) or in the same container (comprising both the recombinant bacterial host cell and the yeast). The yeast cell can be provided as a cell concentrate. The cell concentrate comprising the yeast cell can be obtained, for example, by propagating the yeast cells in a culture medium and removing at least one components of the medium comprising the propagated yeast host cell. This can be done, for example, by dehydrating, filtering (including ultra-filtrating) and/or centrifuging the medium comprising the propagated yeast cells. In an embodiment, the yeast cell is provided as a cream in the combination. In another embodiment, the yeast is provided in a dried form in the combination.

Process for Making Ethanol

The recombinant bacterial host cell described herein can be used, in combination with a yeast, in saccharification for improving the hydrolysis of a biomass and, in some embodiments, the production of ethanol from the biomass.

The biomass that can be used includes any type of biomass known in the art and described herein. For example, the biomass can include, but is not limited to, starch, sugar and lignocellulosic materials. Starch materials can include, but are not limited to, mashes such as corn, wheat, rye, barley, rice, or milo. Sugar materials can include, but are not limited to, sugar beets, artichoke tubers, sweet sorghum, molasses or cane. The terms "lignocellulosic material", "lignocellulosic substrate" and "cellulosic biomass" mean any type of substrate comprising cellulose, hemicellulose, lignin, or combinations thereof, such as but not limited to woody biomass, forage grasses, herbaceous energy crops, non-woody-plant biomass, agricultural wastes and/or agricultural residues, forestry residues and/or forestry wastes, paper-production sludge and/or waste paper sludge, wastewater-treatment sludge, municipal solid waste, corn fiber from wet and dry mill corn ethanol plants and sugar-processing residues. The terms "hemicellulosics", "hemicellulosic portions" and "hemicellulosic fractions" mean the non-lignin, non-cellulose elements of lignocellulosic material, such as but not limited to hemicellulose (i.e., comprising xyloglucan, xylan, glucuronoxylan, arabinoxylan, mannan, glucomannan and galactoglucomannan), pectins (e.g., homogalacturonans, rhamnogalacturonan I and II, and xylogalacturonan) and proteoglycans (e.g., arabinogalactan-polypeptide, extensin, and pro line-rich polypeptides).

In a non-limiting example, the lignocellulosic material can include, but is not limited to, woody biomass, such as recycled wood pulp fiber, sawdust, hardwood, softwood, and combinations thereof; grasses, such as switch grass, cord grass, rye grass, reed canary grass, miscanthus, or a combination thereof; sugar-processing residues, such as but not limited to sugar cane bagasse; agricultural wastes, such as but not limited to rice straw, rice hulls, barley straw, corn cobs, cereal straw, wheat straw, canola straw, oat straw, oat hulls, and corn fiber; stover, such as but not limited to soybean stover, corn stover; succulents, such as but not limited to, agave; and forestry wastes, such as but not limited to, recycled wood pulp fiber, sawdust, hardwood (e.g., poplar, oak, maple, birch, willow), softwood, or any combination thereof. Lignocellulosic material may comprise one species of fiber; alternatively, lignocellulosic material may comprise a mixture of fibers that originate from different lignocellulosic materials. Other lignocellulosic materials are agricultural wastes, such as cereal straws, including wheat straw, barley straw, canola straw and oat straw; corn fiber; stovers, such as corn stover and soybean stover; grasses, such as switch grass, reed canary grass, cord grass, and miscanthus; or combinations thereof.

Substrates for cellulose activity assays can be divided into two categories, soluble and insoluble, based on their solubility in water. Soluble substrates include cellodextrins or derivatives, carboxymethyl cellulose (CMC), or hydroxyethyl cellulose (HEC). Insoluble substrates include crystalline cellulose, microcrystalline cellulose (Avicel), amorphous cellulose, such as phosphoric acid swollen cellulose (PASC), dyed or fluorescent cellulose, and pretreated lignocellulosic biomass. These substrates are generally highly ordered cellulosic material and thus only sparingly soluble.

It will be appreciated that suitable lignocellulosic material may be any feedstock that contains soluble and/or insoluble cellulose, where the insoluble cellulose may be in a crystalline or non-crystalline form. In various embodiments, the lignocellulosic biomass comprises, for example, wood, corn, corn stover, sawdust, bark, molasses, sugarcane, leaves, agricultural and forestry residues, grasses such as switchgrass, ruminant digestion products, municipal wastes, paper mill effluent, newspaper, cardboard or combinations thereof.

Paper sludge is also a viable biomass for lactate or acetate production. Paper sludge is solid residue arising from pulping and paper-making, and is typically removed from process wastewater in a primary clarifier. The cost of disposing of wet sludge is a significant incentive to convert the material for other uses, such as conversion to ethanol. Processes provided by the present disclosure are widely applicable. Moreover, the hydrolyzed biomass may be used to produce ethanol or higher value added chemicals, such as organic acids, aromatics, esters, acetone and polymer intermediates.

The biomass that can be used in the processes described herein is or comprise corn or a corn derivative. In some embodiments, the biomass includes starch, which can be raw, gelatinized or comprise a mixture or raw and gelatinized starch.

The process of the present disclosure comprise contacting the recombinant bacterial host cell of the present disclosure and the yeast with the biomass so as to allow the hydrolysis of at least a part of the biomass and the conversion, using fermentation from both the recombinant bacterial host cell and the yeast, of the biomass (at least in part) into ethanol.

The fermentation process can be performed at temperatures of at least about 20° C., about 21° C., about 22° C., about 23° C., about 24° C., about 25° C., about 26° C., about 27° C., about 28° C., about 29° C., about 30° C., about 31° C., about 32° C., about 33°, about 34° C., about 35° C., about 36° C., about 37° C., about 38° C., about 39° C., about 40° C., about 41° C., about 42° C., about 43° C., about 44° C., about 45° C., about 46° C., about 47° C., about 48° C., about 49° C., or about 50° C.

In some embodiments, prior to fermentation, a step of liquefying starch can be included. The liquefaction of starch can be performed at a temperature of between about 70° C.-105° C. to allow for proper gelatinization and hydrolysis of the starch. In an embodiment, the liquefaction occurs at a temperature of at least about 70° C., 75° C., 80° C., 85° C., 90° C., 95° C., 100° C. or 105° C. Alternatively or in combination, the liquefaction occurs at a temperate of no more than about 105° C., 100° C., 95° C., 90° C., 85° C., 80° C., 75° C. or 70° C. In yet another embodiment, the liquefaction occurs at a temperature between about 80° C. and 85° C. (which can include a thermal treatment spike at 105° C.). In some embodiments, the recombinant bacterial host cell of the present disclosure is absent during the liquefaction step and is introduced to a liquefied biomass which has been cooled.

In some embodiments, the process can be used to produce ethanol at a particular rate. For example, in some embodiments, ethanol is produced at a rate of at least about 0.1 mg per hour per liter, at least about 0.25 mg per hour per liter, at least about 0.5 mg per hour per liter, at least about 0.75 mg per hour per liter, at least about 1.0 mg per hour per liter, at least about 2.0 mg per hour per liter, at least about 5.0 mg per hour per liter, at least about 10 mg per hour per liter, at least about 15 mg per hour per liter, at least about 20.0 mg per hour per liter, at least about 25 mg per hour per liter, at least about 30 mg per hour per liter, at least about 50 mg per hour per liter, at least about 100 mg per hour per liter, at least about 200 mg per hour per liter, at least about 300 mg per hour per liter, at least about 400 mg per hour per liter, at least about 500 mg per hour per liter, at least about 600 mg per hour per liter, at least about 700 mg per hour per liter, at least about 800 mg per hour per liter, at least about 900 mg per hour per liter, at least about 1 g per hour per liter, at least about 1.5 g per hour per liter, at least about 2 g per hour per liter, at least about 2.5 g per hour per liter, at least about 3 g per hour per liter, at least about 3.5 g per hour per liter, at least about 4 g per hour per liter, at least about 4.5 g per hour per liter, at least about 5 g per hour per liter, at least about 5.5 g per hour per liter, at least about 6 g per hour per liter, at least about 6.5 g per hour per liter, at least about 7 g per hour per liter, at least about 7.5 g per hour per liter, at least about 8 g per hour per liter, at least about 8.5 g per hour per liter, at least about 9 g per hour per liter, at least about 9.5 g per hour per liter, at least about 10 g per hour per liter, at least about 10.5 g per hour per liter, at least about 11 g per hour per liter, at least about 11.5 g per hour per liter, at least about 12 g per hour per liter, at least about 12.5 g per hour per liter, at least about 13 g per hour per liter, at least about 13.5 g per hour per liter, at least about 14 g per hour per liter, at least about 14.5 g per hour per liter or at least about 15 g per hour per liter.

During fermentation, the pH of the fermentation medium can be equal to or below 5.5, 5.4, 5.3, 5.2, 5.1, 5.0, 4.9, 4.8, 4.7., 4.6, 4.5, 4.4, 4.3, 4.2, 4.1, 4.0 or lower. In an embodiment, the pH of the fermentation medium (during fermentation) is between 4.0 and 5.5.

Ethanol production can be measured using any method known in the art. For example, the quantity of ethanol in fermentation samples can be assessed using HPLC analysis.

Many ethanol assay kits are commercially available that use, for example, alcohol oxidase enzyme based assays.

In the process described herein, it is possible to add an exogenous source (e.g., to dose) of an enzyme to facilitate saccharification or improve fermentation yield. As such, the process can comprise including one or more dose of one or more exogenous enzyme during the saccharification and/or the fermentation step. The exogenous enzyme can be provided in a purified form or in combination with other enzymes (e.g., a cocktail). In the context of the present disclosure, the term "exogenous" refers to a characteristic of the enzyme, namely that it has not been produced during the saccharification or the fermentation step, but that it was produced prior to the saccharification or the fermentation step. The exogenous enzyme that can be used during the saccharification/fermentation process can include, without limitation, an alpha-amylase, a glucoamylase, a protease, a phytase, a pullulanase, a cellulase, a xylanase, a trehalase, or any combination thereof.

In some specific embodiments, in the presence of the recombinant bacterial host cell of the present disclosure, it is possible to add a reduced amount of an exogenous source (e.g., to dose) of an enzyme when compared to a comparable (control) fermentation in the absence of the recombinant bacterial host cell. The amount of the exogenous enzyme is considered "reduced" with respect to amount of the exogenous enzyme used in the control fermentation because smaller doses or less doses are necessary. The amount of the exogenous enzyme used in the presence of the recombinant bacterial cell allows achieving the same or a higher fermentation yield than the fermentation yield obtained with the control fermentation. In some specific embodiments, the recombinant bacterial host cell can reduce the amount of an exogenous protease needed to achieve at least the same fermentation yield as the control fermentation. In some specific embodiments, the recombinant bacterial host cell can reduce the amount of an exogenous glucoamylase needed to achieve at least the same fermentation yield as the control fermentation.

In the process described herein, it is possible to add a nitrogen source (usually urea or ammonia) to facilitate saccharification or improve fermentation yield. As such, the process can comprise including one or more amount of the nitrogen source prior to or during the saccharification and/or the fermentation step.

In some embodiments, the recombinant bacterial host cells described herein reduce the need for an exogenous source of nitrogen in saccharification/fermentation. In some embodiments, the recombinant bacterial host cells described herein reduce the need for exogenous source of nitrogen in simultaneous saccharification and fermentation (SSF). In some embodiments, the recombinant bacterial host cell described herein alleviates the need for supplementing with an exogenous nitrogen source. As such, the recombinant bacterial host cell of the present disclosure can be used to reduce the amount of an exogenous nitrogen source required to achieve a comparable ethanolic yield (when compared to a corresponding fermentation in which the recombinant bacterial host cell has not been added or a control bacterial host cell lacking the at least one first genetic modification has been used). For example, in an embodiment in which the nitrogen source is urea, the amount of the exogenous source of nitrogen required to complete the fermentation can be below 800, 700, 600, 500, 400, 300, 200, 100, 90, 80, 70, 60, 50, 40, 30, 20, 10 ppm or less. In another embodiment in which the nitrogen source is urea, the amount of the exogenous source of nitrogen required to complete the fermentation can be between 10 and 100 ppm, 10 and 200 ppm, 10 and 300 ppm, 10 and 400 ppm, 10 and 500 ppm, 10 and 600 ppm, 10 and 700 ppm or 10 and 800 ppm. In another embodiment in which the nitrogen source is urea, the amount of the exogenous source of nitrogen required to complete the fermentation can be between 20 and 100 ppm, 20 and 200 ppm, 20 and 300 ppm, 20 and 400 ppm, 20 and 500 ppm, 20 and 600 ppm, 20 and 700 ppm or 20 and 800 ppm. In another embodiment in which the nitrogen source is urea, the amount of the exogenous source of nitrogen required to complete the fermentation can be between 30 and 100 ppm, 30 and 200 ppm, 30 and 300 ppm, 30 and 400 ppm, 30 and 500 ppm, 30 and 600 ppm, 30 and 700 ppm or 30 and 800 ppm. In another embodiment in which the nitrogen source is urea, the amount of the exogenous source of nitrogen required to complete the fermentation can be between 40 and 100 ppm, 40 and 200 ppm, 40 and 300 ppm, 40 and 400 ppm, 40 and 500 ppm, 40 and 600 ppm, 40 and 700 ppm or 40 and 800 ppm. In another embodiment in which the nitrogen source is urea, the amount of the exogenous source of nitrogen required to complete the fermentation can be between 50 and 100 ppm, 50 and 200 ppm, 50 and 300 ppm, 50 and 400 ppm, 50 and 500 ppm, 50 and 600 ppm, 50 and 700 ppm or 50 and 800 ppm. In another embodiment in which the nitrogen source is urea, the amount of the exogenous source of nitrogen required to complete the fermentation can be between 60 and 100 ppm, 60 and 200 ppm, 60 and 300 ppm, 60 and 400 ppm, 60 and 500 ppm, 60 and 600 ppm, 60 and 700 ppm or 60 and 800 ppm. In another embodiment in which the nitrogen source is urea, the amount of the exogenous source of nitrogen required to complete the fermentation can be between 70 and 100 ppm, 70 and 200 ppm, 70 and 300 ppm, 70 and 400 ppm, 70 and 500 ppm, 70 and 600 ppm, 70 and 700 ppm or 70 and 800 ppm. In another embodiment in which the nitrogen source is urea, the amount of the exogenous source of nitrogen required to complete the fermentation can be between 80 and 100 ppm, 80 and 200 ppm, 80 and 300 ppm, 80 and 400 ppm, 80 and 500 ppm, 80 and 600 ppm, 80 and 700 ppm or 80 and 800 ppm. In another embodiment in which the nitrogen source is urea, the amount of the exogenous source of nitrogen required to complete the fermentation can be between 90 and 100 ppm, 90 and 200 ppm, 90 and 300 ppm, 90 and 400 ppm, 90 and 500 ppm, 90 and 600 ppm, 90 and 700 ppm or 90 and 800 ppm. In another embodiment in which the nitrogen source is urea, the amount of the exogenous source of nitrogen required to complete the fermentation can be between 100 and 200 ppm, 100 and 300 ppm, 100 and 400 ppm, 100 and 500 ppm, 100 and 600 ppm, 100 and 700 ppm or 100 and 800 ppm. In another embodiment in which the nitrogen source is urea, the amount of the exogenous source of nitrogen required to complete the fermentation can be between 200 and 300 ppm, 200 and 400 ppm, 200 and 500 ppm, 200 and 600 ppm, 200 and 700 ppm or 200 and 800 ppm. In another embodiment in which the nitrogen source is urea, the amount of the exogenous source of nitrogen required to complete the fermentation can be between 300 and 400 ppm, 300 and 500 ppm, 300 and 600 ppm, 300 and 700 ppm or 300 and 800 ppm. In another embodiment in which the nitrogen source is urea, the amount of the exogenous source of nitrogen required to complete the fermentation can be between 400 and 500 ppm, 400 and 600 ppm, 400 and 700 ppm or 400 and 800 ppm. In another embodiment in which the nitrogen source is urea, the amount of the exogenous source of nitrogen required to complete the fermentation can be between 500 and 600 ppm, 500 and 700 ppm or 500 and 800 ppm. In another embodiment in which the nitrogen source is urea, the amount of the exogenous source of nitrogen required to complete the fermentation can be between 6000 and 700 ppm or 600 and 800 ppm. In another embodiment in which the nitrogen source is urea, the amount of the exogenous source of nitrogen required to complete the fermentation can be between 700 and 800 ppm. In another specific embodiment in which the nitrogen source is urea, the amount of the exogenous source of nitrogen required to complete the fermentation can be between 50 and 600 ppm. In another specific embodiment in which the nitrogen source is urea, the amount of the exogenous source of nitrogen required to complete the fermentation is equal to or below 600 ppm. The process can, in some embodiments, alleviate the need to supplement the hydrolyzed biomass with an exogenous source of nitrogen during the fermentation step.

In some embodiments, the recombinant bacterial host cell of the present disclosure can be used to induce the nitrogen catabolite repression system (NCR) in the yeast. When preferred nitrogen sources are available, the yeast can utilize the nitrogen catabolite repression system (NCR) which down regulates pathways involved in the utilization of non-favorable nitrogen sources such as urea. Nitrogen sources which induce the NCR include, without limitations, free amino acids such as glutamine, asparagine, and glutamate, as well as ammonia. Since the recombinant bacterial host cell does provide a favorable source of nitrogen to the yeast (free amino acids as well as ammonia), in some embodiments, the yeast can induce the NCR and thus increase its ethanol yield.

In some further embodiments, the recombinant bacterial host cell of the present disclosure can be used to increase the pH during and at the end of the presentation (when compared to a control fermentation which did not include the recombinant bacterial host cell). Without wishing to be bound to theory, because the recombinant bacterial has an increased proteolytic activity, it causes the release of ammonia which, in return, does increase the pH of the fermentation medium. This increase in the pH of the fermentation medium may be beneficial to increase the yeast's robustness and/or the activity of the secreted heterologous enzyme (such as, for example, a glucoamylase). In some embodiments, at the end of the fermentation, the fermentation medium has a pH higher than 4.2, 4.3, 4.4, 4.5, 4.6, 4.7, 4.8, 4.9 or more.

In some further embodiments, the recombinant bacterial host cell of the present disclosure can be used to increase the robustness of the fermenting yeast during end of the presentation (when compared to a control fermentation which did not include the recombinant bacterial host cell or that did include a control recombinant bacterial host cell lacking the at least one first genetic modification). Without wishing to be bound to theory, because the recombinant bacterial has an increased proteolytic activity, it causes the release of ammonia which, in return, does increase the pH of the fermentation medium. This increase in the pH of the fermentation medium may be beneficial to increase the yeast's robustness and/or its ability to produce and secrete a heterologous enzyme (such as, for example, a glucoamylase). In some embodiments, at the end of the fermentation, the fermentation medium has a pH higher than 4.2, 4.3, 4.4, 4.5, 4.6, 4.7, 4.8, 4.9 or more.

Since the recombinant bacterial host cell of the present disclosure has increased proteolytic activity and is used with a fermenting yeast, it can be used to modified the protein/amino acid content of whole stillage obtained after fermentation. Fermentation products, such as ethanol, are obtained from fermenting a biomass, such as corn. Once the fermentation products are removed from the fermented biomass, it is possible to recuperate some by-products (e.g., distillers products) which can be used as animal feed or a supplement animal feed. Typically, the starch-containing material is first ground in a dry-grind or wet-milling process. The ground starch-containing material can be submitted to a cooking step and/or to an enzymatic starch-degrading step to breakdown the starchy material into fermentable sugars. The fermentable sugars are then converted directly or indirectly into the desired fermentation product using a fermenting organism (e.g., a yeast for example). Liquid fermentation products are recovered from the fermented biomass (often referred to as "beer mash"), e.g., by distillation, which separate the desired fermentation product from other liquids and/or solids. The remaining fraction is referred to as "whole stillage". The whole stillage can be dewatered and separated into a solid and a liquid phase, e.g., by centrifugation. The solid phase of the whole stillage is referred to as a "wet cake" (or "wet grains") and the liquid phase (supernatant) is referred to as "thin stillage". The wet cake can be used without further evaporation as distillers wet grains (DWG). Dewatered wet cake can be dried to provide distillers dried grains (DDG). Thin stillage is typically evaporated to provide a condensate or a syrup or may alternatively be recycled directly to the slurry tank. Condensate may either be forwarded to a methanator before being discharged or may be recycled to the slurry tank. The syrup may be blended into DDG or added to the wet cake before drying to produce distillers wet grains with solubles (DWGS) and optionally dried to provide distillers dried grain with solubles (DDGS). The syrup may be dried to provide dried solubles.

As such the recombinant bacterial host cell of the present disclosure can be used to modulate the protein content and especially the free amino acid content of whole stillage/distiller's product (when compared to a control whole stillage/distiller's product obtained by a control fermentation which did not include the recombinant bacterial host cell or used a control bacterial host cell). In an embodiment, the content in alanine in the whole stillage/distillers product is increased with respect to the control whole stillage/distillers products. In an embodiment, the content in arginine in the whole stillage/distillers product is increased with respect to the control whole stillage/distillers products. In an embodiment, the content in asparagine in the whole stillage/distillers product is increased with respect to the control whole stillage/distillers products. In an embodiment, the content in aspartic acid in the whole stillage/distillers product is increased with respect to the control whole stillage/distillers products. In an embodiment, the content in asparagine and aspartic acid in the whole stillage/distillers product is increased with respect to the control whole stillage/distillers products. In an embodiment, the content in glutamic acid in the whole stillage/distillers product is increased with respect to the control whole stillage/distillers products. In another embodiment, the content in glutamine in the whole stillage/distillers product is increased with respect to the control whole stillage/distillers products. In an embodiment, the content in glycine in the whole stillage/distillers product is increased with respect to the control whole stillage/distillers products. In an embodiment, the content in histidine in the whole stillage/distillers product is increased with respect to the control whole/stillage distillers products. In an embodiment, the content in histidine in the whole stillage/distillers product is increased with respect to the control whole stillage/distillers products. In an embodiment, the content in leucine in the whole stillage/distillers product is increased with respect to the control whole stillage/distillers products. In an embodiment, the content in phenylalanine in the whole stillage/distillers product is increased with respect to the control whole stillage/distillers products. In an embodiment, the content in proline in the whole stillage/distillers product is increased with respect to the control whole stillage/distillers products. In an embodiment, the content in serine in the whole stillage/distillers product is increased with respect to the control whole stillage/distillers products. In an embodiment, the content in threonine in the whole stillage/distillers product is increased with respect to the control whole stillage/distillers products. In an embodiment, the content in lysine in the whole stillage/distillers product is increased with respect to the control whole stillage/distillers products. In an embodiment, the content in tyrosine in the whole stillage/distillers product is increased with respect to the control whole stillage/distillers products. In an embodiment, the content in valine in the whole stillage/distillers product is increased with respect to the control whole stillage/distillers products. In an embodiment, the content in cysteine in the whole stillage/distillers product is increased with respect to the control whole stillage/distillers products. In an embodiment, the content in methionine in the whole stillage/distillers product remains is increased with respect to the control whole stillage/distillers products. In an embodiment, the content in tryptophan in the whole stillage/distillers product is increased with respect to the control whole stillage/distillers products. In an embodiment, the content in glutamine in the whole stillage/distillers product is increased with respect to the control whole stillage/distillers products. Embodiments for modulating the nutritional content, including the protein and amino acid content, using a recombinant bacterial host cell are described in U.S. provisional application Ser. No. 63/050,588 filed on Jul. 10, 2020 and incorporated herewith in its entirety.

The present disclosure also provide a composition comprising starch as well as the recombinant bacterial host cell described herein. Optionally, the composition comprises the fermenting yeast as well. In the composition, the starch can be raw, gelatinized, hydrolyzed as well as combinations thereof.

EXAMPLE

Bacterial strains. *Lactobacillus paracasei* strain 12A was converted to an ethanologen through deletion of four native lactate dehydrogenases, two native mannitol dehydrogenases, and incorporation of a heterologous Production of Ethanol cassette (PET) consisting of the *Zymomonas mobilis* pyruvate decarboxylase (SEQ ID NO: 1 encoded by SEQ ID NO: 3) and alcohol dehydrogenase (SEQ ID NO: 4 encoded by SEQ ID NO: 6) (ΔL-Idh1::Ppgm-PET, ΔL-Idh2, ΔD-hic, ΔmtlD1, ΔmtlD2, ΔL-Idh3::PuspA-PET). The expression of one PET cassette (including one copy of the *Zymomonas mobilis* pyruvate decarboxylase and alcohol dehydrogenase) was controlled by the native universal stress protein promoter (uspA) which favors expression during late growth stages. The expression of the other PET cassette (including one copy of the *Zymomonas mobilis* pyruvate decarboxylase and alcohol dehydrogenase) was controlled by the native phosphoglycerate mutase (pgm) constitutive promoter. The resulting bacterial strain is referred to as M16933. Strain M16933 was further modified to inactivate both of the copies of its native prcR gene to generate strain M17094.

Yeast strains. *Saccharomyces cerevisiae* yeast strain M2390 is a biofuel yeast strain which has not been genetically engineered (e.g., a wild-type yeast strain). Yeast strain M2519 is derived from strain M2390 and expresses a heterologous glucoamylase from *Saccharomycopsis filbuligera* (e.g., having the amino acid sequence of SEQ ID NO: 28).

Corn mash fermentation. The fermentations were conducted in a mixture comprising 34% total solids, a 60% glucoamylase dose, between 0-800 ppm of urea and 3 ppm of virginiamycin. They were conducted at a temperature between 30-33° C. for a period of at least 50 hours. When present in the fermentation, the bacterial strains were initially inoculated at $10^8$ CFU/mL.

Figure 2:
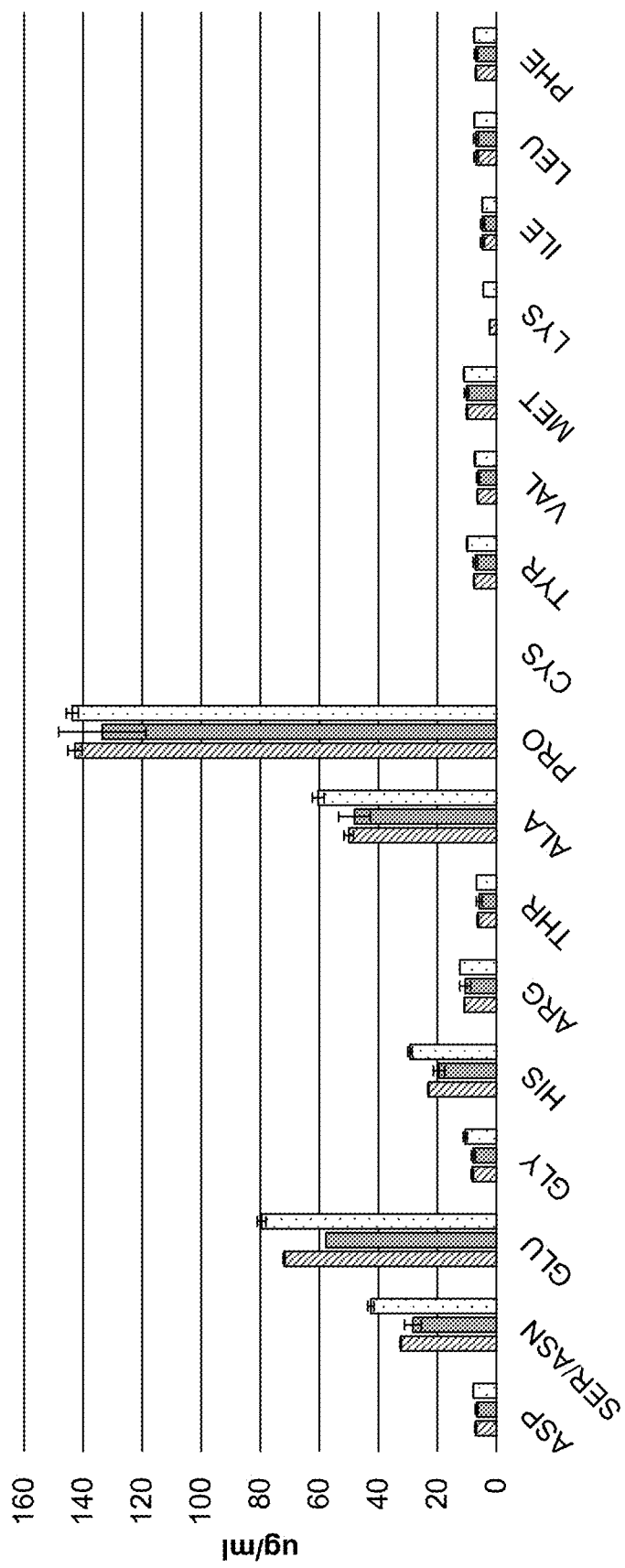
FIG. 2 shows the residual free amino acids following fermentation of corn mash with yeast strain M2519 with and without the addition of ethanologen M16933 and M17094. Results are shown as the concentration of each amino acid (μg/ml) in the corn mash in function of the fermenting organisms used: M2519 only (diagonal hatch), M2519 and M16933 (grey) and M2519 and M17094 (dotted). The individual amino acids are identified using the usual three-letter code.

It was first determined if the deletion of prcR would have an impact on the amount of free amino acids following fermentation. A corn mash was dosed with 317 ppm urea and subsequently fermented with yeast strain M2519 with and without the inclusion of bacterial strains M16933 and M17094. The residual free amino acids were analyzed following fermentation Fermentations that included M16933 showed a decrease, when compared to the yeast alone, in the total amino acids present post fermentation (FIG. 1), particularly glutamate (FIG. 2). Addition of M17094 to a fermentation led to a net increase in residual free amino acids (FIG. 1), likely due to the increase in proteolytic activity supplied by the prcRΔ.

Figure 3:
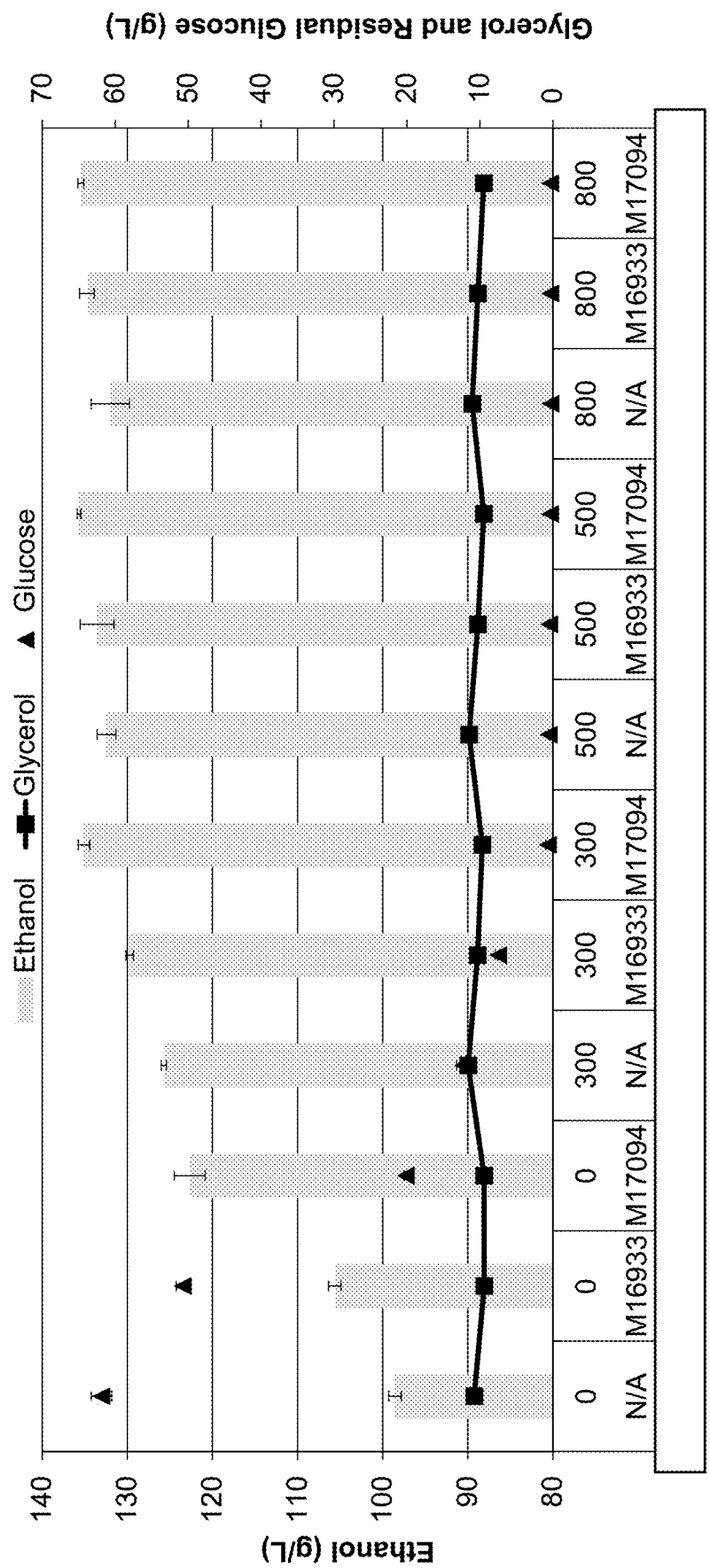
FIG. 3 provides the final ethanol, glucose and glycerol titers following fermentation of corn mash in the presence of wild-type *S. cerevisiae* strain M2390 with and without addition of bacterial ethanologens M16933 and M17094. Results are shown as the final ethanol titer (left axis in g/l, bars), glycerol titer (right axis in g/l, ■) and glucose titer (right axis in g/l, ▲) in function of the amount of urea (in ppm, $1^{st}$ row below the x axis) and fermenting organisms used (bacterial strain used is provided on the $2^{nd}$ row below the x axis).

It was then determined if the deletion of prcR would have an impact on fermentation performance and required urea dose. In order to do so, a corn mash was fermented with addition of 0-800 ppm exogenous urea. Fermentations were carried out by the M2390 strain with and without addition of ethanologens M16933 or M17094 (FIG. 3). Results indicated that inclusion of either M16933 or M17094 improved fermentation performance at low nitrogen dosing, but deletion of prcR in strain M17094 gave an additional significant improvement over the parental strain M16933. The interaction between M16933 or M17094 and M2390 enabled an ethanol yield and fermentation performance at 300 ppm urea that was superior to the yeast alone with 500 ppm added urea and gave results similar to the treatment that received 800 ppm urea. The strong positive impact on corn ethanol fermentation of this engineered bacterial-yeast interaction is dramatically illustrated by the treatment that received no urea. In those fermentations, inclusion of M16933 boosted ethanol yield by 7.1% and reduced residual glucose by more than 15%, while M17094 raised ethanol yield by nearly 24.5%, with a nearly 70% reduction in residual glucose.

Figure 4:
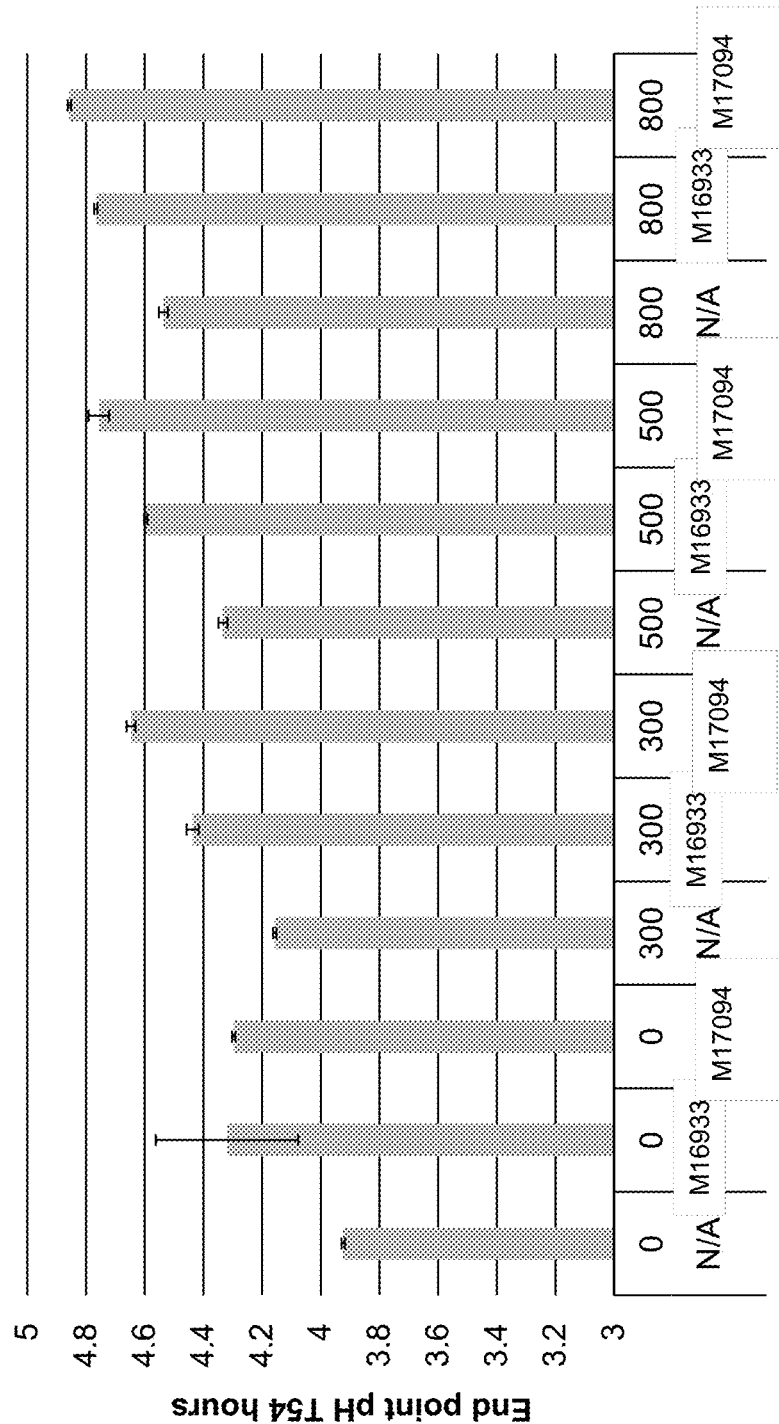
FIG. 4 provides the final pH of corn mash fermentations in the presence of *S. cerevisiae* strain M2519 with varying urea doses as well as with and without inclusion of bacterial ethanologens M16933 and M17094. Results are shown as the pH at the end of the fermentation in function of the amount of urea (in ppm, $1^{st}$ row below the x axis) and the type of bacterial strain used (bacterial strain used is provided on the $2^{nd}$ row below the x axis).
Figure 5:
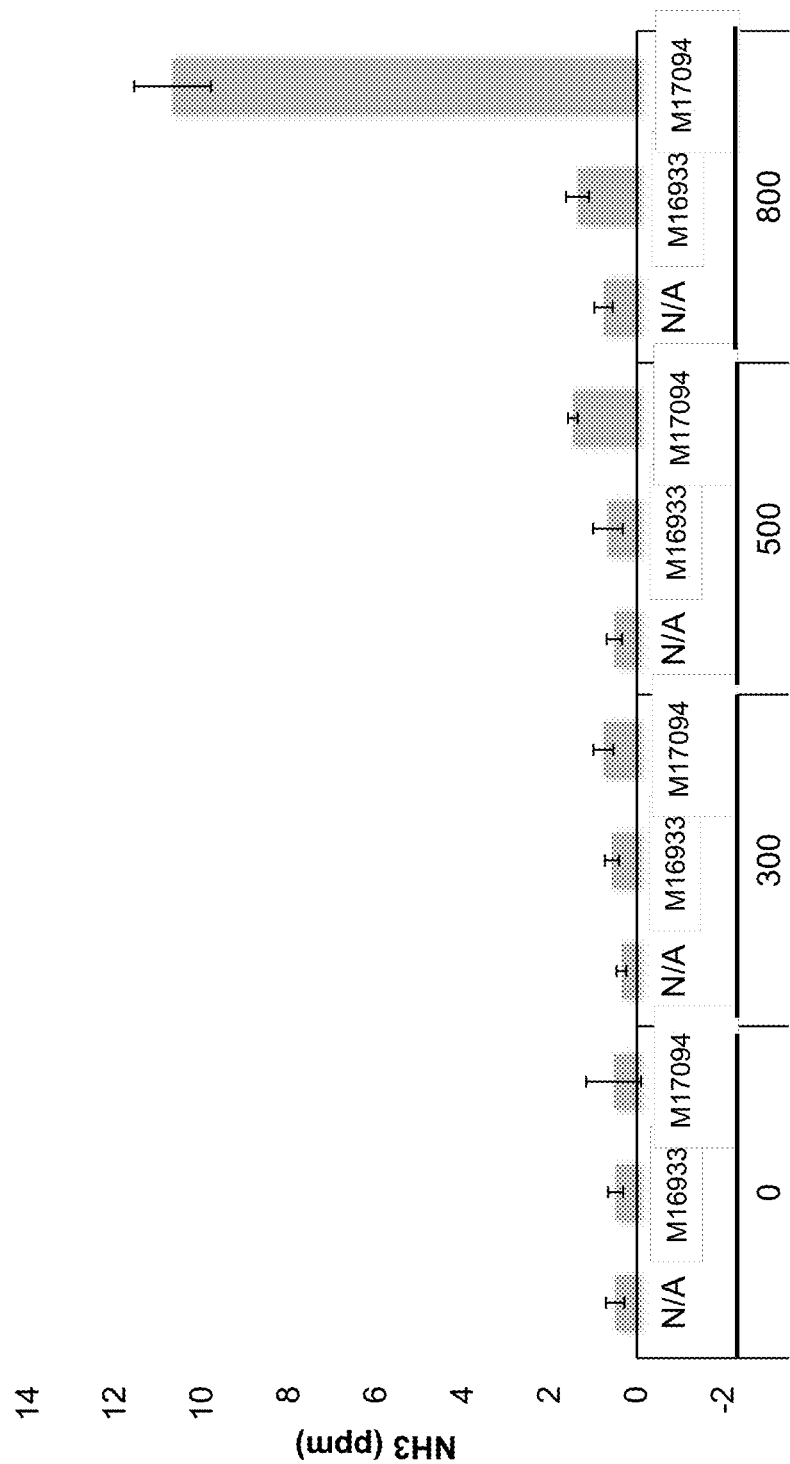
FIG. 5 provides the residual ammonia content of corn mash fermentations in the presence of the wild-type *S. cerevisiae* strain M2390 with varying urea doses as well as with and without inclusion of bacterial ethanologens M16933 and M17094. Results are shown as the ammonia content (ppm) at the end of the fermentation in function of the type of bacterial strain used (shown in the $1^{st}$ row below the x axis) and the amount of urea (shown on the $2^{nd}$ row below the x axis).

The final pH of the fermentations were also increased by inclusion of either ethanologen strain in all treatments (FIG. 4). This effect was even greater with M17094 (FIG. 4). To explore this idea, residual ammonia levels were analyzed (FIG. 5). At low urea dosing no residual ammonia was detected. The fermentation results (low ethanol yield and high residual glucose levels) confirmed that these fermentations were limited in nitrogen availability and, without being bound by theory, it is postulated that all available ammonia produced was utilized. However, as the urea dose increases and nitrogen availability is no longer a limiting factor, residual ammonia levels began to rise, particularly in fermentations with added M17094 (FIG. 5).

While the invention has been described in connection with specific embodiments thereof, it will be understood that the scope of the claims should not be limited by the preferred embodiments set forth in the examples, but should be given the broadest interpretation consistent with the description as a whole.

What is claimed is:

1. A recombinant lactic acid bacterial host cell:
   (a) capable of converting a biomass into ethanol and comprising:
      (i) a heterologous pyruvate decarboxylase; and
      (ii) a heterologous alcohol dehydrogenase; and
   (b) having at least one first genetic modification for
      (i) increasing, when compared to a corresponding control bacterial cell lacking the at least one first genetic modification, the proteolytic activity associated with the recombinant lactic acid bacterial host cell, and
      (ii) making the recombinant lactic acid bacterial host cell capable of providing a nitrogen source to a yeast capable of converting the biomass into ethanol, wherein the nitrogen source comprises a peptide, an amino acid and/or ammonia,
   wherein the at least one first genetic modification:
      (1) reduces the expression of a native OmpR-family response regulator encoded by the prcR gene;
      (2) is located in a regulatory region of lactocepin (PrtP); or
      (3) comprises removing, at least in part, a responsive element in the regulatory region of one or more native proteases, wherein the responsive element is an OmpR-family regulator-responsive element and wherein the OmpR-family regulator is encoded by the prcR gene.

2. The recombinant lactic acid bacterial host cell of claim 1, wherein the native OmpR-family response regulator is inactivated.

3. The recombinant lactic acid bacterial host cell of claim 1 further comprising a second genetic modification that expresses a heterologous ketoisovalerate decarboxylase, a variant of the heterologous ketoisovalerate decarboxylase having decarboxylase activity or a fragment of the heterologous ketoisovalerate decarboxylase having decarboxylase activity.

4. The recombinant lactic acid bacterial host cell of claim 3, having at least one inactivated native gene coding for a glutamine synthetase.

5. The recombinant lactic acid bacterial host cell of claim 4, wherein the at least one inactivated native gene coding for a glutamine synthetase is glnA.

6. The recombinant lactic acid bacterial host cell of claim 1, wherein the recombinant lactic acid bacterial host cell has a decreased lactate dehydrogenase activity when compared to a corresponding control lactic acid bacterial cell.

7. The recombinant lactic acid bacterial host cell of claim 1 being from the genus *Lactobacillus* sp. and/or from the species *Lactobacillus paracasei*.

8. The recombinant lactic acid bacterial host cell of claim 7 having at least one inactivated native lactate dehydrogenase gene.

* * * * *